(12) United States Patent
Yao

(10) Patent No.: US 12,446,540 B1
(45) Date of Patent: Oct. 21, 2025

(54) LITTER BAG SEALING DEVICE AND CAT LITTER BOX

(71) Applicant: Shanghai Xinqi Electronic Technology Co., Ltd., Shanghai (CN)

(72) Inventor: Guodong Yao, Shanghai (CN)

(73) Assignee: Shanghai Xinqi Electronic Technology Co., Ltd., Shanghai (CN)

( * ) Notice: Subject to any disclaimer, the term of this patent is extended or adjusted under 35 U.S.C. 154(b) by 0 days.

(21) Appl. No.: 19/054,920

(22) Filed: Feb. 17, 2025

(30) Foreign Application Priority Data

| Aug. 16, 2024 | (CN) | ......................... | 202430522479.X |
| Nov. 19, 2024 | (CN) | ......................... | 202411658416.2 |
| Nov. 19, 2024 | (CN) | ......................... | 202422824076.8 |
| Nov. 29, 2024 | (CN) | ......................... | 202411754290.9 |
| Nov. 29, 2024 | (CN) | ......................... | 202411754316.X |
| Nov. 29, 2024 | (CN) | ......................... | 202422958384.X |
| Nov. 29, 2024 | (CN) | ......................... | 202422958415.1 |
| Dec. 30, 2024 | (CN) | ......................... | 202411975675.8 |
| Dec. 30, 2024 | (CN) | ......................... | 202423286544.7 |

(51) Int. Cl.
*A01K 1/01* (2006.01)
*B65B 51/16* (2006.01)

(52) U.S. Cl.
CPC ............ *A01K 1/0114* (2013.01); *B65B 51/16* (2013.01)

(58) Field of Classification Search
CPC .... A01K 1/0114; A01K 1/0107; A01K 1/011; A01K 1/0132; A01K 1/0128; A01K 1/0152; B65B 51/16; B07B 1/50; B07B 1/526; E05F 11/44; E05F 15/678; E05F 11/445; E05F 15/6903; E05F 17/004; E05F 2017/005; B60J 1/1853
USPC ......... 119/166; 209/379, 385, 386; 219/769; 220/495.08, 495.06; 49/118, 120, 366, 49/370

See application file for complete search history.

(56) References Cited

U.S. PATENT DOCUMENTS

| 3,545,171 | A | * | 12/1970 | Jacob ...................... | B65B 51/16 |
| | | | | | 53/562 |
| 4,593,516 | A | * | 6/1986 | Alameda ................. | B65B 51/00 |
| | | | | | 53/138.3 |
| 5,752,466 | A | * | 5/1998 | Lundeen .............. | A01K 1/0114 |
| | | | | | 119/167 |
| 5,918,447 | A | * | 7/1999 | Hanten ................ | A22C 11/105 |
| | | | | | 53/577 |
| 7,316,100 | B2 | * | 1/2008 | Stravitz .................. | B65F 1/062 |
| | | | | | 53/567 |

(Continued)

*Primary Examiner* — Zoe Tam Tran

(57) ABSTRACT

A litter bag sealing device includes: a device body, configured to mount a litter bag; a rotation ring, rotatably mounted on the device body, where rotation ring defines a dropping opening configured to allow the litter bag to pass through; at least two rotation sheets, rotatably connected to the device body and slidably connected to the rotation ring; a drive mechanism, driveably connected to the rotation ring to drive the rotation ring to rotate; a sealing mechanism, mounted on at least one of the at least two rotation sheets and configured to heat a portion of the litter bag. The rotation ring is configured to: rotate to drive the at least two rotation sheets to move towards a center of the dropping opening and clamp the litter bag; or to drive the at least two rotation sheets to move away from each other to open the dropping opening.

20 Claims, 47 Drawing Sheets

(56) References Cited

U.S. PATENT DOCUMENTS

| | | | | |
|---|---|---|---|---|
| 7,757,437 B2* | 7/2010 | Schulte | ............... | E05D 15/1021 |
| | | | | 49/411 |
| 8,266,871 B1* | 9/2012 | Stravitz | .................... | B65F 1/16 |
| | | | | 53/567 |
| 8,752,723 B2* | 6/2014 | Lucas | .................... | B65F 1/062 |
| | | | | 220/495.07 |
| 8,910,821 B1* | 12/2014 | Stravitz | .................. | B65F 1/163 |
| | | | | 220/495.08 |
| 9,750,225 B1* | 9/2017 | Makins | ................ | A01K 1/0107 |
| 2004/0134128 A1* | 7/2004 | Berry | ........................ | E06B 3/80 |
| | | | | 49/366 |
| 2006/0010837 A1* | 1/2006 | Jurus | .................... | B65F 1/1607 |
| | | | | 53/436 |
| 2010/0043717 A1* | 2/2010 | Walker | ................ | A01K 1/0114 |
| | | | | 119/167 |
| 2010/0095898 A1* | 4/2010 | Cook | .................. | A01K 1/0114 |
| | | | | 119/166 |
| 2011/0185976 A1* | 8/2011 | Egy | ...................... | A01K 1/0114 |
| | | | | 119/161 |
| 2013/0108196 A1* | 5/2013 | Mitsui | ................ | H04M 1/0237 |
| | | | | 384/40 |
| 2013/0310173 A1* | 11/2013 | Joko | ........................ | A63F 13/24 |
| | | | | 463/31 |
| 2014/0069343 A1* | 3/2014 | Loveday | .............. | A01K 1/0132 |
| | | | | 119/166 |
| 2019/0381747 A1* | 12/2019 | Qiu | .................... | B29C 65/7433 |
| 2020/0015449 A1* | 1/2020 | Volin | .................... | A01K 1/0107 |
| 2020/0305383 A1* | 10/2020 | Huang | .................. | A01K 1/011 |
| 2023/0051699 A1* | 2/2023 | Okawa | .................. | A01K 1/011 |
| 2023/0103710 A1* | 4/2023 | Fan | ...................... | A01K 1/0146 |
| | | | | 119/166 |
| 2023/0219748 A1* | 7/2023 | Ye | ........................ | B65F 1/1405 |
| | | | | 220/495.08 |

* cited by examiner

US 12,446,540 B1

LITTER BAG SEALING DEVICE AND CAT LITTER BOX

CROSS-REFERENCE TO RELATED APPLICATIONS

The present application claims the priorities of: Chinese design application No. 202430522479.X, filed on Aug. 16, 2024; Chinese patent application No. 202422824076.8, filed on Nov. 19, 2024; Chinese patent application No. 202411658416.2, filed on Nov. 19, 2024; Chinese patent application No. 202422958415.1, filed on Nov. 29, 2024; Chinese patent application No. 202411754316.X, filed on Nov. 29, 2024; Chinese patent application No. 202422958384.X, filed on Nov. 29, 2024; Chinese patent application No. 202411754290.9, filed on Nov. 29, 2024; Chinese patent application No. 202423286544.7, filed on Dec. 30, 2024; and Chinese patent application No. 202411975675.8, filed on Dec. 30, 2024.

TECHNICAL FIELD

The present disclosure relates to the field of devices for pets, and in particular to a litter bag sealing device and a cat litter box.

BACKGROUND

A cat litter box is configured to store cat litter and is mainly for cats to defecate. Urine and solid feces excreted by a cat may clump in the cat litter box, which needs to be collected, and new cat litter needs to be supplied in a timely manner. In the art, the cat litter box may be significantly odorous. This is because clumped cat litter may not be easily separated out of the cat litter box; the clumped cat litter, after being collected may not be taken out of the cat litter box; and used cat litter may not be replaced in time.

SUMMARY OF THE DISCLOSURE

The present disclosure provides a litter bag sealing device, including: a device body, configured to mount a litter bag; a rotation ring, rotatably mounted on the device body, wherein rotation ring defines a dropping opening configured to allow the litter bag to pass through; at least two rotation sheets, rotatably connected to the device body and slidably connected to the rotation ring; a drive mechanism, driveably connected to the rotation ring to drive the rotation ring to rotate; a sealing mechanism, mounted on at least one of the at least two rotation sheets and configured to heat a portion of the litter bag. The rotation ring is configured to: rotate to drive the at least two rotation sheets to move towards a center of the dropping opening and clamp the litter bag; or to drive the at least two rotation sheets to move away from each other to open the dropping opening.

The present disclosure further provides a cat litter box, including: a box body, configured to provide a space for a cat to excrete feces; the litter bag sealing device as described in the above, arranged inside the box body; and an automatic litter supplying device, storing cat litter and communicated with the box body and configured to supply the cat litter to an interior of the box body.

BRIEF DESCRIPTION OF THE DRAWINGS

In order to more clearly illustrate the technical solutions in embodiments of the present disclosure or in the art, the accompanying drawings to be used in the embodiments or in the art will be briefly introduced in the following. Obviously, the following description of the accompanying drawings shows only some of the embodiments of the present disclosure. Any ordinary skilled person in the art may obtain other drawings based on the following drawings without creative work.

DETAILED DESCRIPTION

Figure 1:
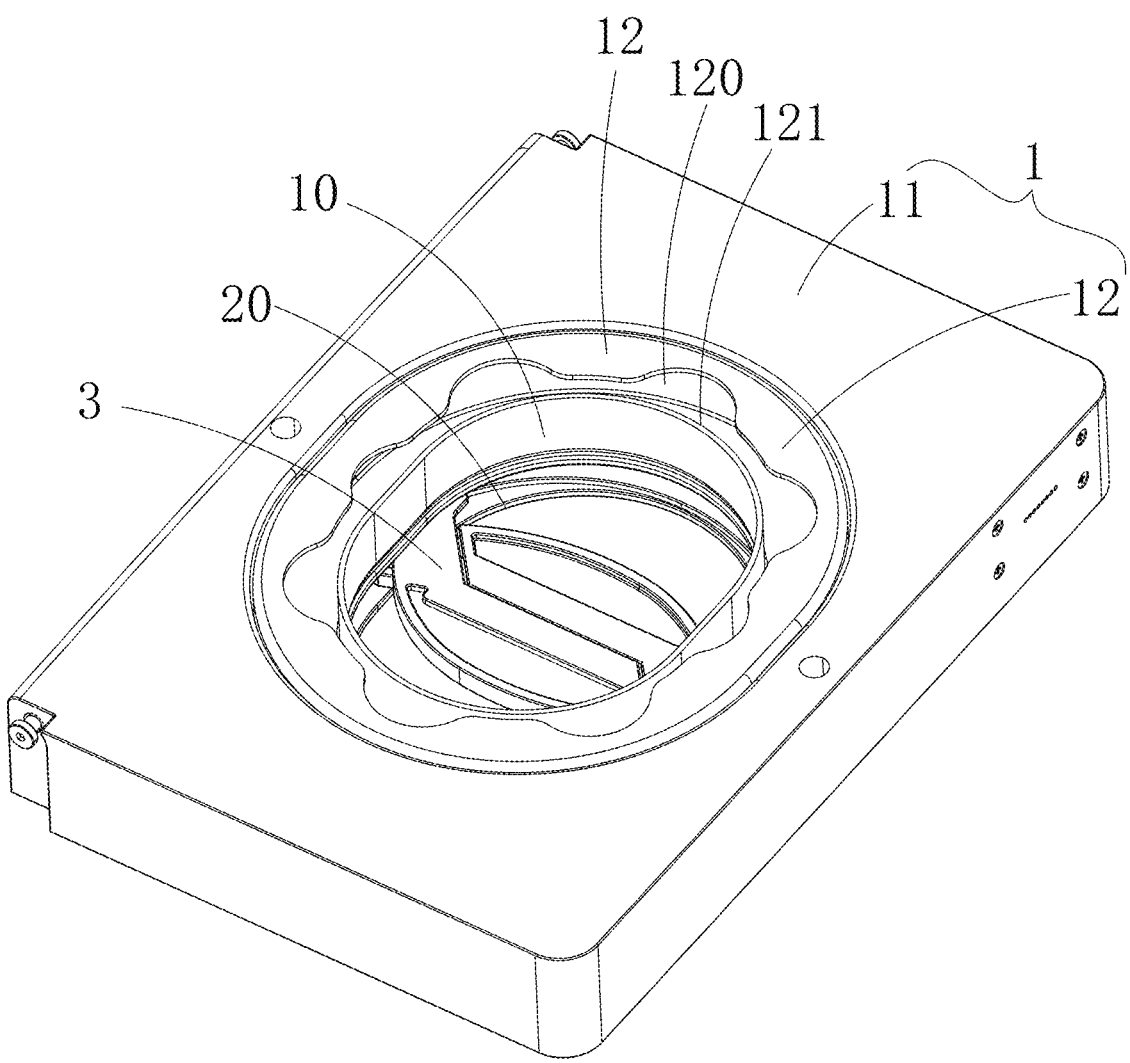
FIG. 1 is a structural schematic view of a litter bag sealing device according to an embodiment of the present disclosure.
Figure 2:
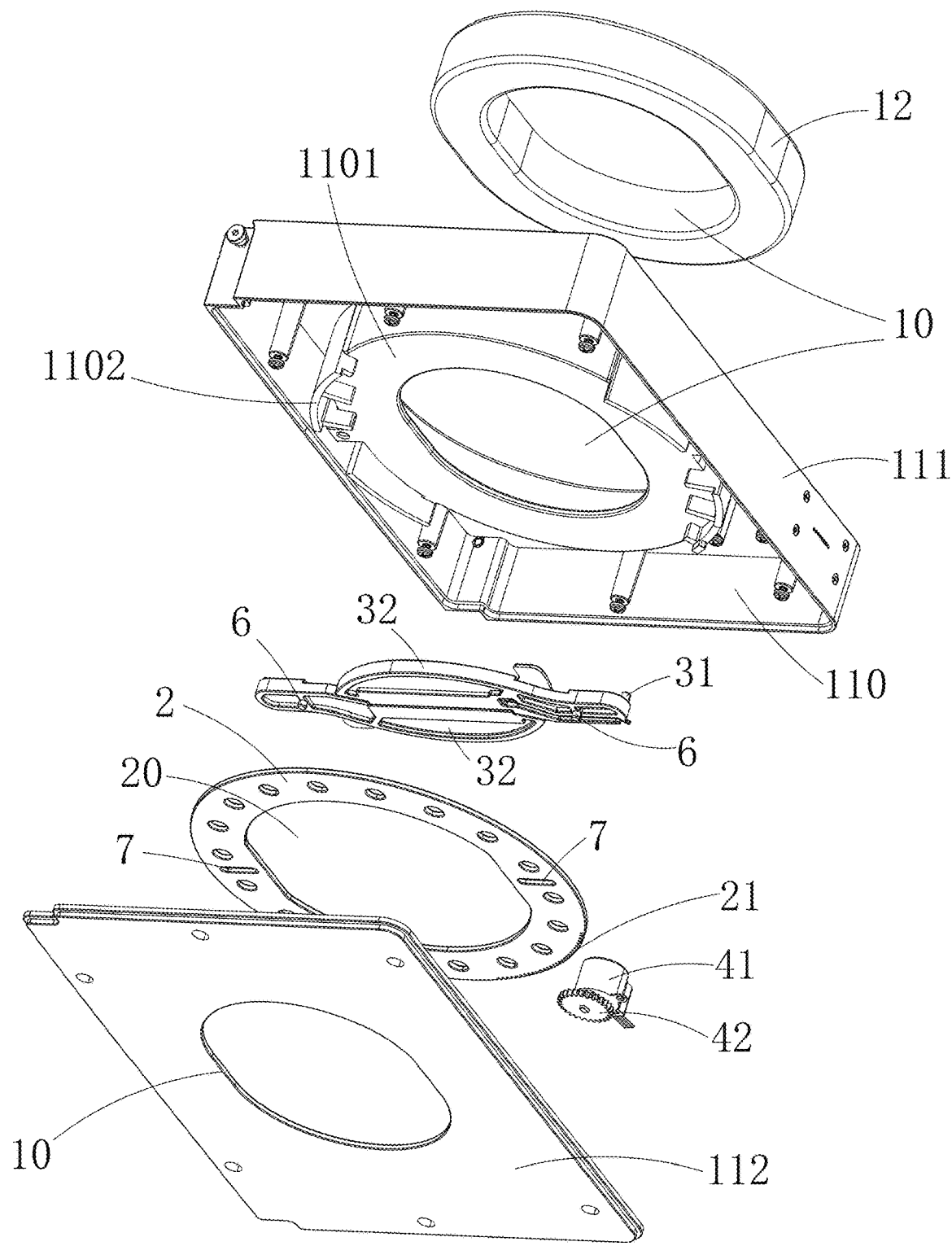
FIG. 2 is an exploded view the the litter bag sealing device according to an embodiment of the present disclosure.
Figure 3:
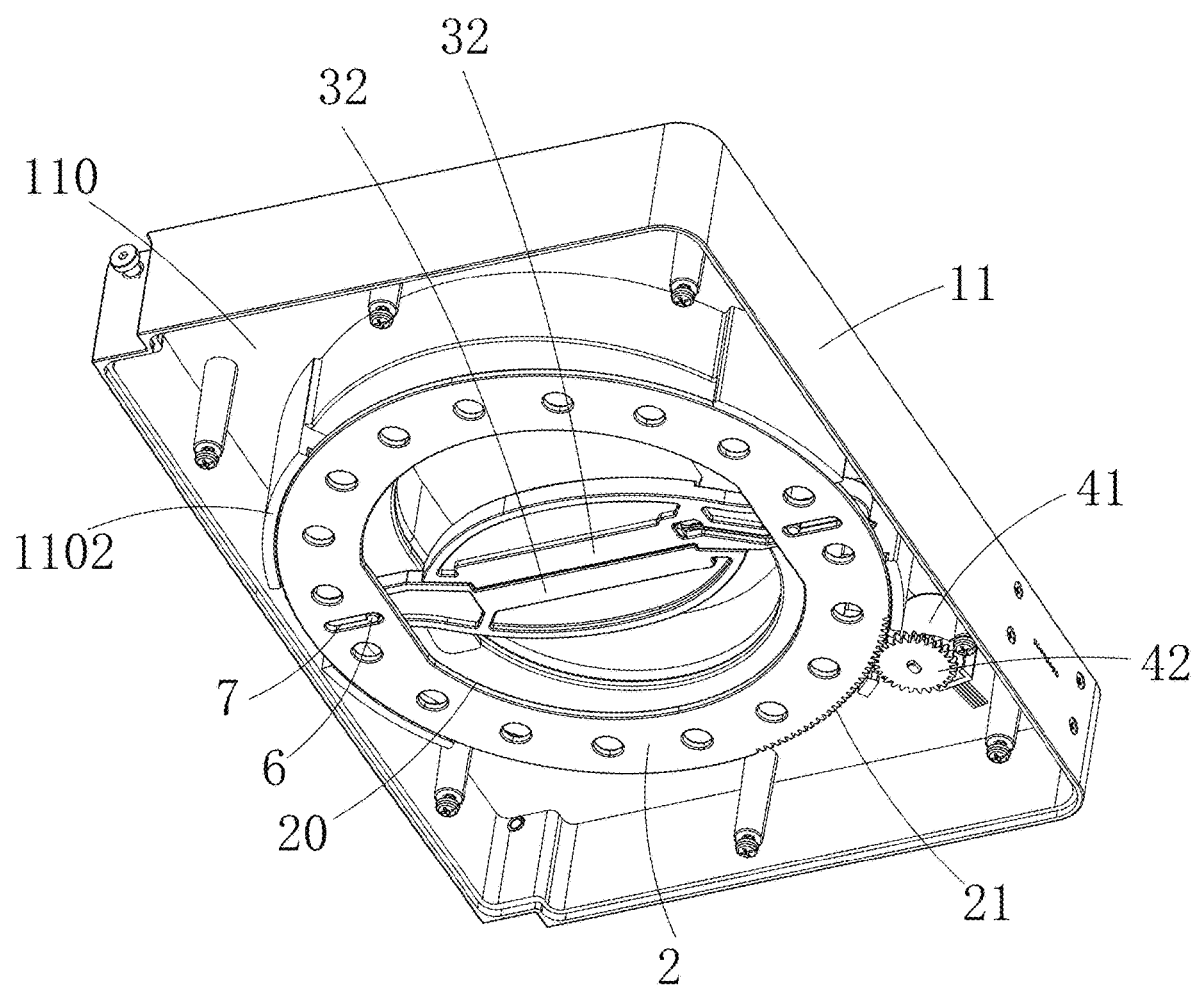
FIG. 3 is a structural schematic view of a rotation ring, rotation sheets, and a rotation mechanism arranged inside a mounting cavity according to an embodiment of the present disclosure.

Unless otherwise defined, all technical and scientific terms used herein have the same meanings as being commonly understood by any ordinary skilled person in the art. The terms used herein in the specification of the present disclosure are used only for the purpose of describing specific embodiments and shall not be interpreted as limiting the present disclosure. The terms "include" and "have" and any variations thereof, used in the specification, claims and the drawings of the present disclosure are intended to cover non-exclusive embodiments. The terms "first", "second", and so on in the specification, claims and the accompanying drawings of the present disclosure are used to distinguish between different objects and are not used to describe a particular order.

Reference to "embodiments" herein implies that particular features, structures, or characteristics described in an embodiment may be included in at least one embodiment of the present disclosure. The presence of the phrase at various sections in the specification does not necessarily refer to the same embodiment, nor a separate or alternative embodiment that is mutually exclusive of other embodiments. It is understood by any ordinary skilled person in the art, both explicitly and implicitly, that the embodiments described herein may be combined with other embodiments.

In order to allow any ordinary skilled person in the art to better understand the embodiments of the present disclosure, technical solutions in the embodiments of the present disclosure will be clearly and completely described below by referring to the accompanying drawings.

Specifically, as shown in FIGS. 1 to 14, the letter bag sealing device of the present disclosure includes a body portion 1, a rotation ring 2, at least two rotation sheets 3, a drive mechanism 4 and a sealing mechanism 5.

Figure 4:
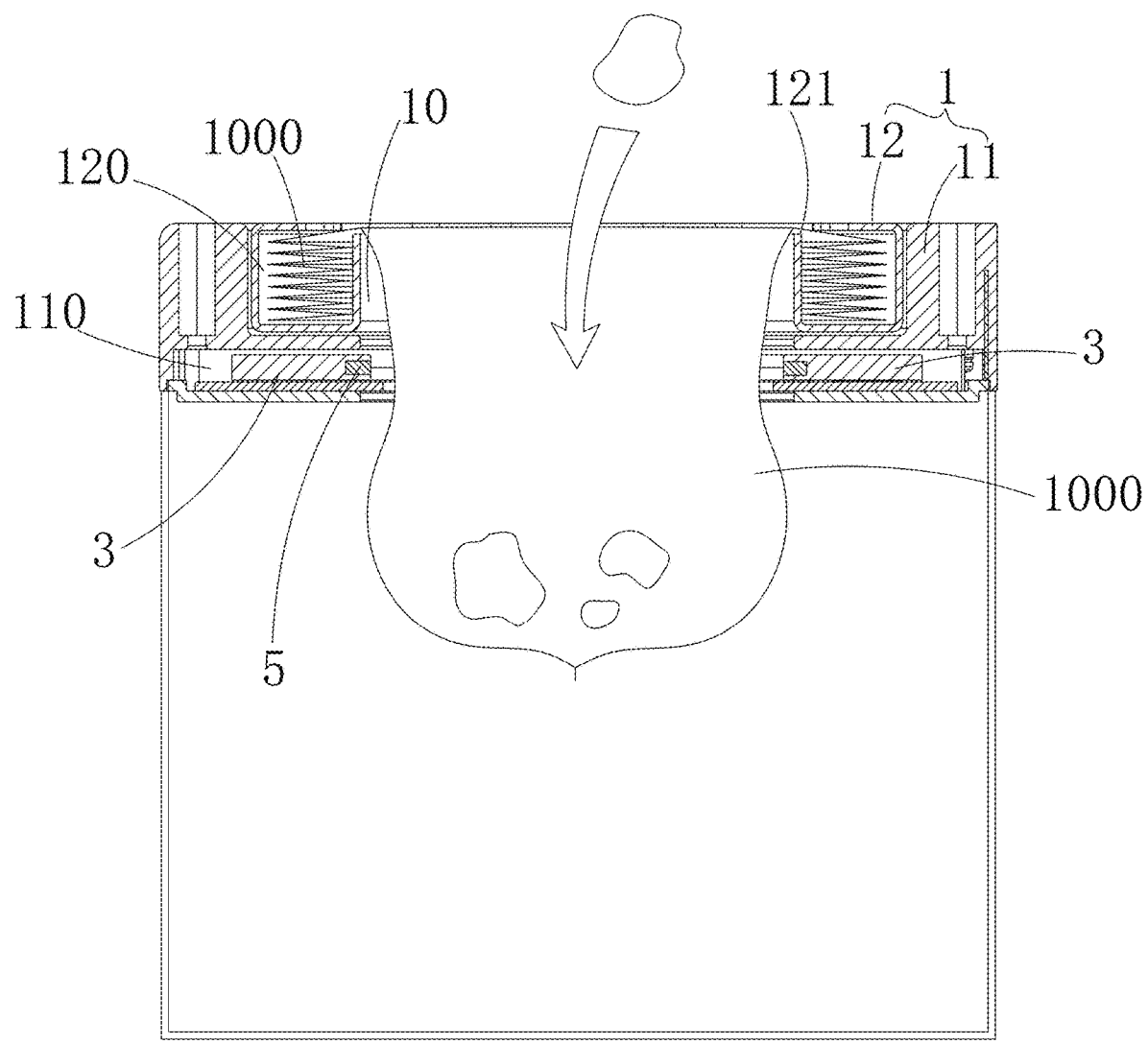
FIG. 4 is a structural schematic view of the litter bag sealing device when being used according to an embodiment of the present disclosure.

A litter bag 1000 is configured to be mounted in the body portion 1. The body portion 1 defines a litter channel 10 allowing the litter bag 1000 to pass through. Specifically, the body portion 1 includes a housing 11 and an annular receiving member 12. The litter channel 10 extends through the body portion 1 and the receiving member 12. The litter bag 1000 may be a continuous cylindrical litter bag 1000 and is folded and received in the receiving member 12. The litter bag 1000 is received in the receiving member 12 as shown in FIG. 4. Specifically, a receiving space 120 is defined in the receiving member 12. An opening 121 is located at a side of the receiving space 120 facing towards the litter channel 10. The litter bag 1000 is folded and received in the receiving space 120, passes through the opening 121, and then covers the litter channel 10. A lower portion of the housing 11 is connected to a litter box. The litter channel 10 is communicated with the litter box. The litter bag 1000 is laid in the litter channel 10 to be received in the litter box. The litter may be dropped, along the litter channel 10, to the litter box and is received in the litter bag 1000. A mounting cavity 110 is further defined in the housing 11, and the rotation ring 2, the rotation sheets 3 and the drive mechanism 4 are all at least partially mounted in the mounting cavity 110.

It should be noted that, in order to facilitate mounting the the rotation ring 2, the rotation sheets 3 and the drive mechanism 4, in an embodiment, the housing 11 is formed by a top shell 111 and a base plate 112. The top shell 111 and the base plate 112 cooperatively define the mounting cavity 110. The receiving member 12 is detachably mounted on the top shell 111, such that the receiving member 12 and the litter bag 1000 stored in the receiving member 12 can be replaced easily. After opening the base plate 112, the rotation ring 2, the rotation sheets 3, and the drive mechanism 4 may be mounted to the top shell 111 easily. Furthermore, the base plate is fixed to a bottom of the top shell 111 by bolts, so as to seal the mounting cavity 110. Specifically, a downwardly-extending mounting protrusion 1101 is arranged inside the top shell 111. The litter channel 10 extends through the mounting protrusion 1101. A plurality of downwardly-extending limiting protrusions 1102 are arranged at an outer edge of the mounting protrusion 1101. The plurality of limiting protrusions 1102 abut against the base plate 112. The rotation ring 2 is rotatably mounted between the mounting protrusion 1101 and the base plate 112. The plurality of limiting protrusions 1102 are configured to prevent the rotation ring 2 from deflecting horizontally, such that a position of the rotation ring 2 is fixed.

Specifically, the rotation ring 2 is rotatably mounted in the housing 11, the rotation ring 2 defines a dropping opening 20 allowing the litter bag 1000 to extend through. The litter channel 10 passes through the dropping opening 20, i.e., the rotation ring 2 surrounds the litter channel 10, and a rotation axis of the rotation ring 2 is located in the litter channel 10. The at least two rotation sheets 3 are distributed along a circumference of the rotation ring 2. Each of the at least two rotation sheets 3 includes a rotation end 31 and an operating end 32. The rotation end 31 of each of the at least two rotation sheets 3 is located in the mounting cavity 110 and is rotatably mounted on the housing 11. The operating end 32 of each of the at least two rotation sheets 3 is slidably mounted on the rotation ring 2. The drive mechanism 4 is mounted in the mounting cavity 110 and is driveably connected to the rotation ring 2 to drive the rotation ring 2 to rotate around the litter channel 10. Rotation of the rotation ring 2 drives the operating ends 32 of the at least two rotation sheets 3 to move towards a center of the dropping opening 20 to clamp the litter bag 1000; or drives the operating ends 32 of the at least two rotation sheets 3 to move away from each other to open the dropping opening 20.

The sealing mechanism 5 is mounted on the operating end 32 of at least one of the rotation sheets 3, and the sealing mechanism 5 is configured to heat the litter bag 1000. In some embodiment, the sealing mechanism 5 is arranged on each rotation sheet 3. When the litter bag sealing device is operating, firstly, the rotation ring 2 rotates to drive all rotation sheets 3 to move towards the center of the dropping opening 20 to clamp the litter bag 1000. During the rotation sheets 3 moving towards the center of the dropping opening 20, a size of an opening of the litter bag 1000 is reduced. Subsequently, the sealing mechanism 5 starts operating to heat a portion of the litter bag near the opening of the litter bag 1000, such that the portion of the litter bag is melted to be sealed. When a heating time length of the sealing mechanism 5 increases, the litter bag 1000 may be cut off. In addition, when the sealing mechanism 5 seals a previous litter bag 1000, a bottom of a next litter bag 1000 is sealed at the same time. After the litter bag is sealed, the rotation ring 2 rotates reversely to drive the rotation sheets 3 to move away from each other, such that the dropping opening 20 is opened again, and a new litter bag 1000 is laid in the litter channel 10, litter may be dropped into the new litter bag 1000.

Therefore, for the litter bag sealing device, it is only needed to drive the rotation ring to rotate forwardly or reversely for a certain angle, the rotation of the rotation ring synchronously drives the plurality of rotation sheets to move together, an operating time length is significantly reduced. In addition, the entire sealing performance is achieved by rotating the rotation ring only, i.e., only one drive mechanism is needed, and therefore, costs are saved.

Further, in regards to the rotation ring 2 driving the rotation sheets 3 to move together, in the present embodiment, the litter bag sealing device further includes at least two slide shafts 6. The number of the at least two slide shafts 6 is equal to the number of the at least two rotation sheets 3. Taking two rotation sheets 3 as an example, two slide shafts 6 are arranged. Each slide shaft 6 is correspondingly mounted on one rotation sheet 3 or mounted on the rotation ring 2. Each slide shaft 6 is configured to enable one rotation sheet 3 to be slidably connected to the rotation ring 2. The slide shaft 6 is offset from a rotation center 311 of the rotation end 31, and that is, the slide shaft 6 cannot be set coaxially with the rotation end 31.

Figure 5:
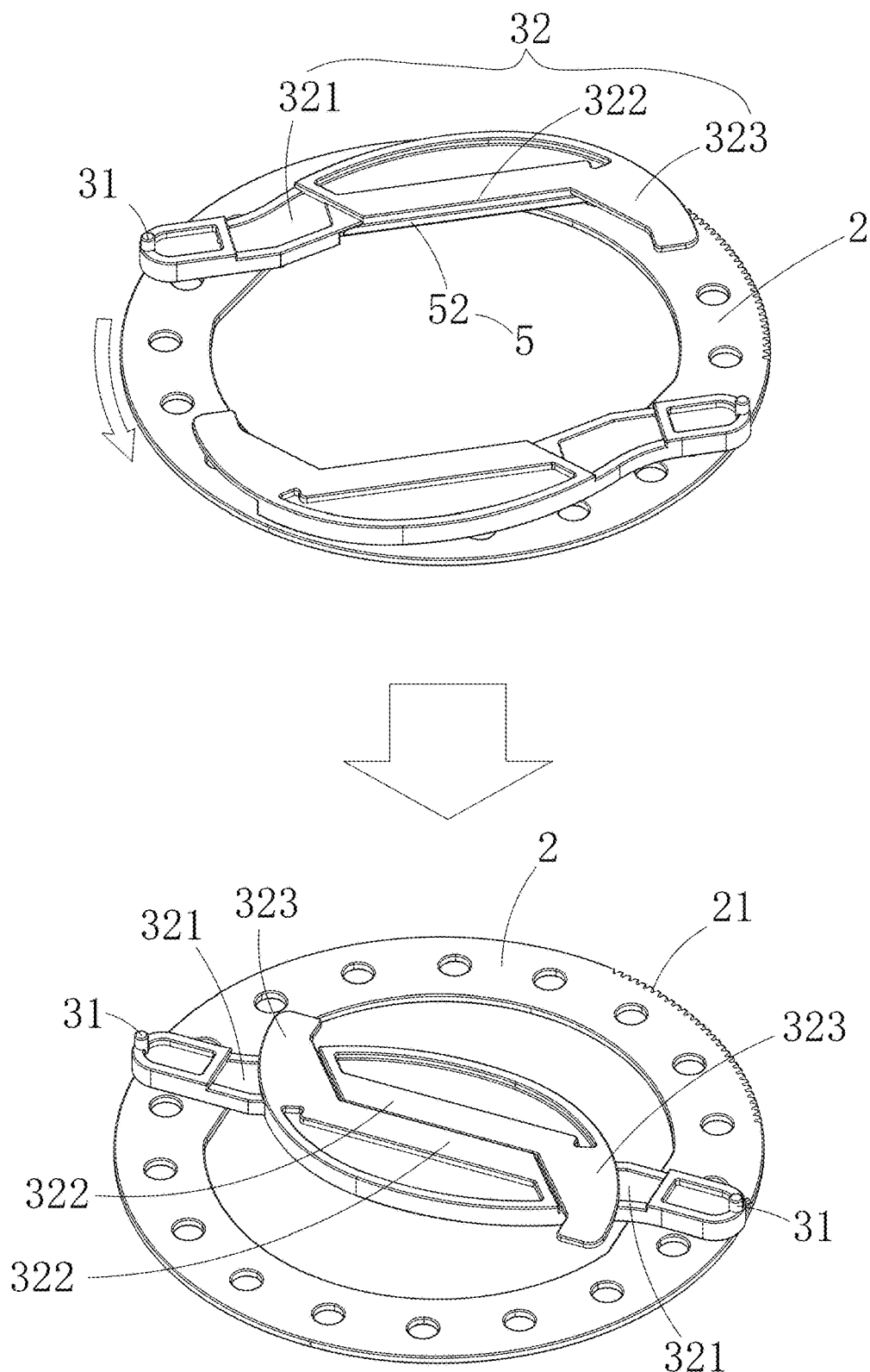
FIG. 5 is a structural schematic view I showing the rotation ring rotating with respect to two rotation sheets according to an embodiment of the present disclosure.
Figure 6:
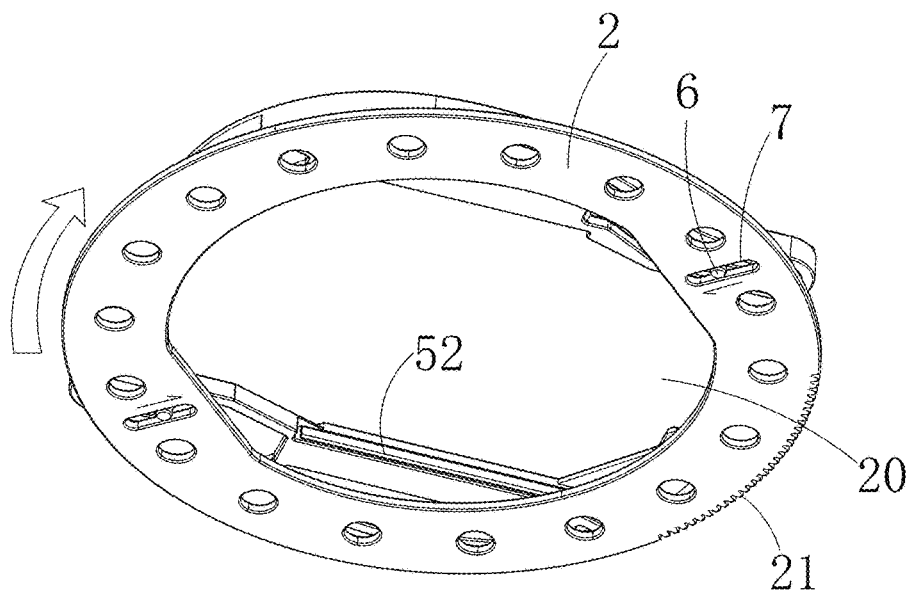
FIG. 6 is a structural schematic view II showing the rotation ring rotating with respect to two rotation sheets according to an embodiment of the present disclosure.
Figure 6:
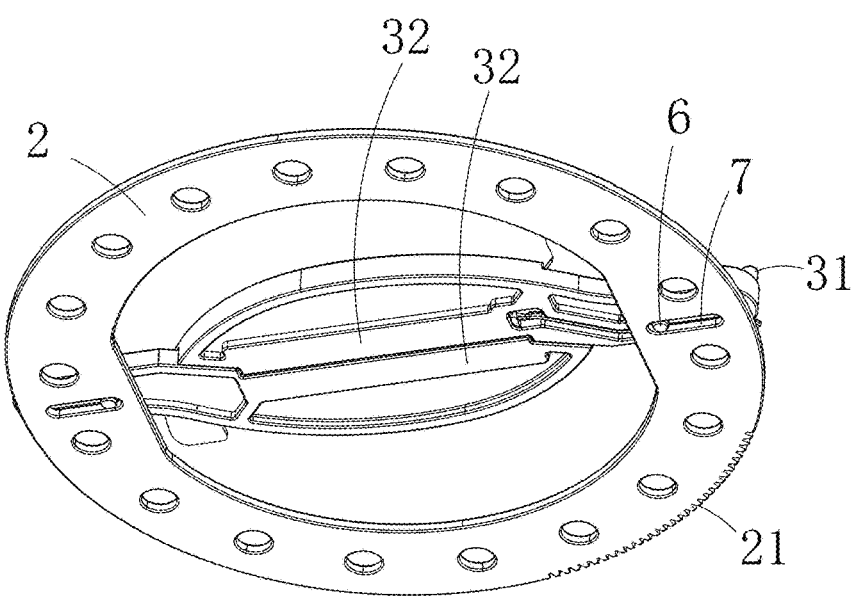

For example, in an embodiment shown in FIGS. 5 and 6, the rotation sheets 3 are located above the rotation ring 2. The rotation end 31 extends upwardly and is inserted into the body portion 1 for rotating. The rotation ring 2 defines a slide hole 7, and the slide hole 7 extends lengthwise towards the dropping opening 20. The slide shaft is mounted on a bottom side of the respective rotation sheet 3 and extends downwardly to be inserted in the slide hole 7 and be slidable along the slide hole 7. Specifically, in an initial state, the two rotation sheets 3 move away from each other, enabling the dropping opening 20 to be open, and in this case, the slide shaft is located at an end of the slide hole 7 away from the dropping opening 20. When the rotation ring 2 rotates in a forward direction, the slide shafts are driven to move in forward direction to drive the rotation sheets 3 to swing in a forward direction to be closed to each other. Since a relative position between the slide shafts and the rotation ring 2 is changed, the slide shafts slide along the slide holes 7 towards the dropping opening 20. When the rotation ring 2 rotates reversely, the slide shafts are driven to move in a reverse direction to drive the rotation sheets 3 to swing in a reverse direction to open the dropping opening 20. Similarly, since the relative position between the slide shafts and the rotation ring 2 is changed, the slide shafts move back to the initial position along the slide holes 7.

Figure 7:
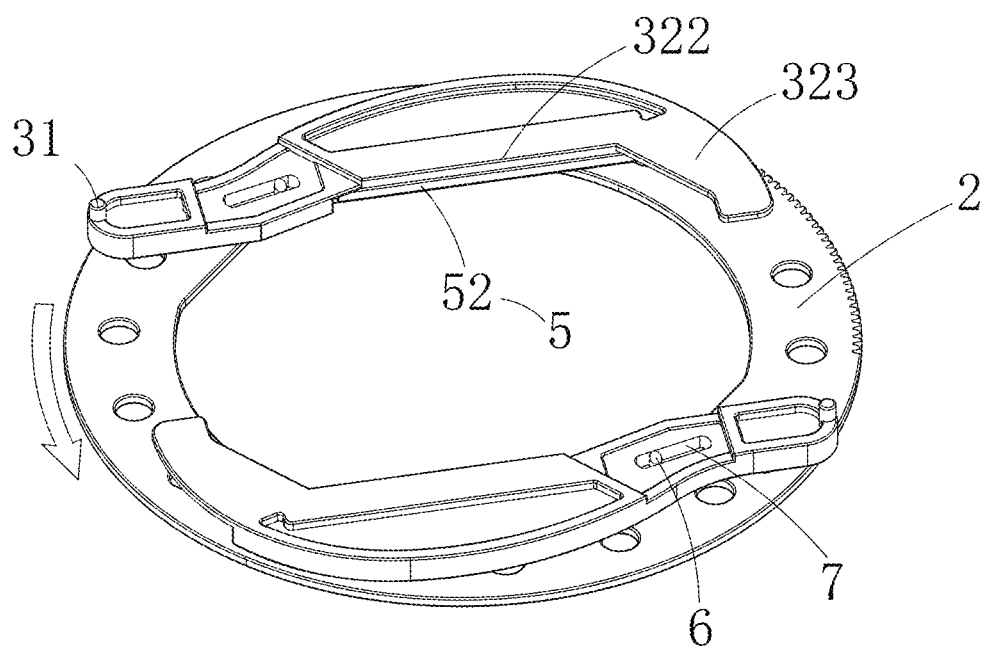
FIG. 7 is a structural schematic view showing the rotation ring rotating with respect to two rotation sheets according to another embodiment of the present disclosure, where a slide shaft is arranged each rotation sheet and a slide hole is defined in each rotation sheet.

For example, in another embodiment shown in FIG. 7, each rotation sheet 3 is located above the rotation ring 2, the rotation end 31 extends upwardly and is inserted into the body portion 1 for rotating. The slide shaft is extending upwardly to be arranged on the rotation ring 2. The slide hole 7 is defined in the operating end 32 of the rotation sheet 3, the slide hole 7 extends lengthwise in a direction at which the operating end 32 is arranged. The slide shaft 6 is inserted into the slide hole 7 and is slidable along the slide hole 7. Being different from the above embodiment, in the present embodiment, positions of the slide shaft 6 and the slide hole 7 are switched.

Figure 8:
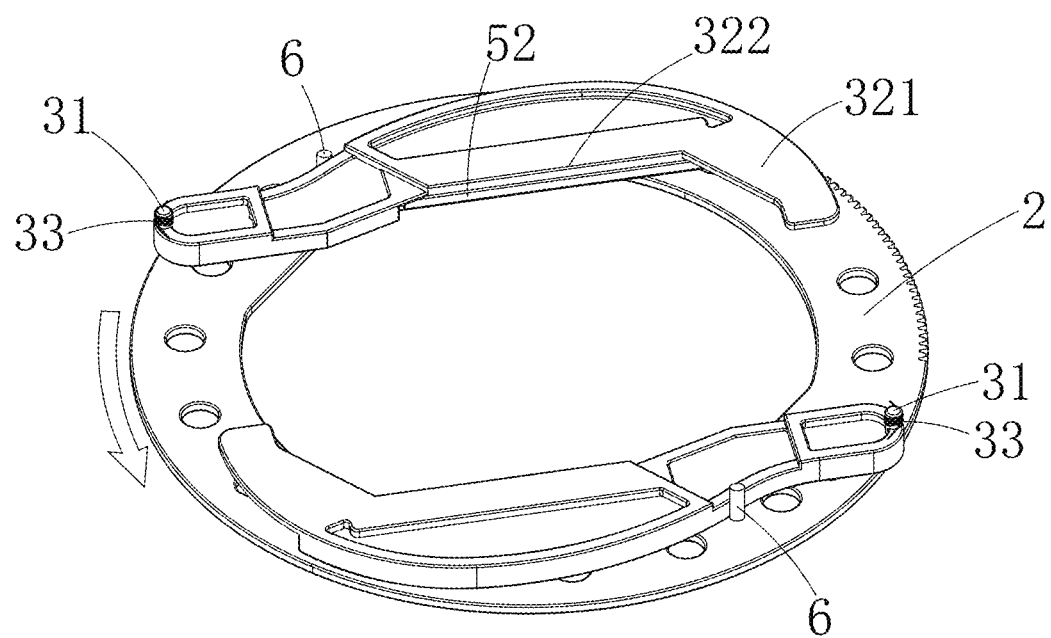
FIG. 8 is a structural schematic view of the rotation ring rotating with respect to two rotation sheets according to another embodiment of the present disclosure, where the slide shaft abuts against an outer wall of each rotation sheet and a spring sleeves a rotation end.

For example, in an embodiment shown in FIG. 8, each rotation sheet 3 is located above the rotation ring 2, and the rotation end 31 extends upwardly and is inserted into the body portion 1 for rotation. A torsion spring 33 sleeves the rotation end 31, and the torsion spring 33 connects the rotation sheet 3 to the housing 11. The slide shaft extends upwardly and is arranged on the rotation ring 2. The slide shaft abuts against an outer wall of the rotation sheet 3. The slide shaft 6 slides along the outer wall of the rotation sheet 3. Specifically, when the rotation ring 2 rotates in the forward direction, the slide shaft exerts a pressure on the outer wall of the rotation sheet 3 to drive the operating end 32 of the rotation sheet 3 to swing towards the center of the dropping opening 20, and at the same time, the torsion spring 33 is driven to be elastically deformed. When the rotation ring 2 rotates in the reverse direction, an elastic force of the deformed torsion spring 33 drives the rotation sheet 3 to be reset to open the dropping opening 20.

In other embodiments, the rotation sheets may be disposed below the rotation ring 2, and the rest of configuration may be referred to the above embodiments.

Further, in the present embodiment, the drive mechanism 4 includes a motor 41 and a drive gear 42. The motor 41 is fixedly mounted in the mounting cavity 110, and the drive gear 42 is mounted on an output shaft of the motor 41. The housing 11 is arranged with a limiting structure configured to limit a position of the rotation ring 2, enabling the rotation ring 2 to only rotate around the litter channel 10. Follower teeth 21 are arranged on a circumference of the rotation ring 2. The follower teeth 21 mesh with the drive gear 42, such that the rotation ring 2 is driven by the drive gear 42 to rotate.

Further, the number of the at least two rotation sheets 3 is an even number, and every two rotation sheets 3 of the at least two rotation sheets 3 form one sealing gate 300. The two rotation sheets 3 in each sealing gate 300 are centro-symmetrically distributed around the rotation ring 2. A plurality of sealing gates 300 are staggered to each other and laminated in a vertical direction.

For example, in an embodiment shown in FIG. 5, two rotation sheets 3 are mounted on the rotation ring 2, i.e., one sealing gate 300 is arranged.

Figure 9:
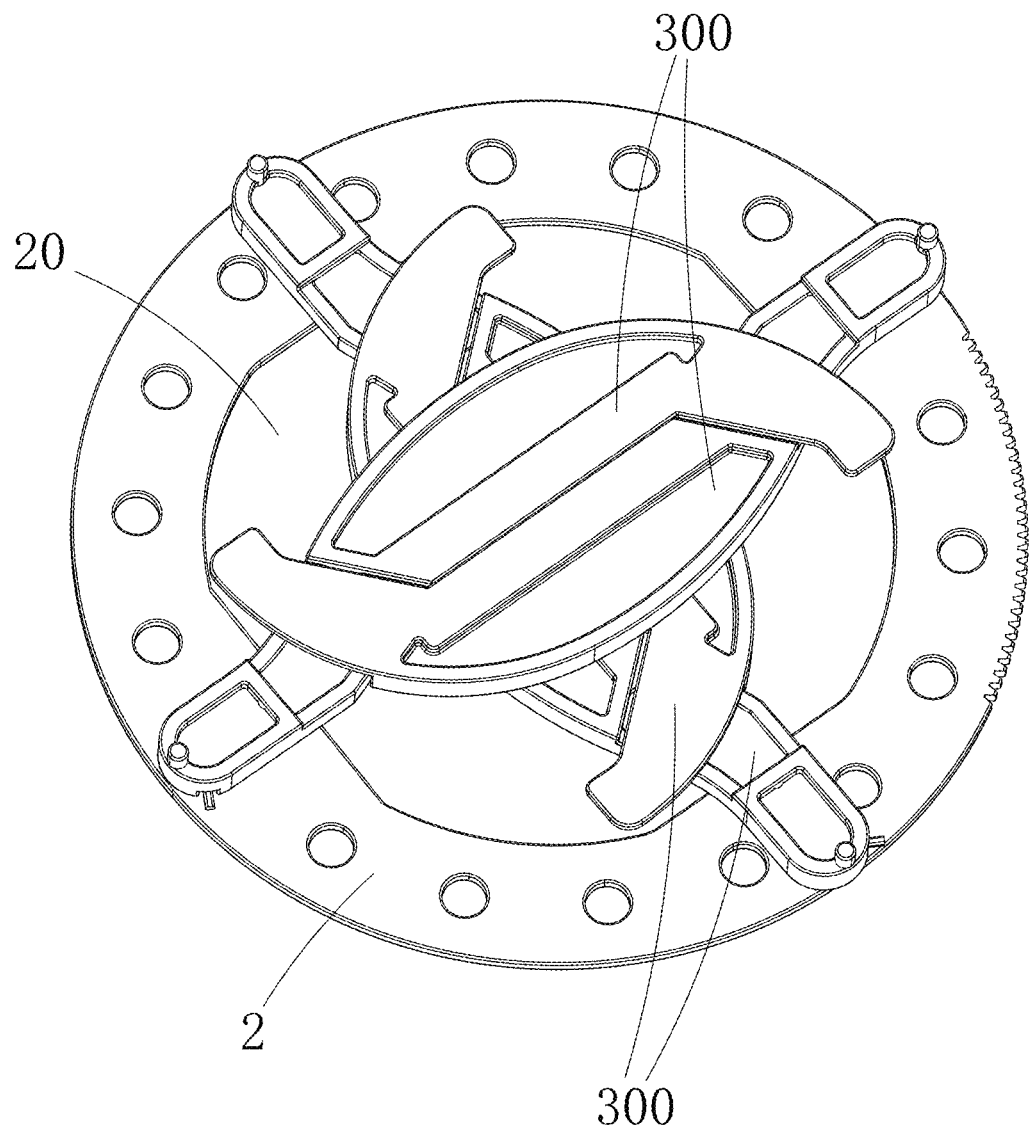
FIG. 9 is a structural schematic view of arranging two sets of sealing gates according to an embodiment of the present disclosure.

For example, in another embodiment shown in FIG. 9, four rotation sheets 3 are arranged on the rotation ring 2, and that is, a total of two sealing gates 300 are arranged. An angle of 90° is formed between the two sealing gates 300, and one of the two sealing gates 300 is located above the other one of the two sealing gates 300.

Figure 10:
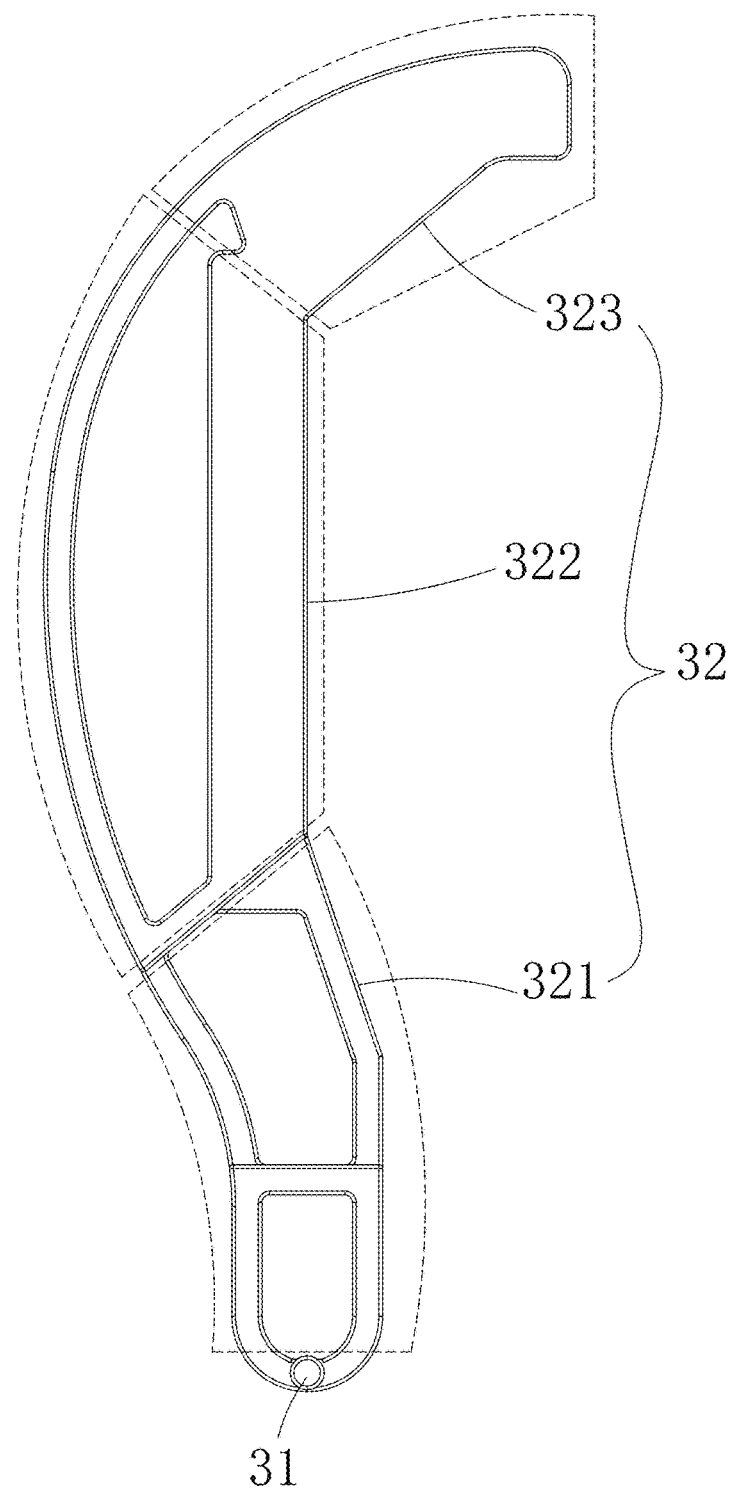
FIG. 10 is a structural schematic view of the rotation sheet according to an embodiment of the present disclosure.

Further, each sealing gate 300 has a total of two operating ends 32 and two rotation ends 31. The two operating ends 32 are bent towards the center of the dropping opening 20 to form a C-shaped or a hook-like structure to close up the litter bag 1000 and to reduce a length of the opening of the litter bag 1000. As shown in FIG. 10, each of the two operating ends 32 includes a connection section 321, an abutting section 322, and a guiding section 323 that are connected to each other in sequence. Each connection section 321 is connected to the corresponding rotation end 31, and abutting sections 322 of the two operating ends 32 abut against each other. When the abutting sections 322 of the two operating ends 32 abut against each other, the guiding section 323 of one operating end 32 is located above and staggered with the connection section 321 of the other operating end 32, such that a structure as shown in FIG. 5 or 9 is formed. The guiding section 323 and the connection section are inclined and are cooperatively configured to guide the litter bag 1000 to be closed up towards the abutting section 322. The sealing mechanism 5 is arranged on the abutting section 322 to melt a portion of the litter bag 1000 for sealing.

Figure 11:
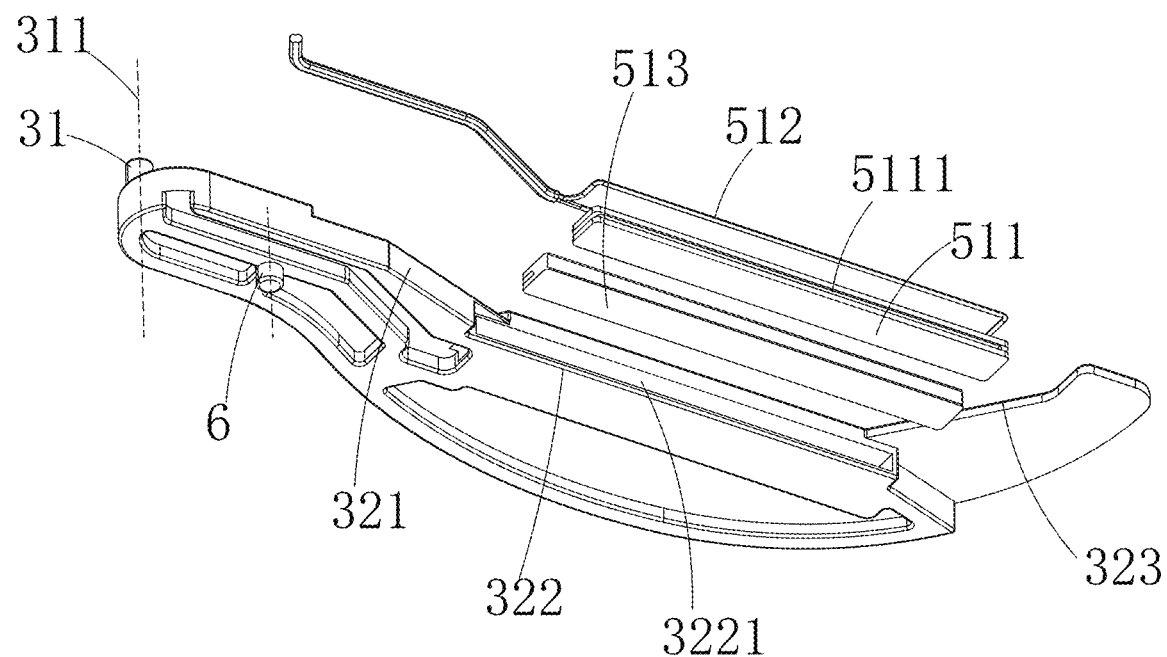
FIG. 11 is a structural schematic view of arranging a heating member on one rotation sheet according to an embodiment of the present disclosure.
Figure 12:
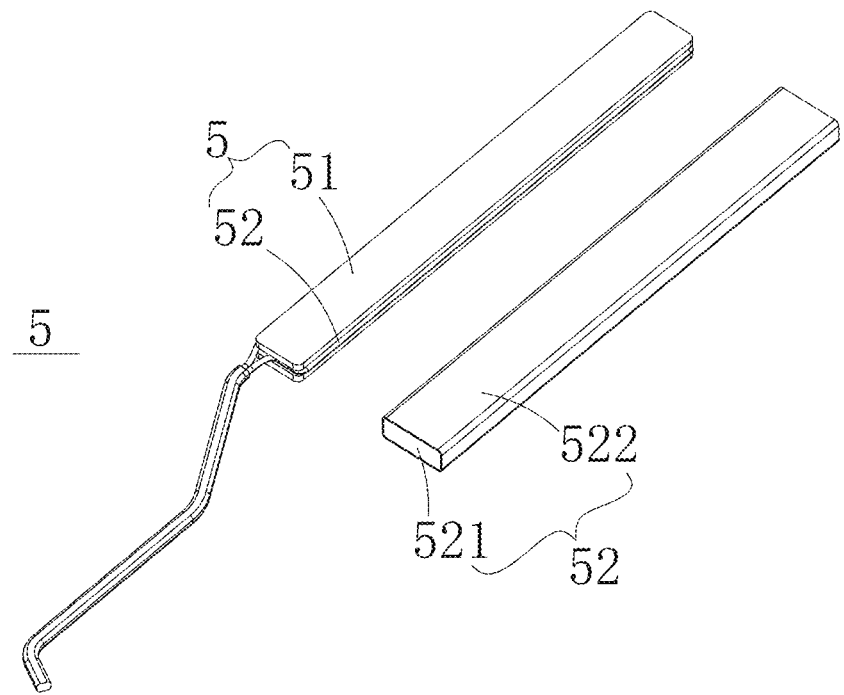
FIG. 12 is a structural schematic view of arranging an abutting member on one rotation sheet according to an embodiment of the present disclosure.
Figure 13:
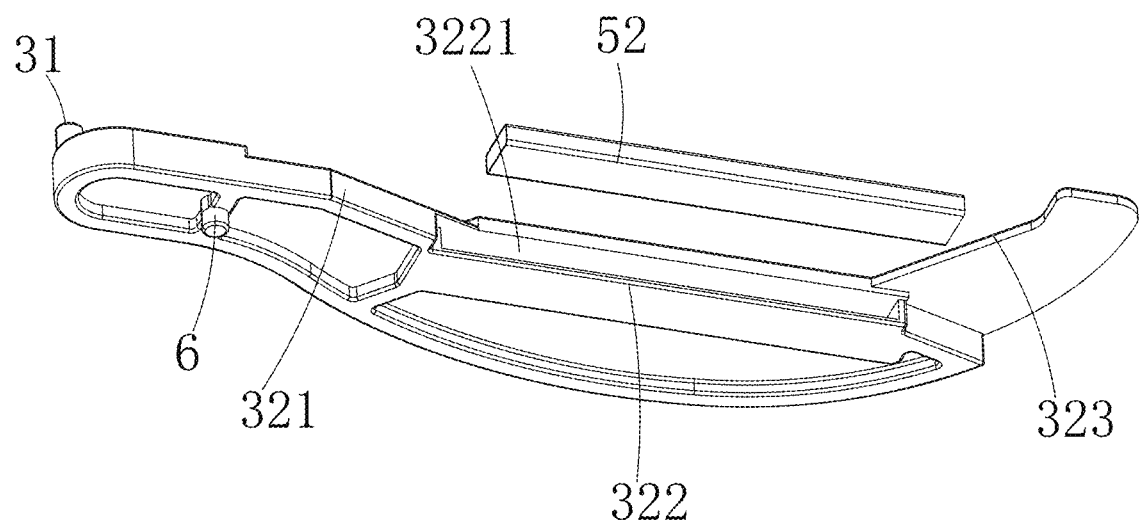
FIG. 13 is a structural schematic view of the heating member and the abutting member included in the sealing mechanism according to an embodiment of the present disclosure.

Further, the sealing mechanism 5 is mounted on at least one sealing gate 300. Specifically, the number of sealing mechanisms 5 is the same as the number of sealing gates 300. That is, each sealing gate 300 is mounted with one sealing mechanism 5. As shown in FIGS. 11 to 13, the sealing mechanism 5 includes a heating member 51 and an abutting member 52. The heating member 51 is mounted on the operating end 32 of one rotation sheet 3 of the sealing gates 300, and the abutting member 52 is mounted on the operating end 32 of the other one rotation sheet 3 of the sealing gates 300. The heating member 51 and the abutting member 52 abut against each other to cooperatively clamp the litter bag 1000. The heating member 51, after being heated up, thermally melt the portion of the litter bag 1000 that is clamped for sealing. The abutting member 52 is substantially configured to increase a contact pressure between the heating member 51 and the litter bag 1000. It should be noted that a power supply source and a controller may be arranged inside or outside the body portion 1 to control the heating member 51 to start or stop operating, and to control the motor 41 to start or stop operating.

Further, the heating member 51 includes a fixing strip 511 and a heating wire 512 wound on the fixing strip 511. The fixing strip 511 is embedded in the abutting section 322 of one rotation sheet 3, and the abutting member 52 is embedded in the abutting section 322 of the other rotation sheet 3. The two abutting sections 322 abut against each other via the heating wire 512 and the abutting member 52. Each abutting section 322 defines one embedding groove 3221, and an opening of the embedding groove 3221 of one abutting section 322 faces towards the other abutting section 322. The fixing strip 511 and the abutting member 52 are respectively embedded in two embedding grooves 3221 of the two abutting sections 322.

Specifically, the rotation sheet 3 is made of a plastic material resistant to high temperatures. The heating member 51 further includes a first heat-insulating layer 513 wrapping the fixing strip 511 and the heating wire 512. The fixing strip 511 defines a wire-winding groove 5111 along a circumference of the fixing strip 511. The heating wire 512 is wound and received in the wire-winding groove 5111. The first heat-insulating layer 513 is a Teflon tape (heat-resistant material). The first heat-insulating layer 513 wraps around the fixing strip 511, and the heating wire 512 of one rotation sheet 3 is exposed from only one side of the first heat-insulating layer 513 facing towards the other rotation sheet 3. The first heat-insulating layer 513 is substantially configured to prevent the heating wire 512 from melting off the rotation sheet 3.

In addition, the abutting member 52 includes a soft base layer 521 and a second heat-insulating layer 522 wrapping the soft base layer 521. The soft base layer 521 is made of rubber. The second heat-insulating layer 522 is made of the Teflon tape. The heating wire 512 abuts against the second heat-insulating layer 522, the heating wire 512 and the second heat-insulating layer 522 cooperatively clamp the litter bag 1000. The soft base layer 521 is configured to provide a soft contact for the heating wire 512 and the abutting member 52 to prevent the heating wire 512 from being damaged. The second heat-insulating layer 522 is substantially configured to prevent the heating wire 512 from melting off the soft base layer 521.

Figure 14:
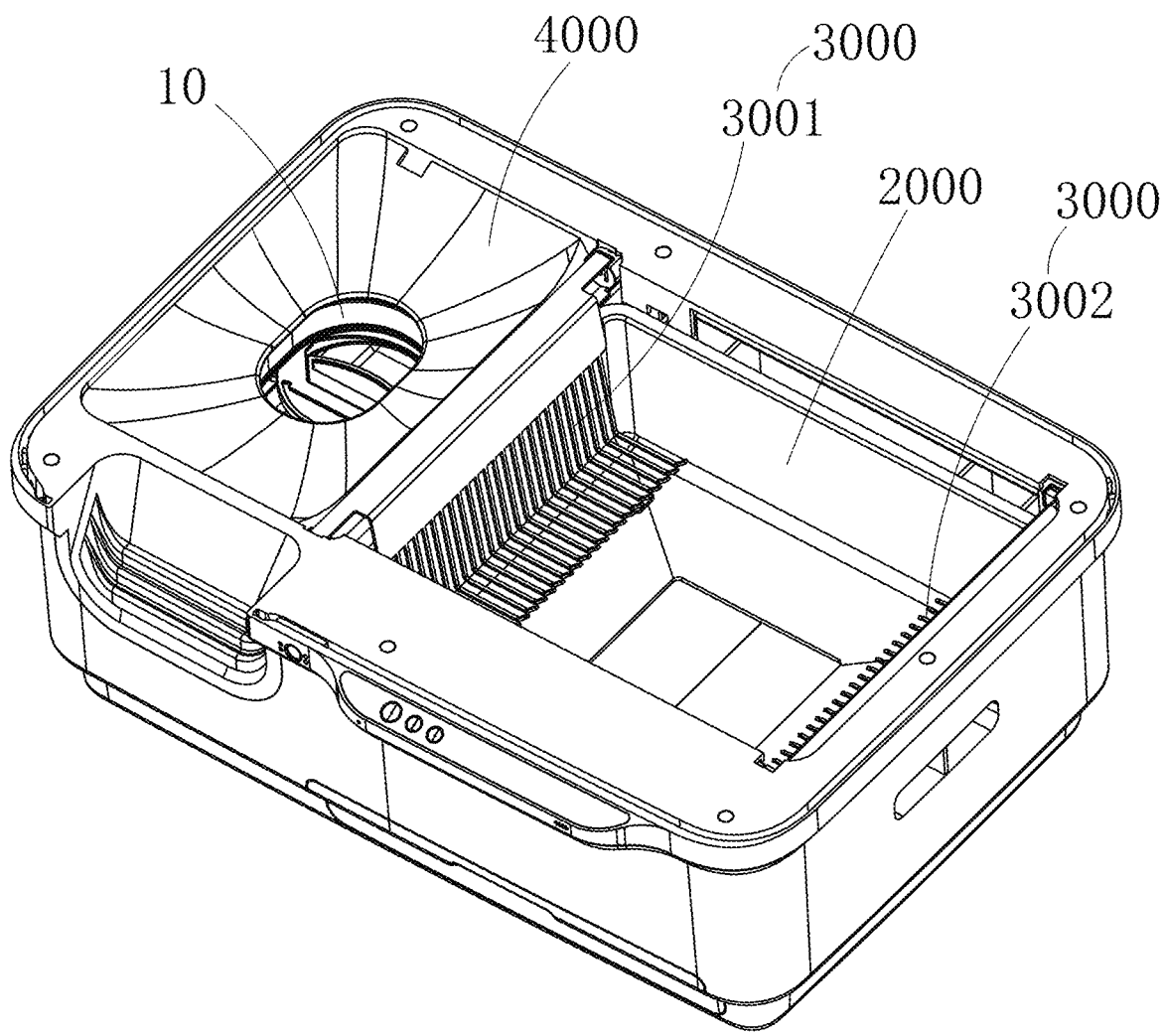
FIG. 14 is a structural schematic view of a cat litter box formed by the litter bag sealing device and a box body being assembled with each other, according to an embodiment of the present disclosure.
Figure 15:
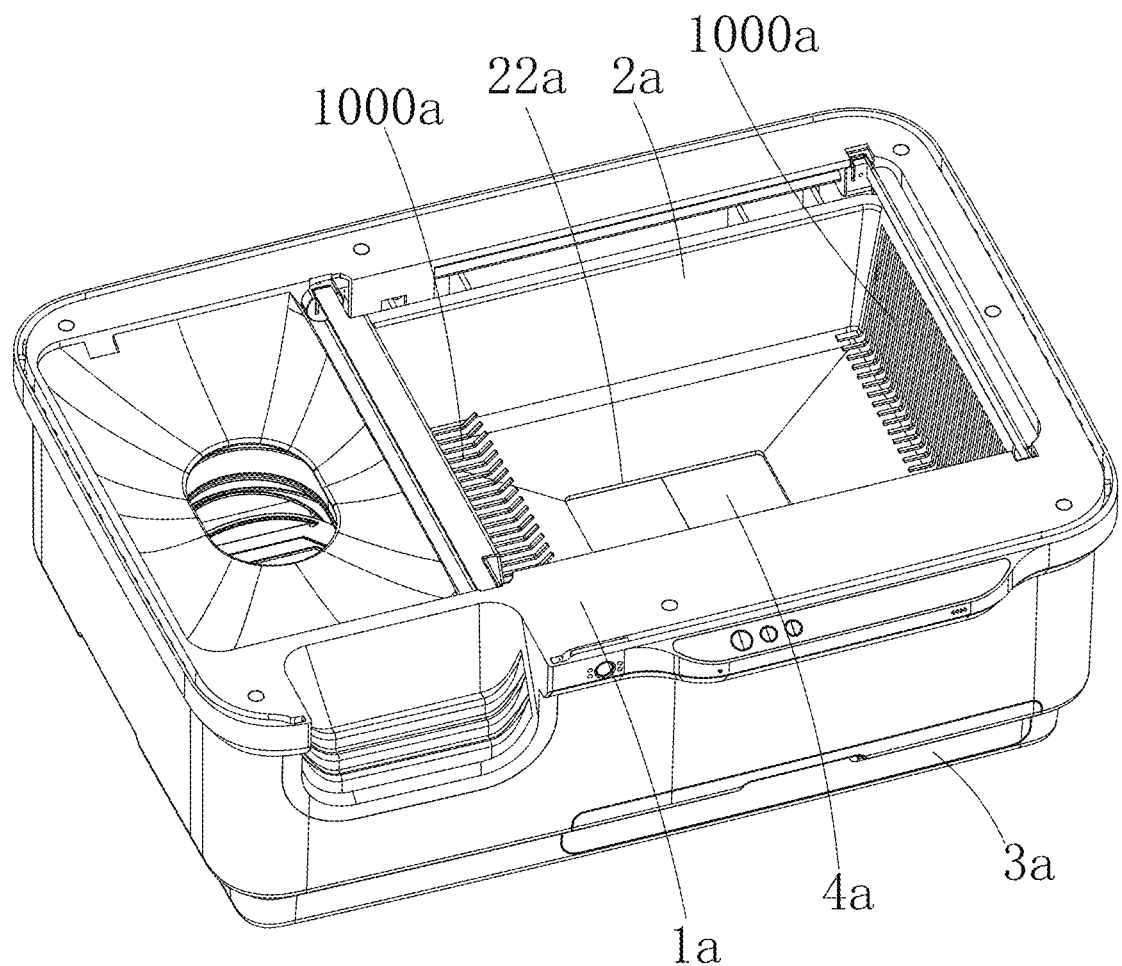
FIG. 15 is a structural schematic view I of a cat litter box according to an embodiment of the present disclosure, where a lower box body is in a first state.

As shown in FIG. 14, the litter bag sealing device, as described above, may be mounted on a side of the cat litter box 2000 or inside the cat litter box, and the litter channel 10 is exposed. A litter clearing device 3000 may further be arranged in the cat litter box 2000 to move fecal blocks in the cat litter box into the litter bag, and subsequently, the litter bag sealing device is activated to seal the litter bag containing the fecal blocks to prevent fecal odors from being spread.

It is to be understood that, after using the aforementioned litter bag sealing device to seal the litter blocks carrying feces inside the litter bag, the remaining cat litter in the cat litter box may still have a strong odor due to absorbing a large amount of cat urine after long-term use. Therefore, a new batch of cat litter needs to be provided for replacement. However, since other structures such as an automatic clearing device may be arranged inside the cat litter box, it may be difficult to disassemble the cat litter box, and therefore, the cat litter inside the cat litter box may not be replaced easily. Therefore, the cat litter box of the present disclosure is further arranged with a cat litter collection device.

Specifically, as shown in FIGS. 15-24, a litter storage portion of the cat litter box includes a body portion 1a, an upper box body 2a, a lower box body 3a, and a litter dropping mechanism 4a. The body portion 1a may be the housing or a frame of the cat litter box. The upper box body 2a may be fixedly mounted to the body portion 1a by bolts or snaps or the like. The upper box body 2a is configured to receive cat litter and to allow a cat to excrete feces. A cat litter clearing device 1000a may be arranged in the upper box body 2a.

A litter dropping opening 22a is defined in a bottom of the upper box body 2a. The litter dropping opening 22a is defined to enable the cat litter received in the upper box body 2a to drop through. The litter dropping mechanism 4a is mounted at the bottom 21a of the upper box body 2a and can open or close the litter dropping opening 22a.

When the litter dropping mechanism 4a is closed, the litter dropping mechanism 4a seals the litter dropping opening 22a to prevent the cat litter from falling off through the litter dropping opening 22a. When the litter dropping mechanism 4a is open, the litter dropping mechanism 4a opens the litter dropping opening 22a to allow the cat litter to pass through the litter dropping opening 22a.

Figure 16:
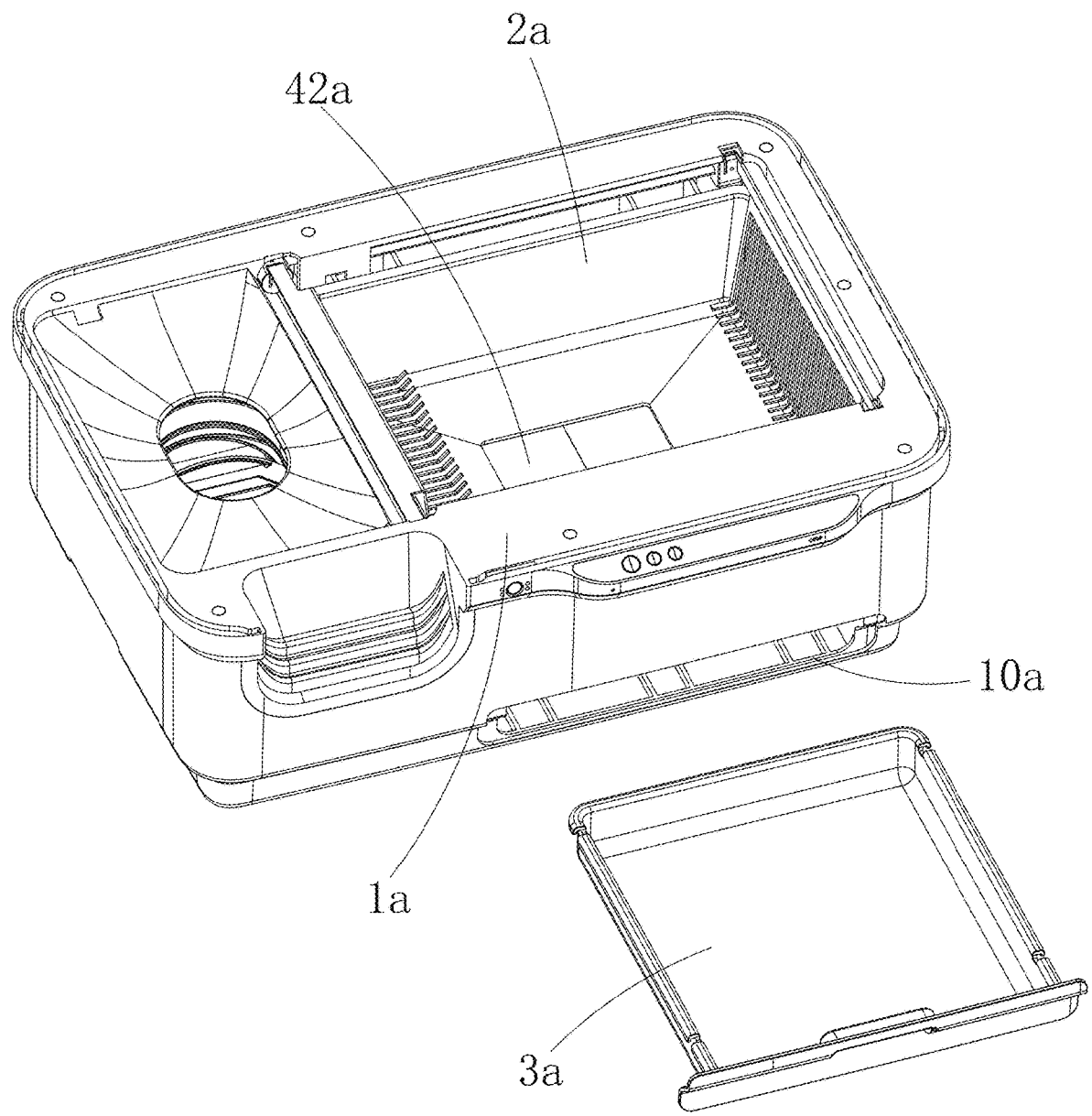
FIG. 16 is a structural schematic view II of the cat litter box according to an embodiment of the present disclosure, where the lower box body is in a second state.

The lower box body 3a is located below the upper box body 2a, and the lower box body 3a is slidably mounted to the body portion 1a. As shown in FIG. 16, a pull-out opening 10a is defined in a side of the body portion 1a. The lower box body 3a can slide to an interior of the body portion 1a from the pull-out opening 10a. In a first state, the lower box body 3a is located directly below the upper box body 2a. In a second state, the lower box body 3a slides away from the body portion 1a. When the lower box body 3a is in the first state, the litter dropping opening 22a directly faces the lower box body 3a. In the first state, the cat litter in the upper box body 2a may fall into the lower box body 3a when the litter dropping mechanism 4a is opened. After all of the cat litter in the upper box body 2a is dropped to the lower box body 3a, the litter dropping mechanism 4a is closed, and the lower box body 3a is pulled to the second state, enabling the lower box body 3a to be detached from the body portion 1a. Furthermore, the cat litter in the lower box body 3a is cleared out of the lower box body 3a, such that the cat litter is removed from the entire cat litter box.

Therefore, for the cat litter box of the present disclosure, the upper box body 2a for storing the cat litter does not need to be removed, but the cat litter in the upper box body 2a is transferred to the lower box body 3a through the litter dropping mechanism 4a, and the lower box body 3a is removed to discard all the cat litter. Subsequently, the upper box body 2a is filled with new cat litter. In this way, replacing the cat litter is achieved easily.

Further, the litter dropping mechanism 4a includes a swing rod 41a, a blocking plate 42a, and a drive member 43a. The swing rod 41a is rotatably mounted directly or indirectly on the bottom 21a of the upper box body 2a. The blocking plate 42a is slidably mounted on the bottom 21a of the upper box body 2a and is connected to the swing rod 41a. Therefore, it is the blocking plate 42a that opens or closes the litter dropping opening 22a. The drive member 43a is drivably connected to the swing rod 41a to drive the swing rod 41a to swing and drive the blocking plate 42a to slide, such that the litter dropping opening 22a is opened or closed.

Figure 18:
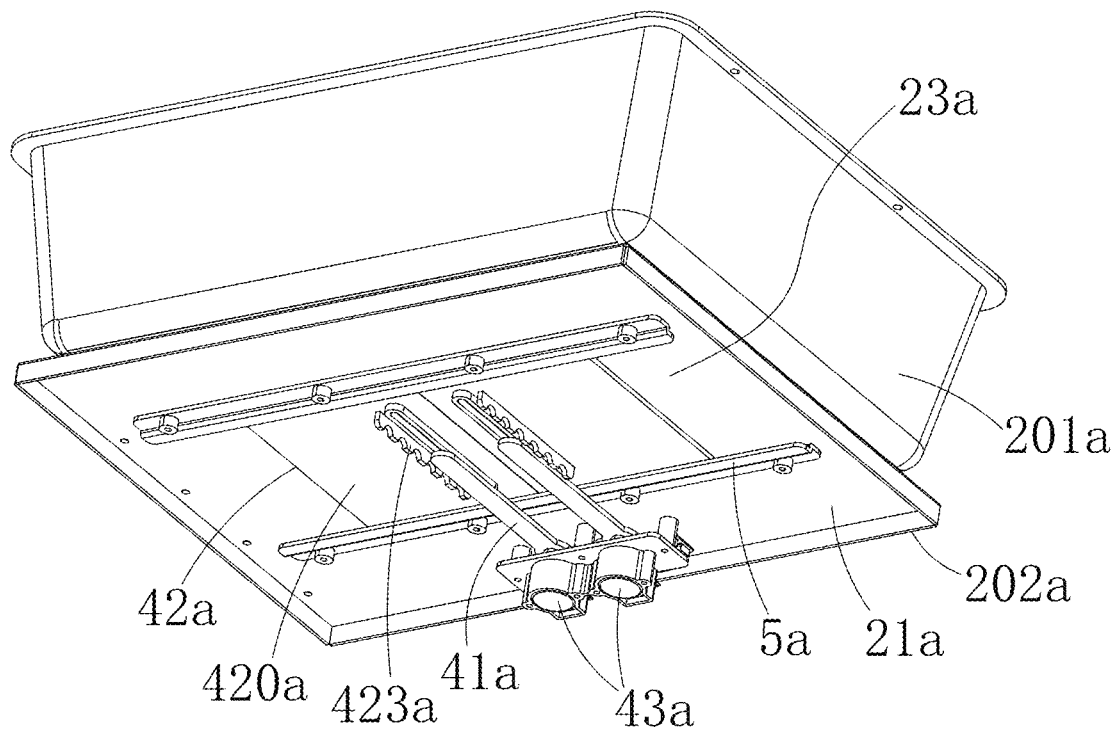
FIG. 18 is a structural schematic view I of a litter dropping mechanism arranged at a bottom of the upper box body according to an embodiment of the present disclosure, where a middle blocking plate covers a litter dropping opening.
Figure 19:
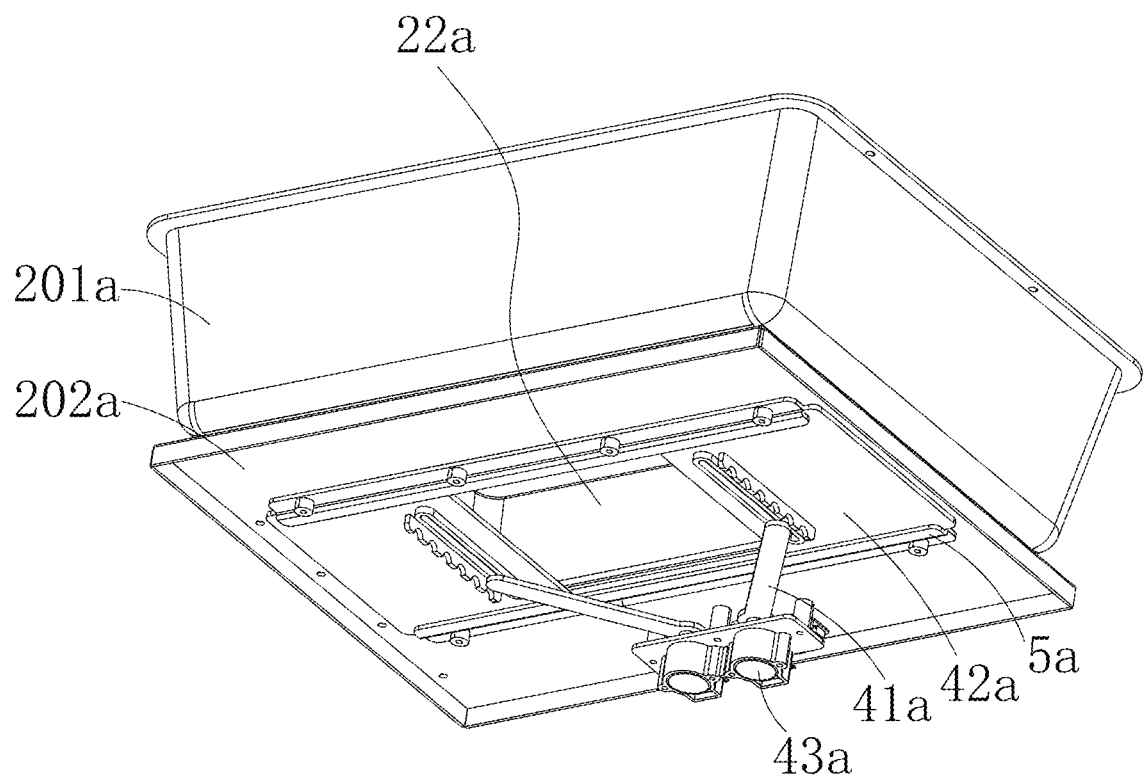
FIG. 19 is a structural schematic view II of the litter dropping mechanism arranged at the bottom of the upper box body according to an embodiment of the present disclosure, where the middle blocking plate exposes the litter dropping opening.
Figure 20:
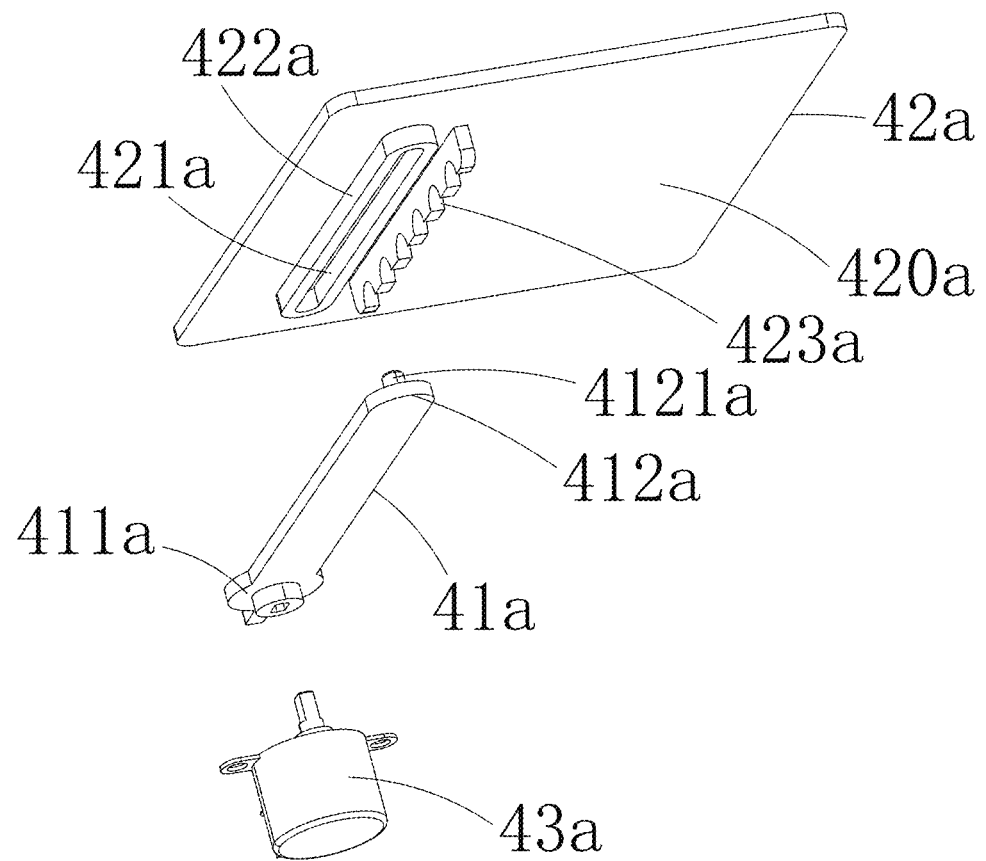
FIG. 20 is an exploded view of a portion of the litter dropping mechanism according to an embodiment of the present disclosure.

In an embodiment, as shown in FIGS. 18 to 20, the drive member 43a is a motor, which is fixedly mounted at the bottom 21a of the upper box body 2a. The swing rod 41a has a first end 411a and a second end 412a. The first end 411a of the swing rod 41a is fixedly connected to an output shaft of the motor. Rotation of the output shaft of the motor drives the second end 412a of the swing rod 41a to rotate around the first end 411a. Since the second end 412a of the swing rod 41a is connected to the blocking plate 42a, the blocking plate 42a can be driven.

Figure 21:
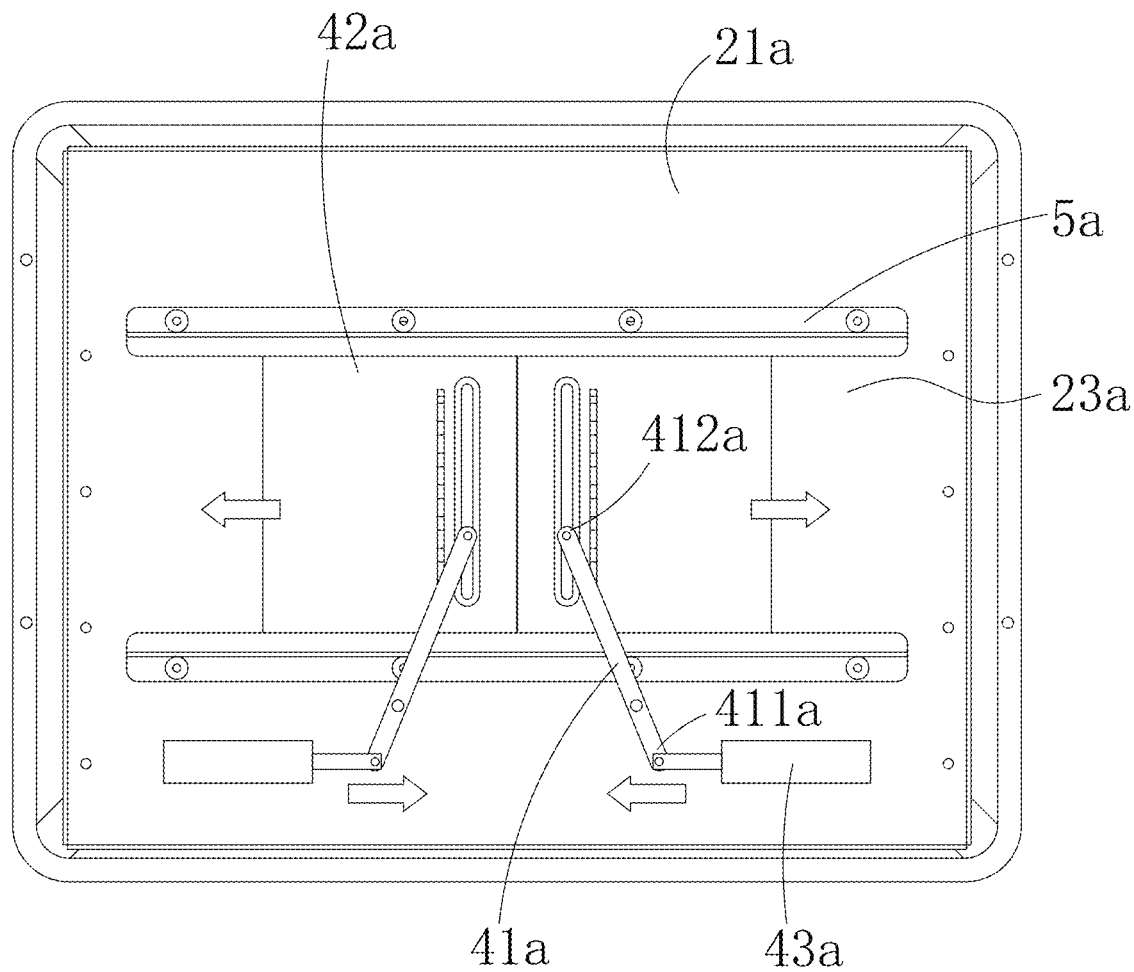
FIG. 21 is a structural schematic view of the litter dropping mechanism arranged at the bottom of the upper box body according to another embodiment of the present disclosure, where a moving direction of the middle blocking plate and a drive member is shown.

In other embodiments, as shown in FIG. 21, the drive member 43a is an electric push rod. The electric push rod is fixedly mounted on the bottom 21a of the upper box body 2a. The swing rod 41a has the first end 411a and the second end 412a, and a middle portion of the swing rod 41a is directly rotatably connected to the bottom 21a of the upper box body 2a. The first end 411a of the swing rod 41a is rotatably connected to an output shaft of the electric push rod, and the second end 412a of the swing rod 41a is rotatably connected to the blocking plate 42a. Extension and retraction of the output shaft of the electric push rod drives the second end 412a and the first end 411a of the swing rod 41a to rotate around the middle portion of the swing rod 41a. In this way, the blocking plate 42a is driven.

Figure 23:
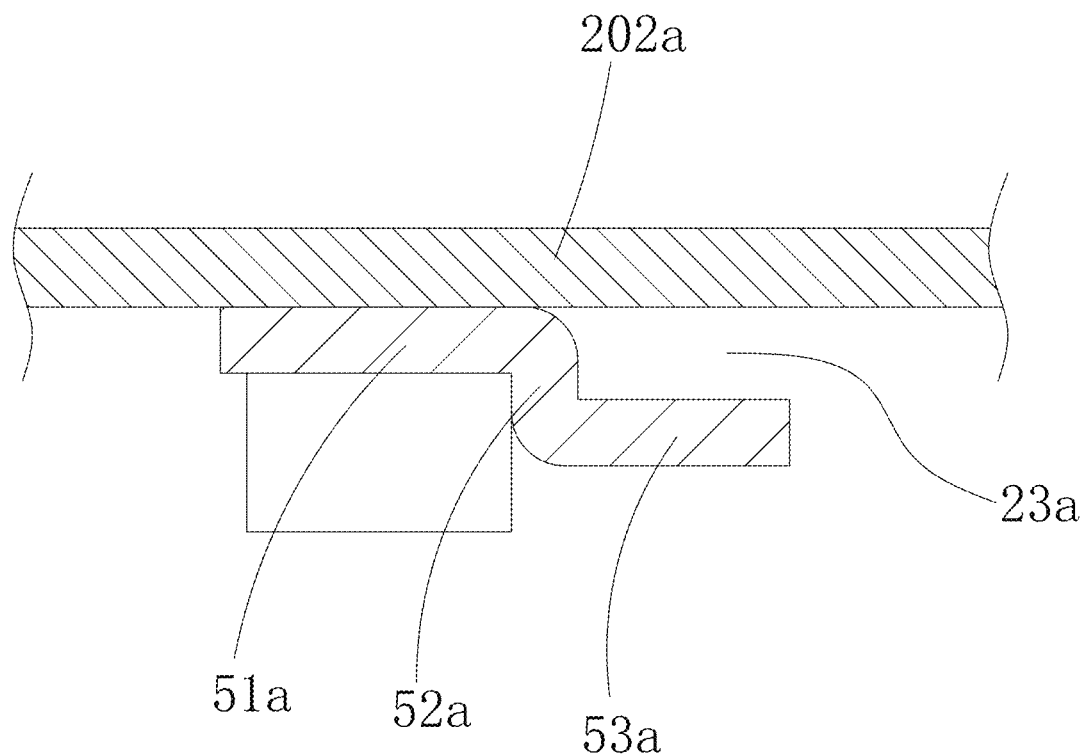
FIG. 23 is a structural schematic view of a guide rail according to an embodiment of the present disclosure.

Further, as shown in FIGS. 18, 21 and 23, in an embodiment, a slide groove 23a is defined in the bottom 21a of the upper box body 2a, the slide groove 23a is extending along a straight line or is arc-shaped. The blocking plate 42a is received in and slides along the slide groove 23a.

In order to better utilize a limited space at the bottom 21a of the upper box body 2a, in some embodiments, the slide groove 23a extends along the straight line, the blocking plate 42a defines an adaptation groove 421a that is extending perpendicularly to the slide groove 23a. Specifically, a bottom surface 420a of the blocking plate 42a is arranged with a downwardly-extending adaptation protrusion 422a. The adaptation groove 421a is defined in the adaptation protrusion 422a. The second end 412a of the swing rod 41a is arranged with a connection protrusion 4121a. The connection protrusion 4121a is disposed in the adaptation groove 421a and is slidable along the adaptation groove 421a. During the second end 412a swinging, a sub-motion perpendicular to the slide groove 23a and a sub-motion parallel to the slide groove 23a are generated. The sub-motion of the second end 412a perpendicular to the direction of the slide groove 23a is represented as the connection protrusion 4121a sliding along the adaptation groove 421a. The sub-motion of the second end 412a parallel to the slide groove 23a drives the blocking plate 42a to move along the slide groove 23a along a straight line. therefore, a certain space occupied by the litter dropping mechanism 4a in the direction perpendicular to the slide groove 23a can be saved, a larger litter dropping opening and the blocking plate 42a having a corresponding size can be arranged, a rate of dropping the cat litter is increased.

In order to facilitate molding and save costs for materials, in the present embodiment, the cat litter box further includes at least two guide rail members 5a. In an example, two guide rail members 5a are arranged and are arranged in parallel to each other and mounted on the bottom 21a of the upper box body 2a. The slide groove 23a is formed by the two guide rail members 5a. Two sides of the blocking plate 42a simultaneously abut against the two guide rail members 5a, and the blocking plate 42a slides along the two guide rail members 5a. Each guide rail member 5a may be made of metal or plastic or other materials and is fixedly mounted on the upper box body 2a by bolts, snaps or other means. A vertical cross-section of the guide rail member 5a is in a "Z" shape. Specifically, the guide rail member 5a includes a mounting sheet 51a, a connection sheet 52a and a bearing sheet 53a that are connected to each other in sequence. The mounting sheet 51a and the bearing sheet 53a are parallel to each other. The mounting sheet 51a is fixed to the upper box body 2a by bolts, and the blocking plate 42a is supported on the bearing sheet 53a.

Further, two swing rods 41a, two blocking plates 42a, and two drive members 43a are arranged. The two swing rods 41a are mirror-symmetrically distributed, the two blocking plates 42a are mirror-symmetrically distributed, and the two drive members 43a are mirror-symmetrically distributed. In this way, the litter dropping opening is wider, and the rate of dropping the cat litter is increased. In addition, the cat litter is prevented from being accumulated to form a conical shape above the lower box body 3a, such that the litter dropping opening 22a is prevented from being blocked. In the present embodiment, a combing structure 423a is arranged on a bottom surface 420a of the blocking plate 42a, and a height of the combing structure 423a extends downwardly. A length of the combing structure 423a extends in a direction perpendicular to the sliding direction of the blocking plate 42a. Movement of the blocking plate 42a drives the combing structure 423a to synchronously move to push cat litter that is located near the height of the blocking plate 42a downwardly to the lower box body.

Specifically, the combing structure 423a may be plate-shaped, tooth-shaped as shown in FIG. 20, or rake-shaped, and so on. In an example, the combing structure 423a is arranged next to the adaptation protrusion 422a, and the combing structure 423a and the adaptation protrusion 422a are parallel to each other.

Figure 17:
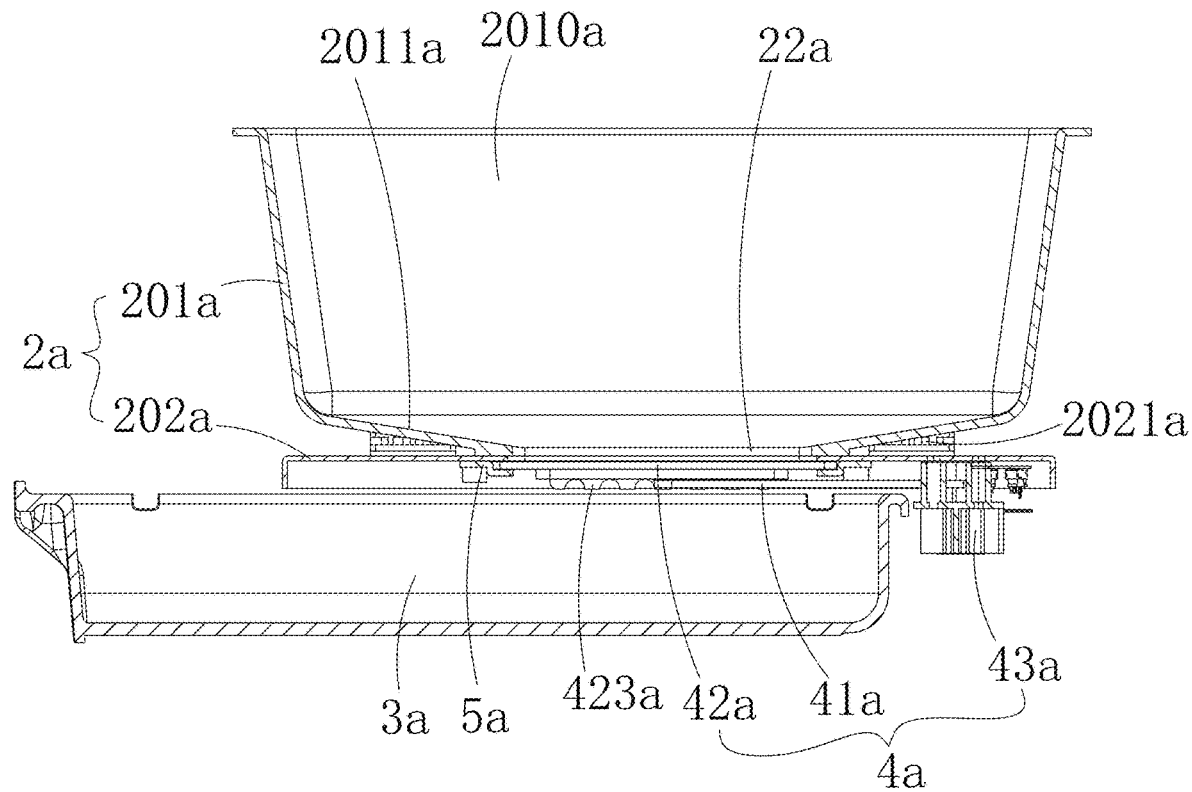
FIG. 17 is a structural schematic view showing positional relationship between an upper box body and a lower box body according to an embodiment of the present disclosure, where the lower box body is in the first state.
Figure 22:
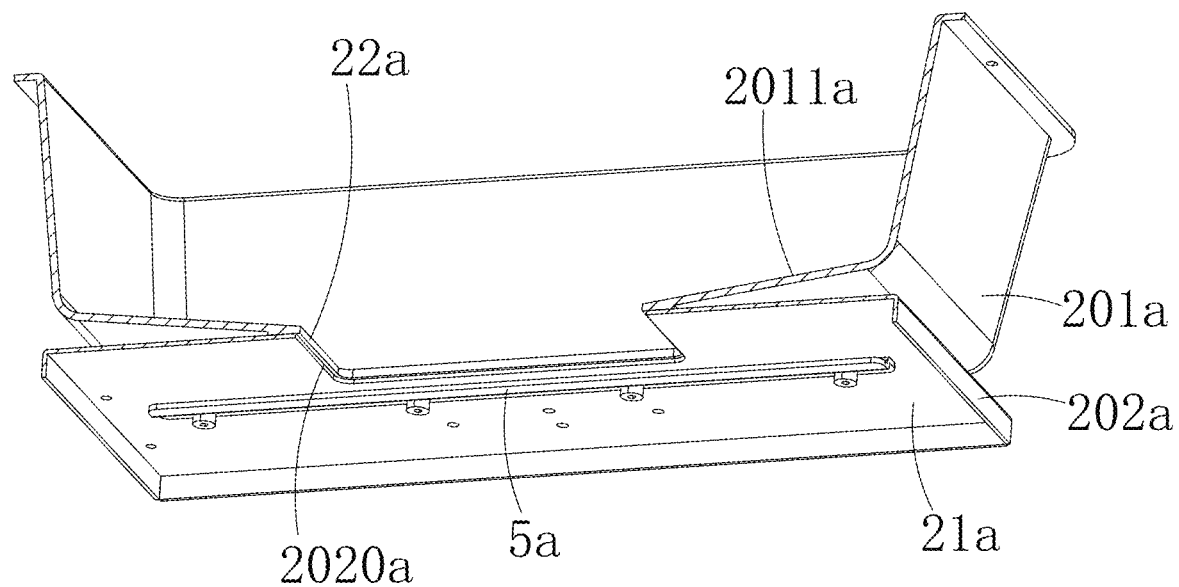
FIG. 22 is a cross-sectional view of the upper box body according to an embodiment of the present disclosure, where the upper box body and a mounting plate are shown.

Further, in order to ensure all of the cat litter in the upper box body 2a to fall into the lower box body 3a, as shown in FIGS. 17 and 22, the upper box body 2a in the present embodiment includes an upper body portion 201a and a mounting plate 202a. The mounting plate 202a is fixedly mounted to the body portion 1a, the upper body portion 201a is mounted on the mounting plate 202a. The upper body portion 201a defines a litter storage cavity 2010a. The litter dropping opening 22a is defined in the upper body portion 201a and is communicated with the litter storage cavity 2010a. A bottom surface 2011a of the litter storage cavity 2010a is funnel-shaped and closed up towards the litter dropping opening 22a. The mounting plate 202a is horizontally arranged and is connected to the body portion by bolts or other means. The mounting plate 202a defines a connection opening 2020a communicated with the litter dropping opening 22a. The blocking plate 42a and the drive member 43a are mounted on the mounting plate 202a. The blocking plate 42a can slide to open or close the connection opening 2020a, so as to open or close the litter dropping opening 22a. When the upper box body 2a is configured as being formed from the upper body portion 201a and the mounting plate 202a, manufacturing can be performed easily, and material costs are saved.

The upper body portion 201a may be fixedly mounted to the mounting plate 202a, or the upper body portion 201a may be allowed to slightly slide up and down.

Figure 24:
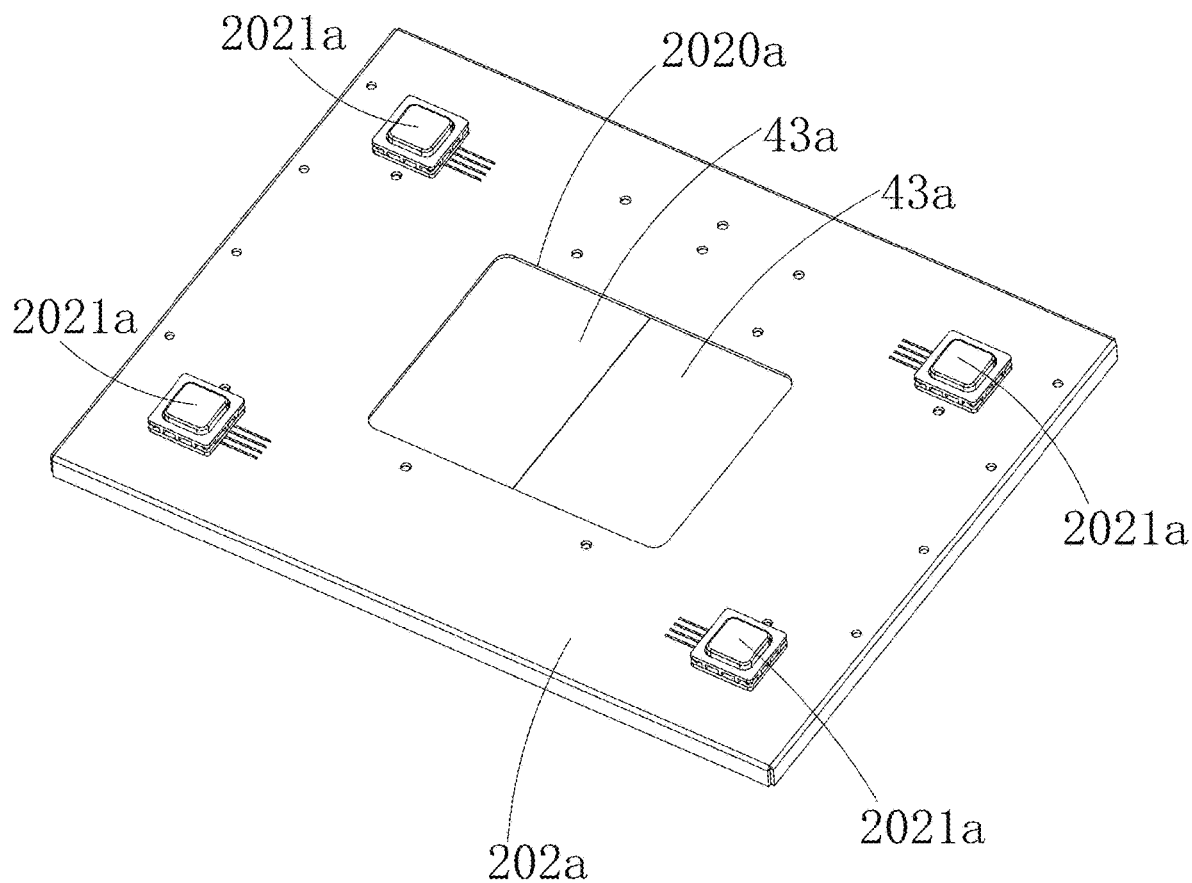
FIG. 24 is a structural schematic view of the mounting plate according to an embodiment of the present disclosure.
Figure 25:
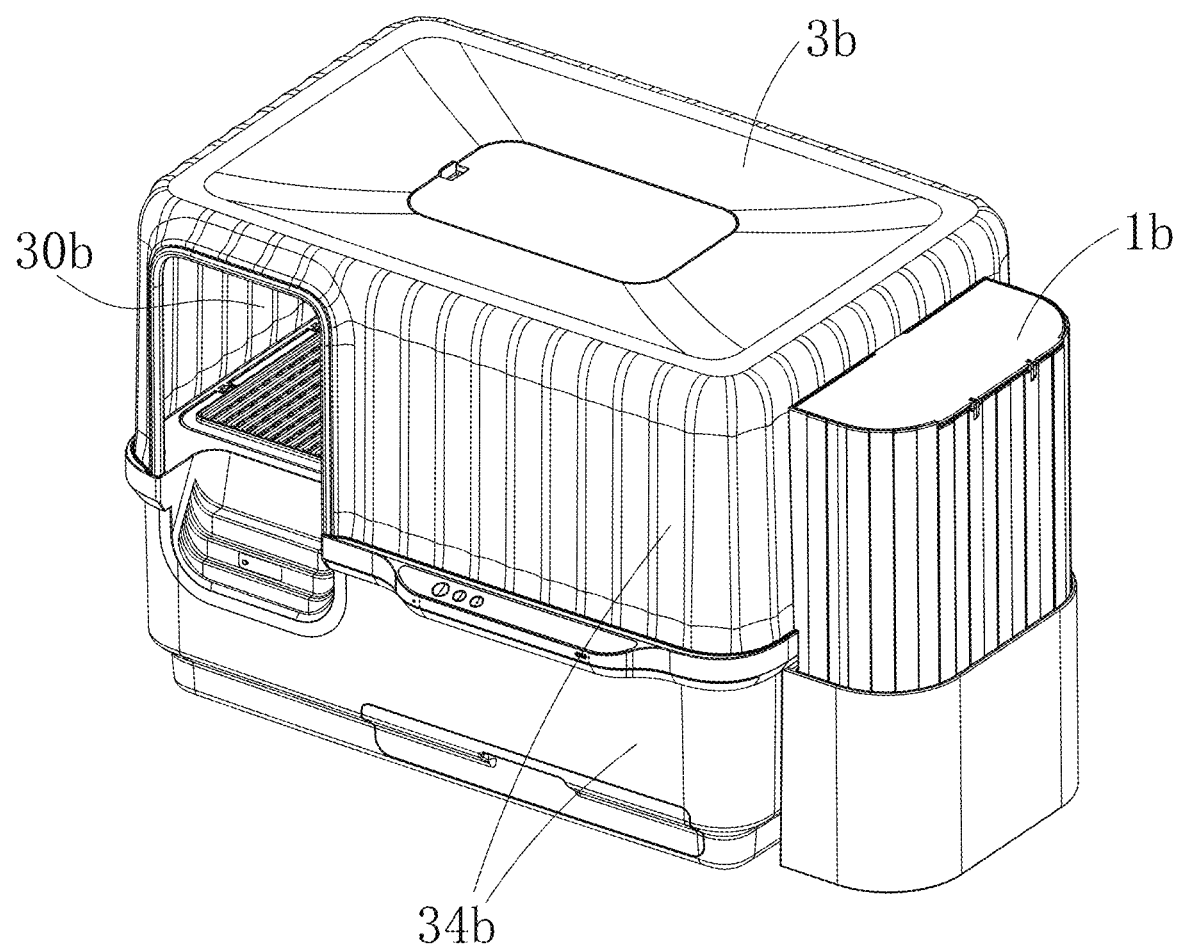
FIG. 25 is a structural schematic view of the cat litter box according to an embodiment of the present disclosure, where an automatic litter supplying device is arranged at a side of the box body.
Figure 26:
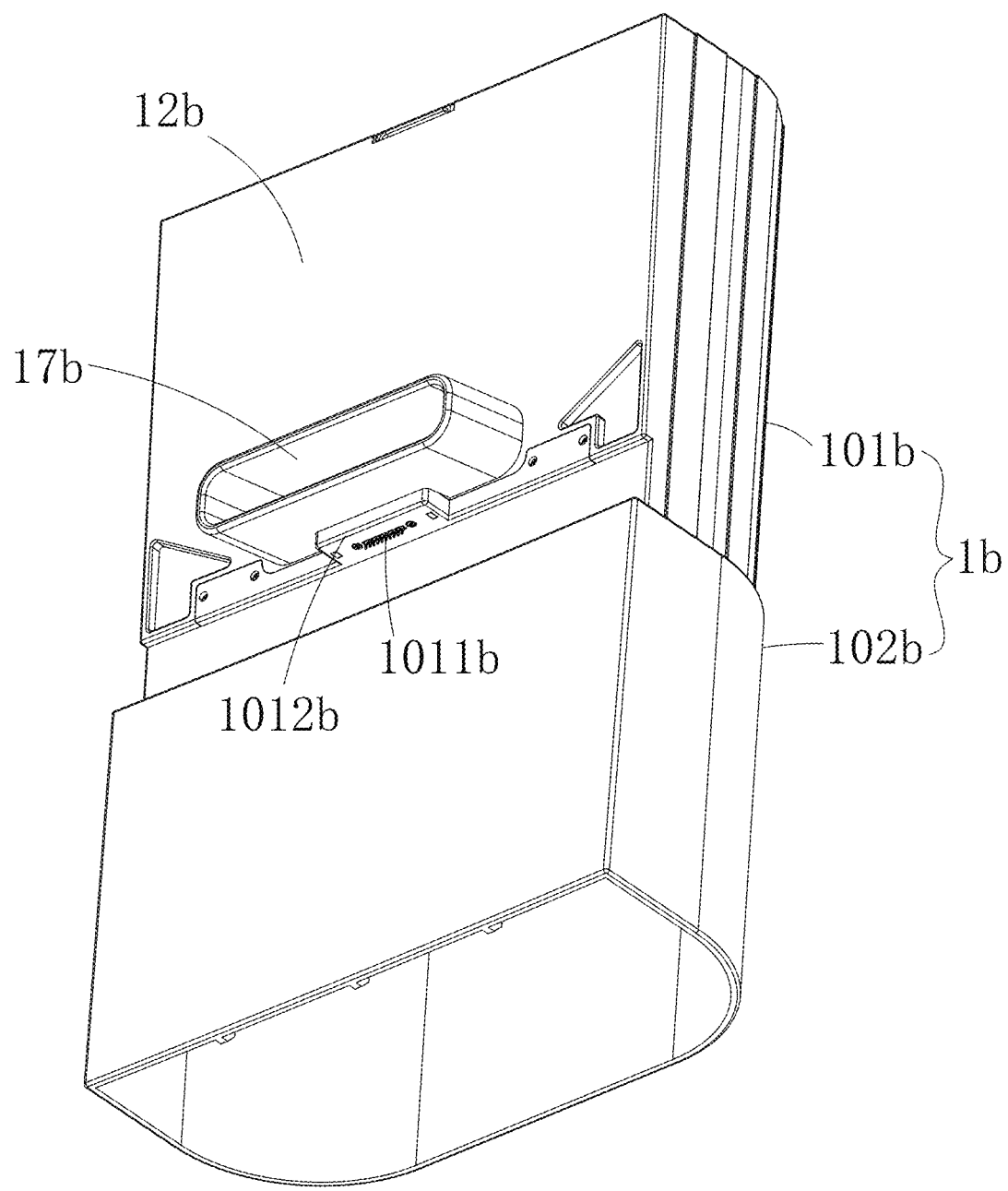
FIG. 26 is a structural schematic view of the automatic litter supplying device according to an embodiment of the present disclosure.

In addition, in the present embodiment, as shown in FIGS. 17 and 24, a weight-measuring member 2021a is arranged on a top surface of the mounting plate 202a. The upper body portion 201a abuts against the weight-measuring member 2021a. When a weight of the upper body portion changes, a pressure applied by the upper body portion on the weight-measuring member 2021a is changed accordingly. Therefore, the weight-measuring member 2021a may be configured to detect any change in the weight of the upper body portion 201a to indirectly determine a health condition of the cat.

When the cat litter is cleared, new cat litter needs to be supplied into the cat litter box. The cat litter box of the present disclosure is further arranged with an automatic litter supplying device. However, when the automatic litter supplying device is disposed directly above the litter storage portion, an overall height of the cat litter box is higher, or a space inside the litter storage portion is smaller. That is, a space for the cat to excrete feces is smaller. Therefore, in the present disclosure, the automatic litter supplying device is disposed on a side of the litter storage portion of the cat litter box to avoid affecting the space of the litter storage portion.

Specifically, as shown in FIGS. 25 to 35, the automatic litter supplying device in the present embodiment is arranged on a side of a box body 3b. The box body 3b defines a litter cavity 30b, and the litter cavity 30b is defined for cat to excrete feces.

Figure 27:
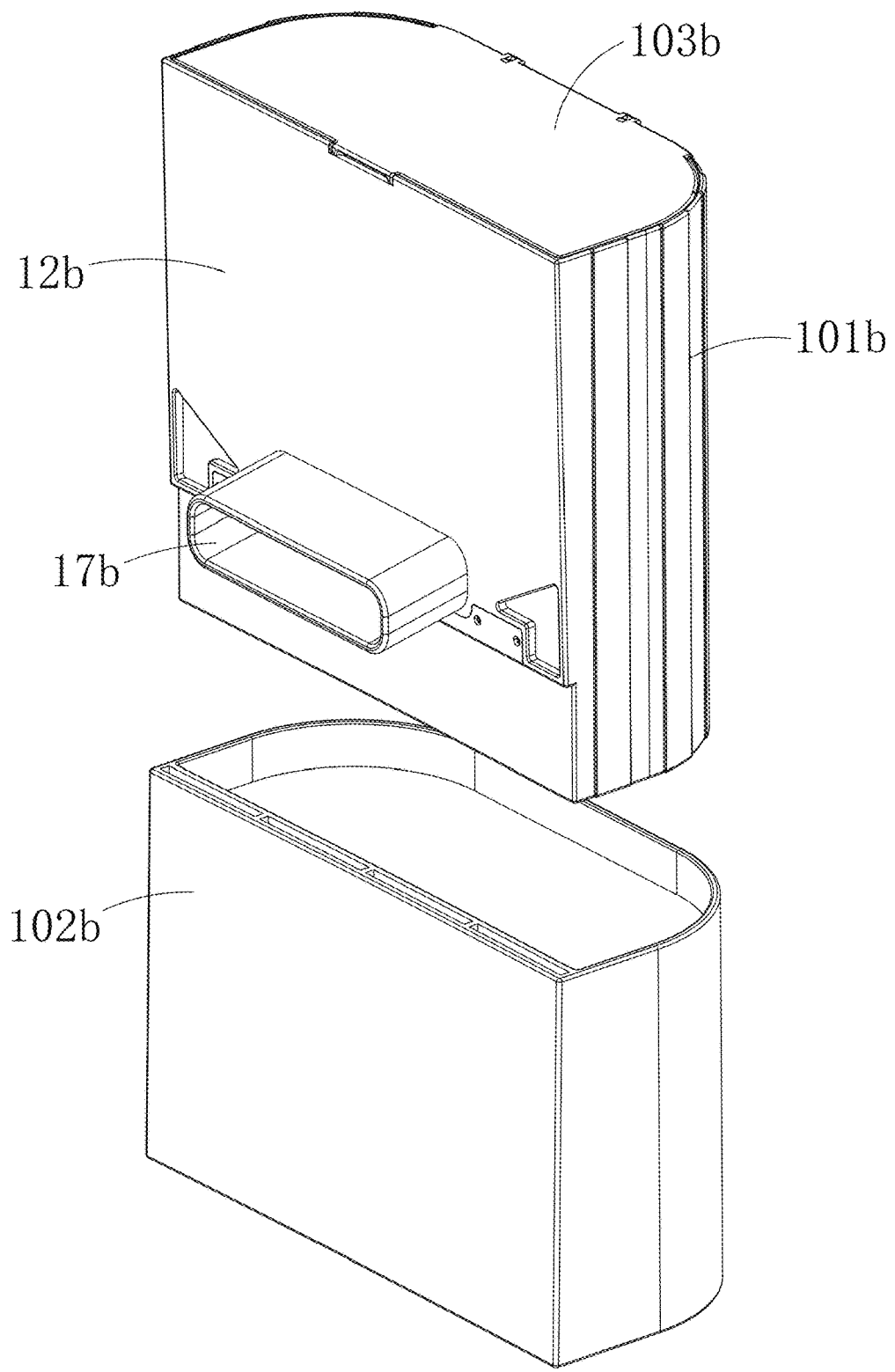
FIG. 27 is an exploded view of the automatic litter supplying device according to an embodiment of the present disclosure, where a litter storage portion and a fixation base are shown.

The automatic litter supplying device includes a housing 1b and a gate 2b. The housing 1b defines a storage cavity 11b. The storage cavity 11b is defined for storing clean cat litter. A discharging opening 121b is defined in a side 12b of the housing 1b. The discharging opening 121b communicates a lowest part of the storage cavity 11b with an outside of the storage cavity 11b. When the housing 1b is mounted to the box body 3b, the discharging opening 121b communicates the storage cavity 11b with the litter cavity 30b. Specifically, the storage cavity 11b has a cavity bottom wall 111b that is inclined and a cavity side wall 112b surrounding the cavity bottom wall 111b. The discharging opening 121b is defined in the cavity side wall 112b as shown in FIG. 27, such that a side 1111 of the cavity bottom wall 111b near the discharging opening 121b is lower than a side 1112b of the cavity bottom wall 111b away from the discharging opening 121b. In this way, the cat litter in the storage cavity 11b can be gathered towards a lowest part of the litter storage cavity 30b, preventing any cat litter from being left in the storage cavity 11b. Further, the cavity bottom wall 111b is configured as the funnel shape inclining towards the discharging opening 121b. The gate 2b is mounted on the housing 1b to open or close the discharging opening 121b. When the gate 2b opens the discharging opening 121b, the cat litter is outlet from the discharging opening 121b to the outside of the housing, and then the cat litter falls into the litter cavity 30b until the gate 2b closes the discharging opening 121b again.

Figure 32:
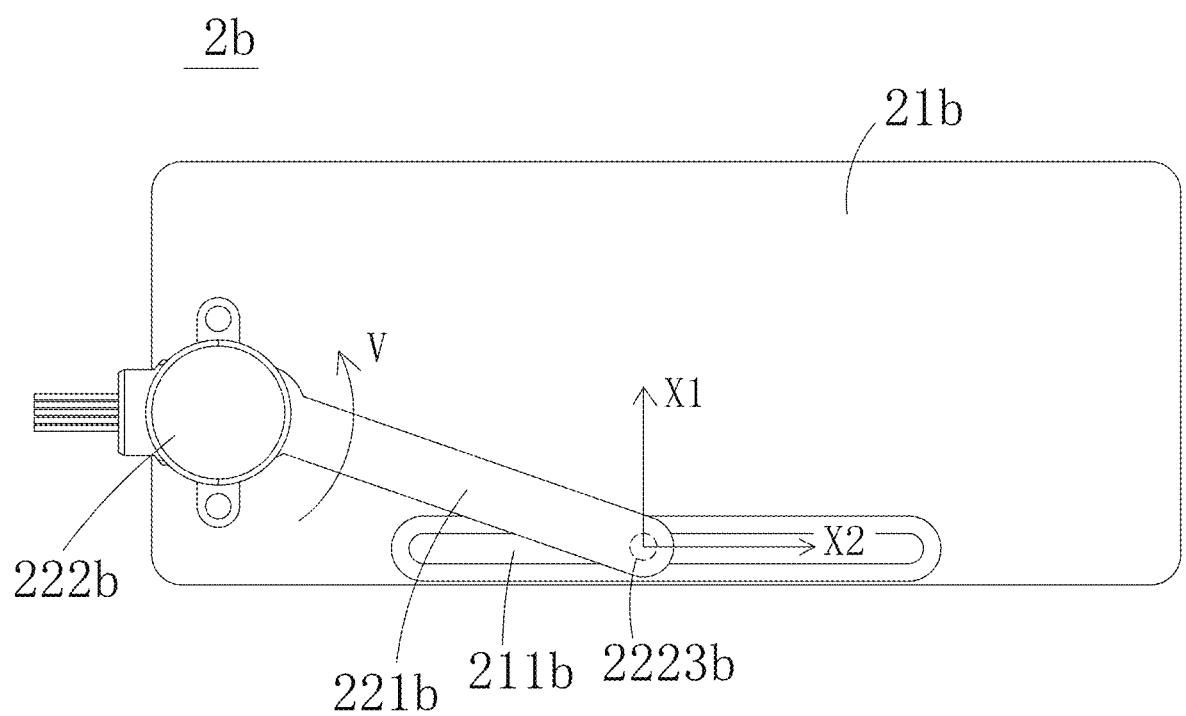
FIG. 32 is a structural schematic view of the gate according to an embodiment of the present disclosure.
Figure 33:
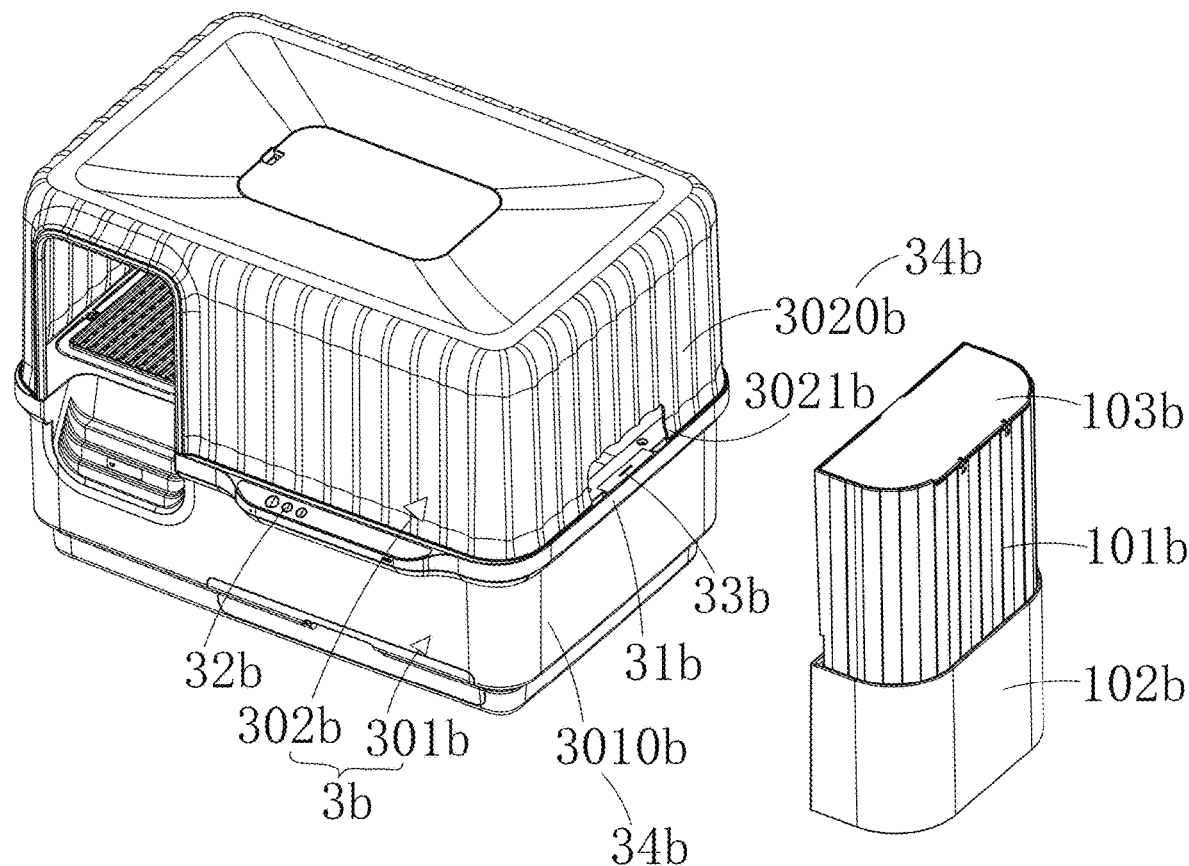
FIG. 33 is an exploded view I of the cat litter box according to an embodiment of the present disclosure.
Figure 34:
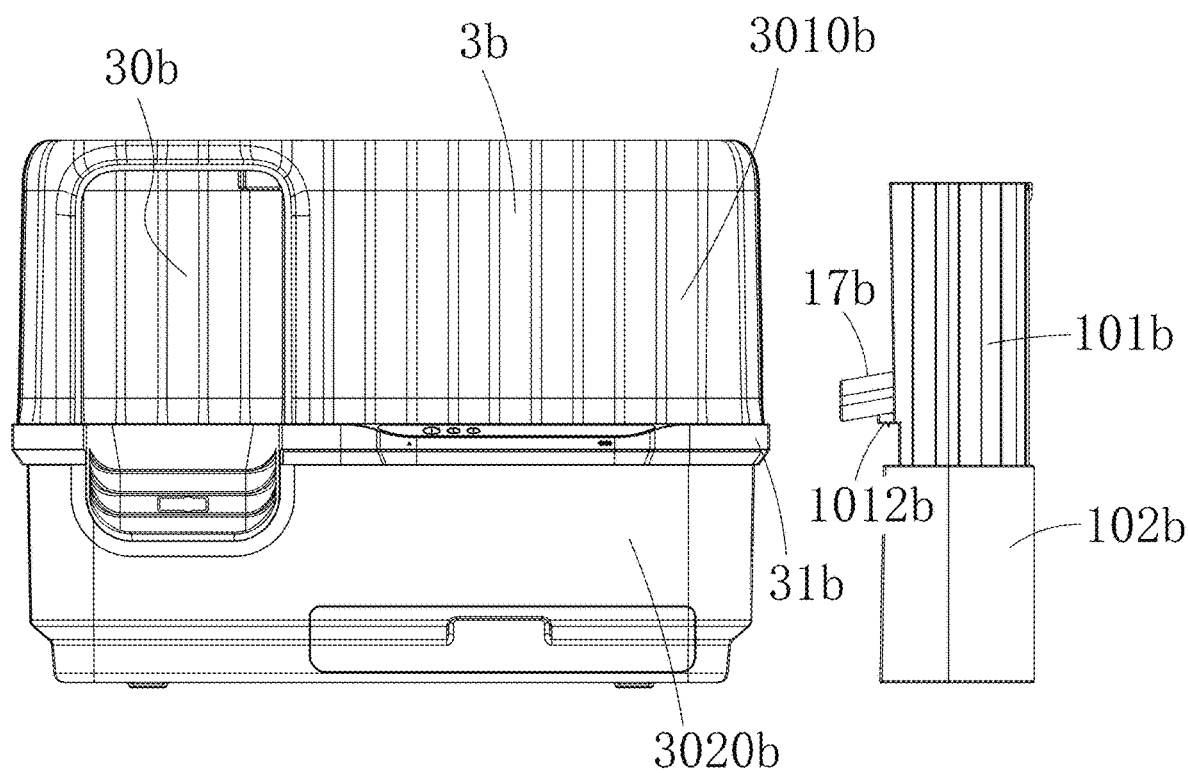
FIG. 34 is an exploded view II of the cat litter box according to an embodiment of the present disclosure.
Figure 35:
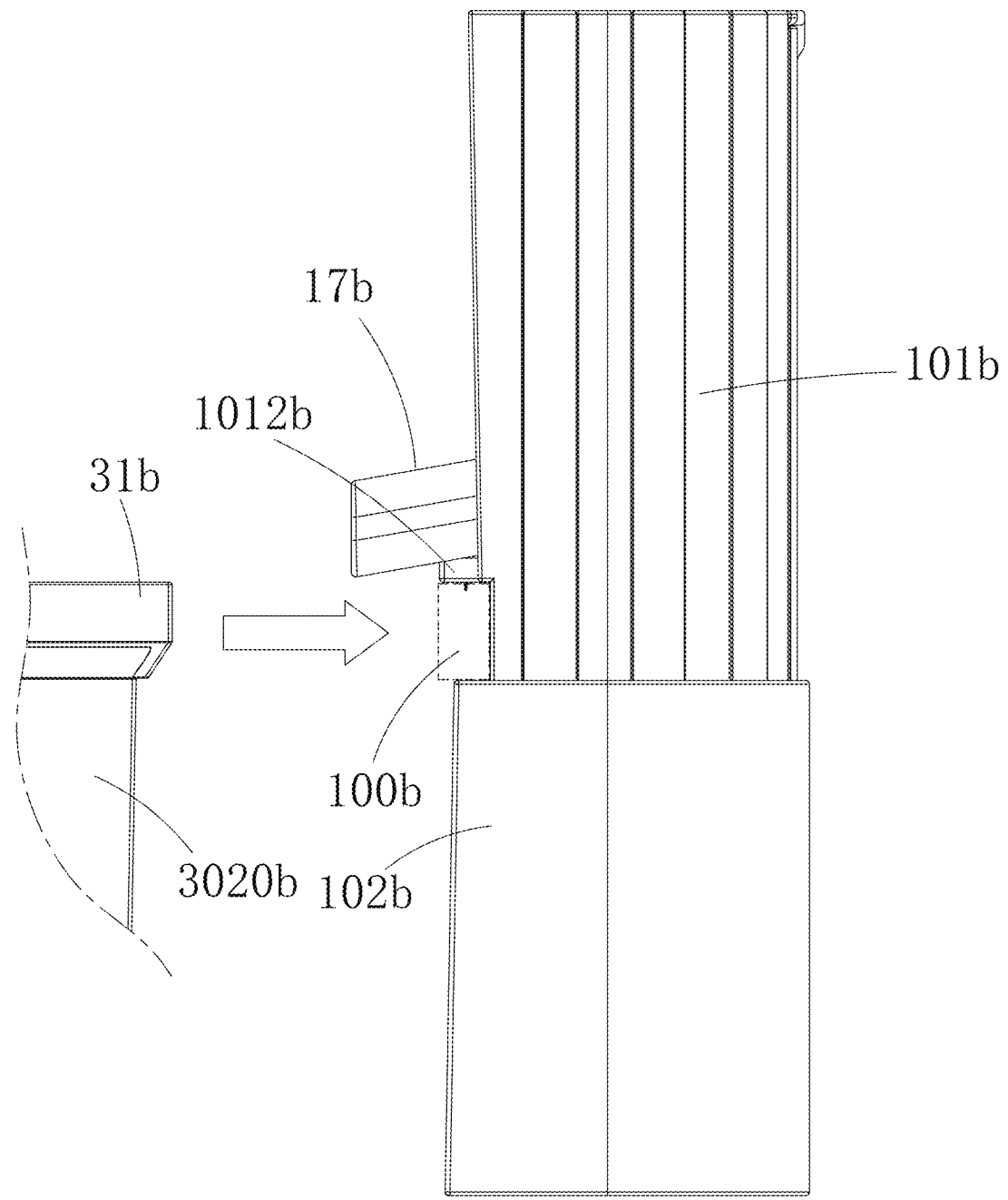
FIG. 35 is a structural schematic view of connection between the automatic litter supplying device and a mounting flange according to an embodiment of the present disclosure.

As shown in FIG. 32, since, in the automatic litter supplying device, the discharging opening 121b is defined in the side 12b of the housing 1b, the automatic litter supplying device outputs cat litter from the side 12b. In this way, the automatic litter supplying device is allowed to be disposed at the side of the box body 3b and does not need to be arranged on top of the box body 3b. In this way, the height of the litter cavity 30b does not need to be compressed, and the litter cavity 30b, i.e., a usage space inside the cat litter box, is not affected.

On the other hand, the automatic litter supplying device is detachably mounted on the side of the box body 3b. When the cat litter box is packaged and transported, the automatic litter supplying device may be detached from the box body 3b and placed in the litter cavity 30b inside the cat litter box for packaging and transportation. Therefore, transportation costs are saved.

FIGS. 27 to 21 show detailed structures of the gate 2b. In an embodiment, the gate 2b includes a gate plate 21b and a drive member 22b. The gate plate 21b is slidably connected to the housing 1b. The drive member 22b is mounted inside the housing 1b and is driveably connected to the gate plate 21b to drive the gate plate 21b to open or close the discharging opening 121b. The gate plate 21b may be slidable on an outer wall of the housing 1b or on an inner wall of the storage cavity 11b. The drive member 22b may be a transmission mechanism driven by a motor connected with a connection rod 222b; or a transmission mechanism driven by a motor connected with a gear; or an electric push rod, as long as the drive member 22b can drive the gate plate 21b to slide on a plane.

When the gate plate 21b slides downwardly to close the discharging opening 121b, the gate plate 21b cooperate with the cavity bottom wall 111b to squeeze and crush the cat litter. In this case, a large load is applied to the drive member 22b, and the discharging opening 121b may not be completely closed. In the present embodiment, the gate plate 21b is slidably mounted on the inner wall of the storage cavity 11b and slides from a bottom to a top (i.e., upwardly) to close the discharging opening 121b. Therefore, when the gate plate 21b moves upwardly, the cat litter located on top of the gate plate 21b is lifted up by the gate plate 21b but does not need to be crushed. In this way, a smaller load is applied to the drive member 22b, the gate plate 21b is prevented from being unable to completely close the discharging opening 121b due to being stuck by the cat litter. In addition, the drive member 22b is located below the gate plate 21b and is located out of the storage cavity 11b. In this way, operation of the drive member 22b is not affected by presence of the cat litter. Furthermore, both the gate plate 21b and the drive member 22b are located inside the housing 1b, operation of the gate 2b is prevented from being affected by any external factor.

Figure 31:
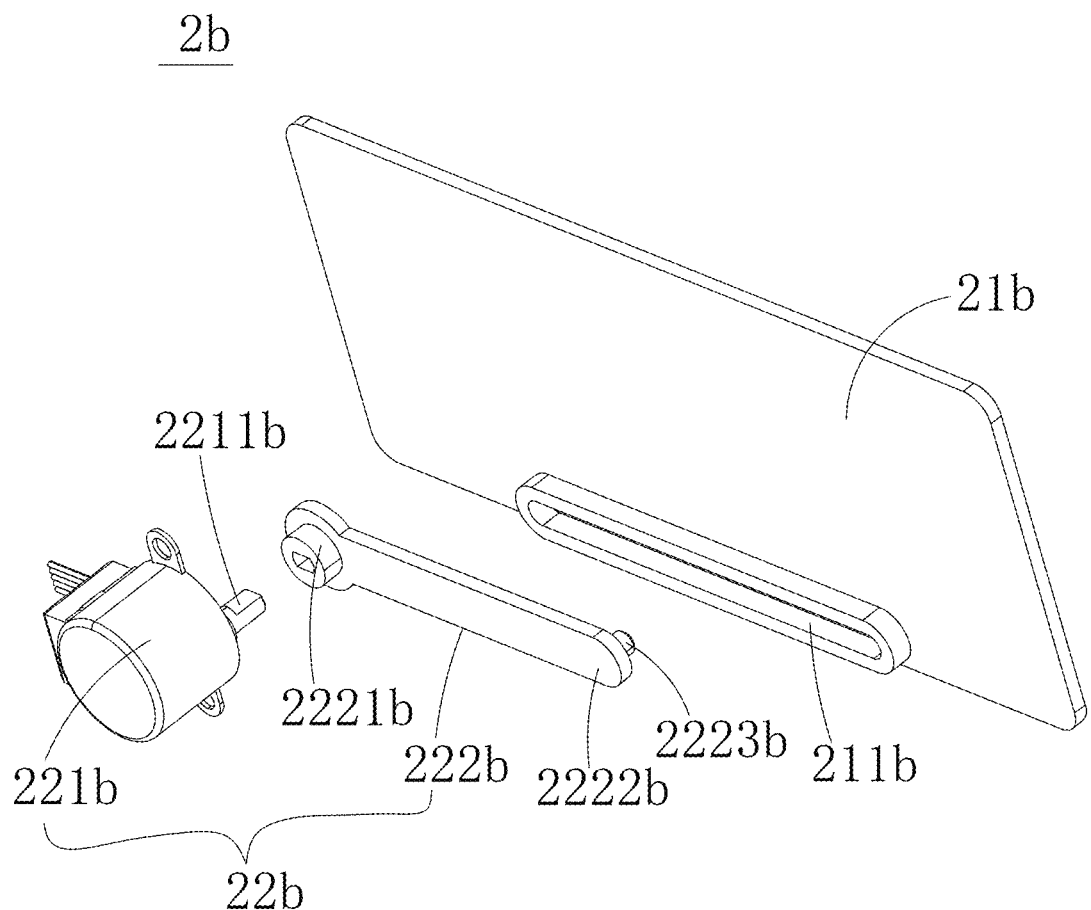
FIG. 31 is an exploded view of a gate according to an embodiment of the present disclosure.

Further, in the present embodiment, a transmission mechanism of a motor coupled with the connection rod 222b is applied to drive the gate plate 21b. Specifically, the drive member 22b includes a drive motor 221b and a connection rod 222b. The drive motor 221b is mounted in the housing 1b, the drive motor 221b has an output shaft 2211b. A first end 2221b of the connection rod 222b is connected to the output shaft 2211b. A second end 2222b of the connection rod 222b is arranged with a connection shaft 2223b. The drive motor 221b drives the second end 2222b of the connection rod 222b to rotate around the first end 2221b. The gate plate 21b defines a connection hole 211b. The connection hole 211b extends transversely. The connection shaft 2223b is inserted into the connection hole 211b and is slidable along the connection hole 211b. As shown in FIG. 31, when the output shaft 2211b rotates, the connection rod 222b rotates synchronously, enabling the connection shaft 2223b to perform a circular motion around the output shaft 2211b around a direction V. At this moment, the connection shaft 2223b has an upward sub-movement X1 and a rightward sub-movement X2. The upward sub-movement X1 drives the gate plate 21b to slide upwardly, and the rightward sub-movement X2 is represented as the connection shaft 2223b sliding rightwardly in the connection hole 211b so as to eliminate a rightward displacement of the gate plate 21b. In this way, the gate plate 21b performs only a straight linear motion in the vertical direction.

Figure 28:
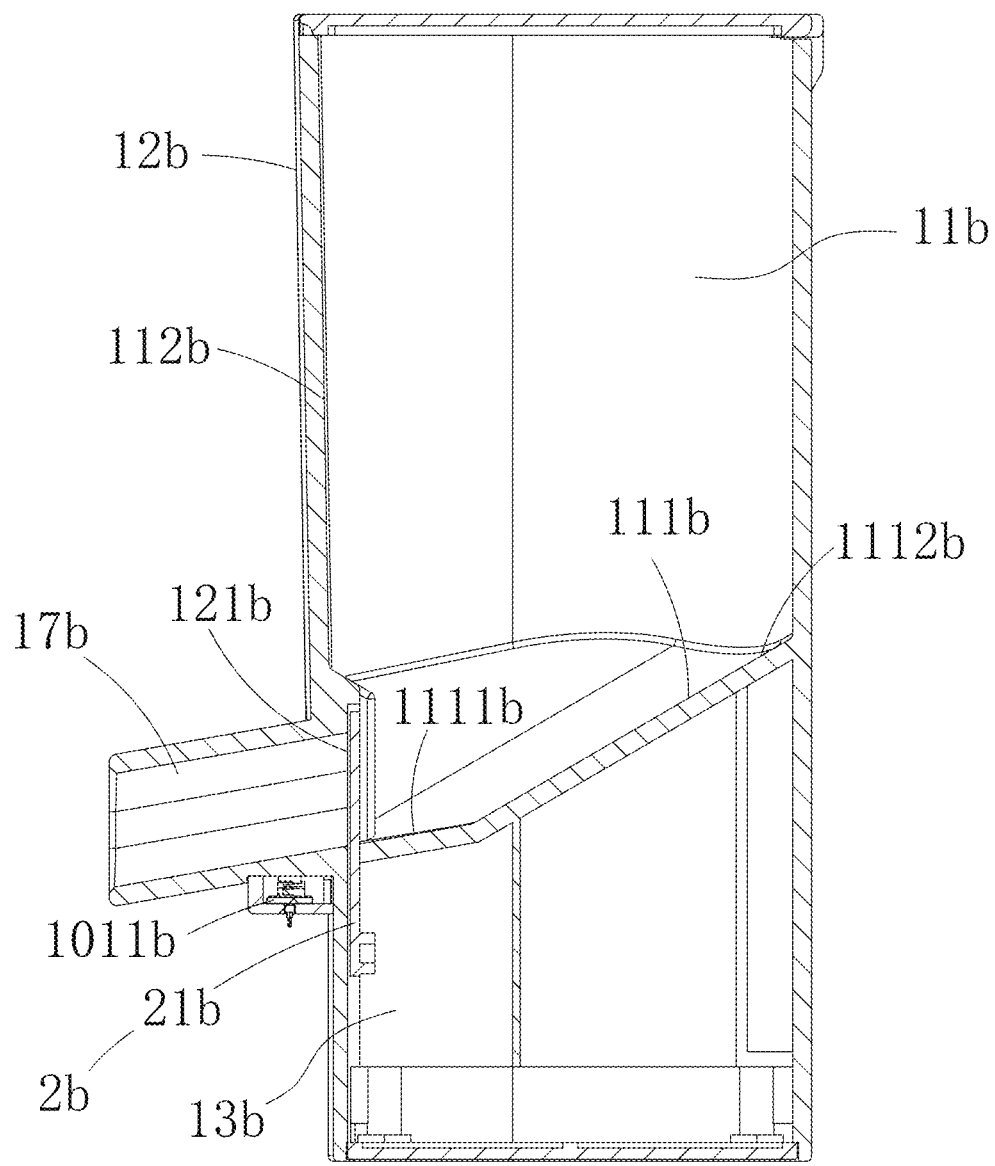
FIG. 28 is a cross-sectional view I of the automatic litter supplying device according to an embodiment of the present disclosure.
Figure 29:
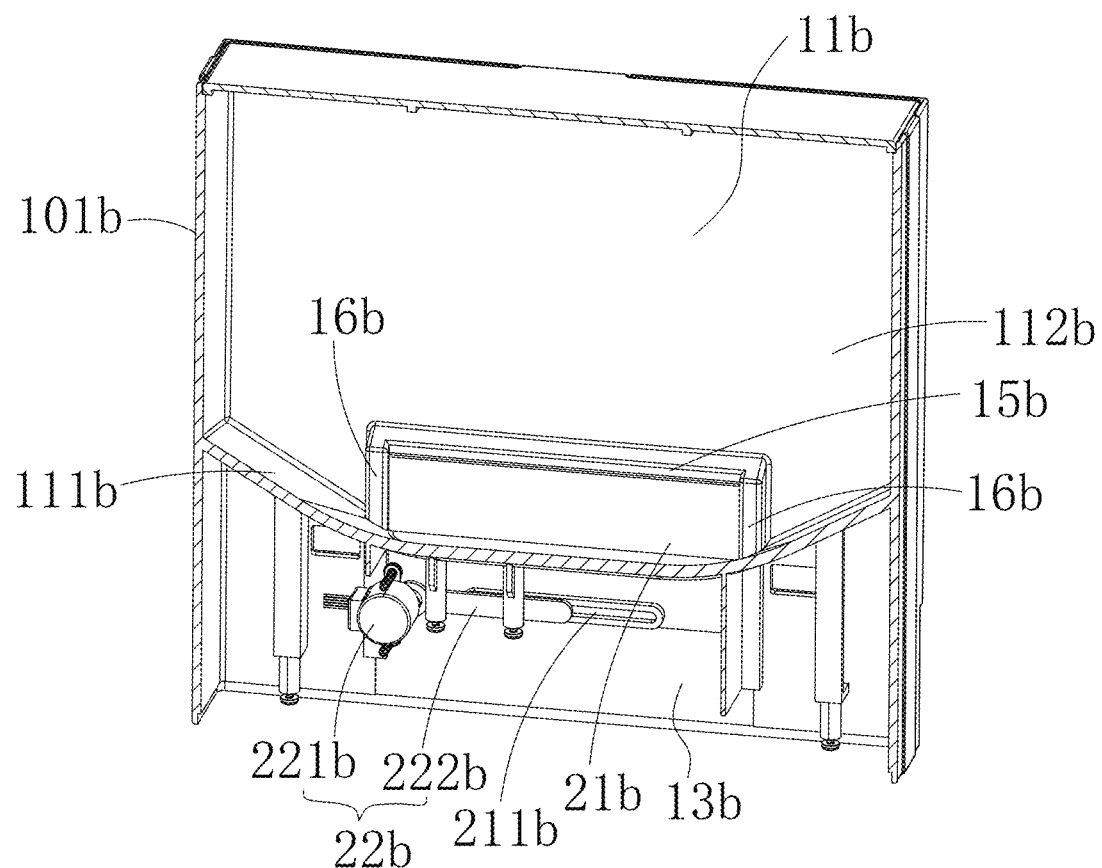
FIG. 29 is a cross-sectional view II of the automatic litter supplying device according to an embodiment of the present disclosure.
Figure 30:
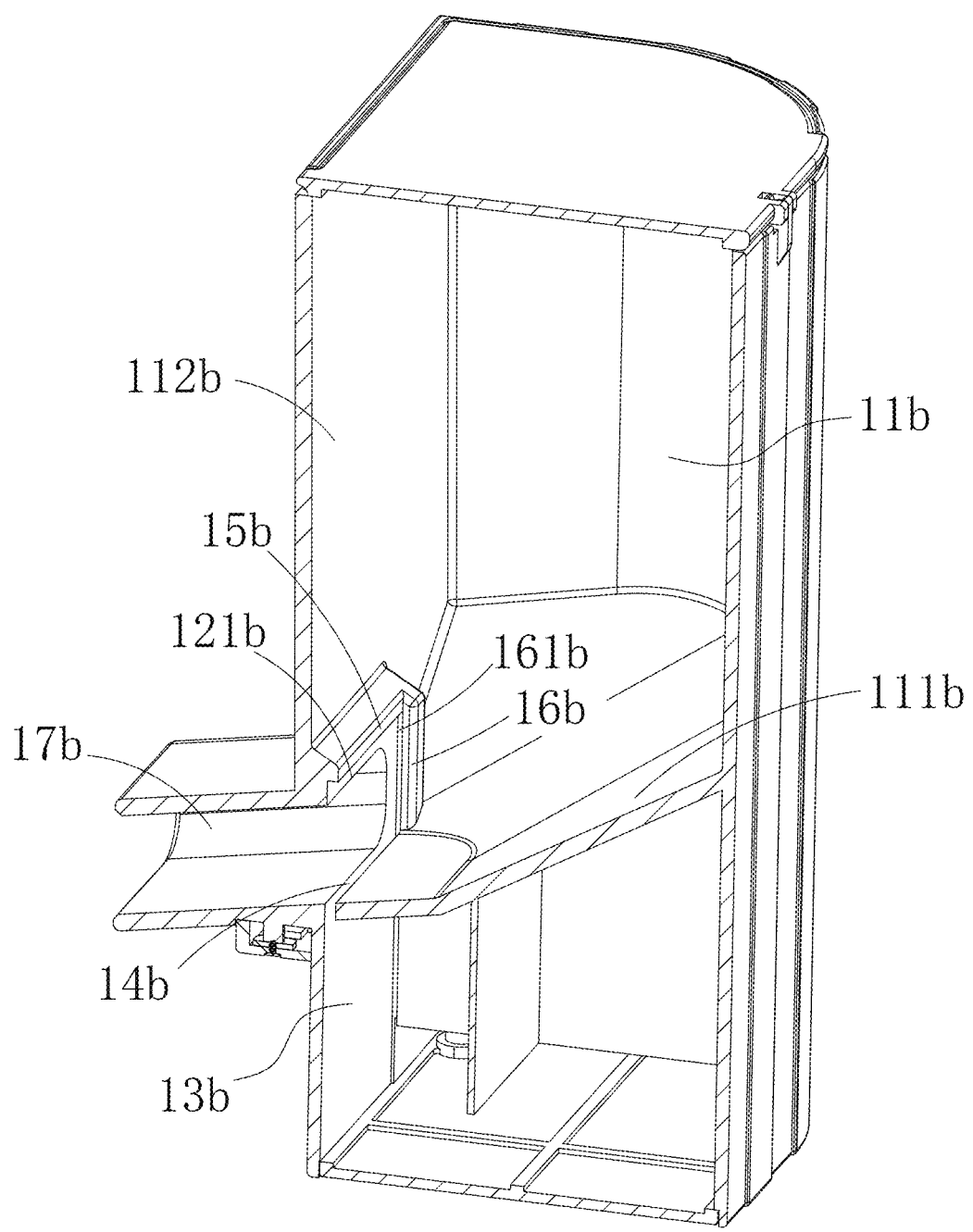
FIG. 30 is a cross-sectional view III of the automatic litter supplying device according to an embodiment of the present disclosure.

Further, as shown in FIGS. 28 and 29, a mounting cavity 13b is defined in the housing 1b. The mounting cavity 13b is located below the storage cavity 11b. The drive motor 221b and the connection rod 222b are both arranged in the mounting cavity 13b. The mounting cavity 13b and the storage cavity 11b are communicated with each other through a mounting hole 14b. The gate plate 21b is vertically slidable in the mounting hole 14b, enabling the gate plate 21b to be able to extend into the mounting cavity 13b to connect to the connection rod 222b. A cross-sectional area and a cross-sectional shape of the mounting hole 14b is substantially the same as a cross-sectional area and a cross-sectional shape of the gate plate 21b. In this way, the cat litter in the storage cavity 11b is prevented from falling from the mounting hole 14b into the mounting cavity 13b, and some dust falling into the mounting cavity 13b has negligible influence on the operation and assembling of the drive member 22b, and the dust in the mounting cavity 13b can be periodically cleared.

In addition, the cavity side wall 112b is further arranged with a sliding limiting protrusion 15b. An upper end of the gate plate 21b abuts against the sliding limiting protrusion 15b. When the upper end of the gate plate 21b rests against the sliding limiting protrusion 15b, the gate plate 21b closes the discharging opening 121b. The sliding limiting protrusion 15b is configured to limit a position where the gate plate 21b slides to reach.

Further, as shown in FIGS. 28 and 29, the cavity side wall 112b is further arranged with two guide rails 16b. The two guide rails 16b are respectively located at two sides of the discharging opening 121b. Each of the two guide rails 16b defines a slide groove 161b. The slide groove 161b is communicated with the mounting hole 14b. Two sides of the gate plate 21b are respectively slidably arranged in two slide grooves 161b of the two guide rails 16b. In this way, a sliding direction of the gate plate 21b is limited by the two guide rails 16b, preventing the gate plate 21b from shaking from side to side during sliding.

Further, the housing 1b includes a litter storage portion 101b and a fixation base 102b. The storage cavity 11b, the discharging opening 121b and the gate 2b are all arranged on the litter storage portion 101b. The litter storage portion 101b is detachably mounted on the fixation base 102b. Specifically, a bottom of the litter storage portion 101b is inserted in a top of the fixation base 102b. The box body 3b includes a circumferential side wall 34b and a mounting flange 31b arranged on the circumferential side wall 34b. The circumferential side wall 34b encloses to form the litter cavity 30b. The litter storage portion 101b and the fixation base 102b cooperatively clamp the mounting flange 31b, such that the automatic litter supplying device is mounted to the box body 3b. Further, the fixation base 102b abuts against the floor to support the litter storage portion 101b.

Specifically, the litter storage portion 101b is further arranged with an abutting edge 1012b below a discharging channel 17b. When the litter storage portion 101b is inserted to the fixation base 102b, a clamping space 100b for clamping the mounting flange 31b is formed between the abutting edge 1012b and the fixation base 102b.

Further, a litter supplying opening 3021b is defined in a circumferential side wall 34b. The discharging channel 17b communicated to the discharging opening 121b is defined in the litter storage portion 101b. The discharging channel 17b extends through the litter supplying opening 3021b and extends in a direction away from the litter storage portion 202b. The discharging channel 17b is inclined and extending downwardly. The discharging channel 17b is configured to guide a falling direction of the cat litter and to determine a location where the cat litter drops to reach. It is ensured that the cat litter can fall into the litter cavity 30b, and docking between the housing 1b and the box body 3b is facilitated.

Further, the box body 3b includes a litter box 301b and a top shell 302b. The litter box 301b and the top shell 302b cooperatively define the litter cavity 30b. The circumferential side wall 34b is formed by a side wall 3010b of the litter box 301b and a side wall 3020b of the top shell 302b. A litter filling opening 3021b is defined in the side wall of the top shell 302b. The mounting flange 31b is arranged on the side wall of the litter box 301b. The top shell 302b can be removed from the litter box 301b, facilitate the litter box 301b to be cleaned. In other embodiments, the top shell 302b may be omitted, and that is, an upper opening of the litter cavity 30b is uncapped.

In addition, a top of the litter storage portion 101b may define an opening communicated with the storage cavity 11b, and a cover 103b may be hingedly mounted at the opening. The cover 103b may close or open the opening. A user may refill the storage cavity 11b with new cat litter after opening the cover 103b.

Further, the box body 3b is arranged with a control module 32b and a first electrical connection module 33b electrically connected to the control module 32b. The first electrical connection module 33b is disposed on an upper side of the mounting flange 31b. The litter storage portion 101b is arranged with a second electrical connection module 1011b electrically connected to the gate 2b. The second electrical connection module 1011b may be specifically disposed at a lower side of the abutting edge 1012b. When the litter storage portion 101b and the fixation base 102b clamp the mounting flange 31b, the first electrical connection module 33b and the second electrical connection module 1011b abut against each other in the clamping space 100b and are electrically connected to each other, enabling the control module 32b to be electrically connected to the gate 2b. In this way, the control module 32b controls operation of both the cat litter box and the automatic litter supplying device.

The control module 32b may be a PCB circuit board, the first electrical connection module 33b may be a pogopin female connector, and the second electrical connection module 1011b may be a pogopin male connector correspondingly.

In some embodiments, the cat litter box includes a litter storage portion for cat to excrete feces and a feces-litter storage portion for collecting cat feces. For example, the feces-litter storage portion and the litter storage portion are arranged side by side. Therefore, a structure for transferring the feces into the feces-litter storage portion needs to be arranged in the litter storage portion. Therefore, in the present disclosure, a litter clearing device is arranged in the litter storage portion.

Specifically, as shown in FIGS. 36 to 47, the present disclosure provides a cat litter box arranged with a litter clearing device. The cat litter box includes a litter storage member 2c, a feces-litter storage member 3c, a first litter clearing member 4c, a first drive mechanism 5c, a second litter clearing member 6c, and a second drive mechanism 7c.

The litter storage member 2c defines a litter cavity 20c. The litter cavity 20c has a first end 201c and a second end 202c. The feces-litter storage member 3c is arranged at a side of the litter storage member 2c and is disposed near the second end 202c. The feces-litter storage member 3c defines a feces-litter cavity 30c. A top of the feces-litter storage member 3c defines an opening 301c that is communicated with the feces-litter cavity 30c. The first litter clearing member 4c includes a first connection portion 41c and a first litter clearing portion 42c disposed on the first connection portion 41c. The first litter clearing portion 42c extends into the litter cavity 20c. The first drive mechanism 5c is driveably connected to the first connection portion 41c to drive the first litter clearing portion 42c to translate from the first end 201c to the second end 202c; or to drive the first litter clearing portion 42c to translate from the second end 202c to the first end 201c. The second litter clearing member 6c includes a second connection portion 61c and a second litter clearing portion 62c disposed on the second connection portion 61c. The second connection portion 61c is rotatably arranged, and the second drive mechanism 7c is driveably connected to the second connection portion 61c to drive the second litter clearing portion 62c to rotate around the first connection portion 41c.

The second litter clearing member 6c has a first state in which the second litter clearing portion 62c extends into the second end 202c. The second litter clearing member 6c has a second state in which the second litter clearing portion 62c is rotated to be above the opening 301c and is inclined towards the opening 301c. When the second litter clearing member 6c is in the second state, an angle between the second litter clearing portion 62c and a horizontal plane is between 30° and 60°.

The first litter clearing portion 42c is driven to move from the first end 201c toward the second end 202c; to concentrate feces blocks in the litter cavity 20c at the second end 202c; and to return to the first end 201c. During the above process, the first litter clearing portion 42c also performs a horizontal pushing operation on the cat litter in the litter cavity 20c. In an initial state, the second litter clearing member 6c is in the first state. When the second litter clearing member 6c is activated, the second litter clearing member 6c is switched to the second state, and the second litter clearing portion 62c transfers the feces blocks accumulated at the second end 202c out of the litter cavity 20c. As the second litter clearing portion 62c is raised, the second litter clearing portion 62c is located higher than the opening 301c and is inclined towards the opening 301c, such that the feces blocks carried on the second litter clearing portion 62c roll down along the second litter clearing portion 62c into the feces-litter storage member 3c. In this way, the feces-litter is cleared. After the feces blocks roll down to the feces-litter storage member 3c, the second litter clearing member 6c returns to the first state.

In the above-described feces-litter clearing process, the first litter clearing member 4c and the second litter clearing member 6c both have a filtering effect on the cat litter. That is, in the above-described feces-litter clearing process, the cat litter are filtered twice. On the one hand, reliability of clearing the cat litter is improved, and on the other hand, adequate filtering is performed on the cat litter, the amount of consumed cat litter is saved. For the cat litter box in the art that is arranged one rake for moving in various direction to clear the cat litter, at least some wires are connected to the rake to move together with the rake, such that the wires may be entangled and stretched, resulting in a reduced service life of the wires and a high failure rate. Therefore, the first litter clearing member 4c and the second litter clearing member 6c of the present embodiment both perform a single-direction movement. No power-consuming device is further arranged on the first litter clearing member 4c or the second litter clearing member 6c. In this way, both the first drive mechanism 5c and the second drive mechanism 7c can be fixedly mounted. The wires do not need to follow the movement of the first litter clearing member 4c or the second litter clearing member 6c. In this way, the wires are prevented from being entangled and stretched, the service life of the cat litter clearing device is improved.

In addition, the above-described litter storage member 2c and the feces-litter storage member 3c may be connected to each other via a connection frame 11c, such that positions of the litter storage member 2c and the feces-litter storage member 3c are fixed.

Of course, in another embodiment, the cat litter clearing device may not be arranged with the feces-litter storage member 3c, and the user may place a feces-litter bin separately on a side of the litter storage member 2c Further, in order to improve the reliability of the litter clearing effect, as shown in FIGS. 30-41, in the present embodiment, the first connection portion 41c is rod-shaped and extends along a width direction of the litter storage member 2c. The first litter clearing portion 42c includes a plurality of first clearing member 421c distributed along a length direction of the first connection portion 41c, and the plurality of first clearing member 421c extend into the litter cavity 20c. The second connection portion 61c is rod-shaped and extends in the width direction of the litter storage member 2c. The second litter clearing portion 62c includes a plurality of second clearing member 621c distributed along a length direction of the second connection portion 61c. When the first litter clearing portion 42c moves to the second end 202c, the plurality of first clearing member 421c and the plurality of second clearing member 621c are staggered to each other, ensuring that the feces blocks are concentrated onto the plurality of second clearing member 621c. The plurality of second clearing member 621c may swing to take away all the feces blocks. Of course, in other embodiments, the first clearing member 421c and the second clearing member 621c may not be staggered with each other. Instead, the plurality of first clearing member 421c are located higher than the plurality of second clearing member 621c, and that is, after the plurality of first clearing member 421c move to the second end 202c, vertical projections of the plurality of first clearing member 421c and vertical projections of the plurality of second clearing member 621c have overlapping portions or are staggered with each other. In this way, the same technical effect as the previous embodiment can be achieved.

Figure 40:
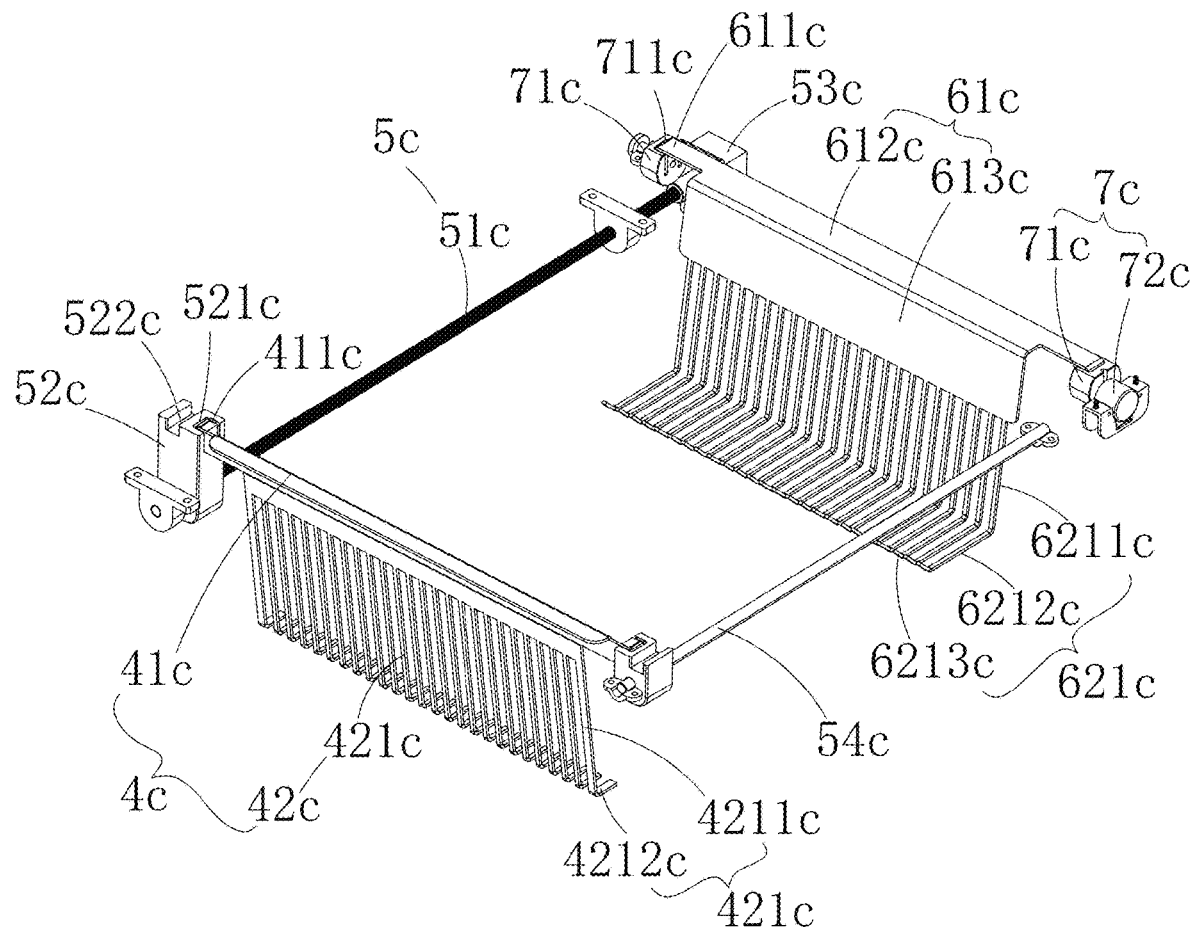
FIG. 40 is a structural schematic view I of the first litter clearing member, the second litter clearing member, a first drive member, and a second drive member, according to an embodiment of the present disclosure.
Figure 41:
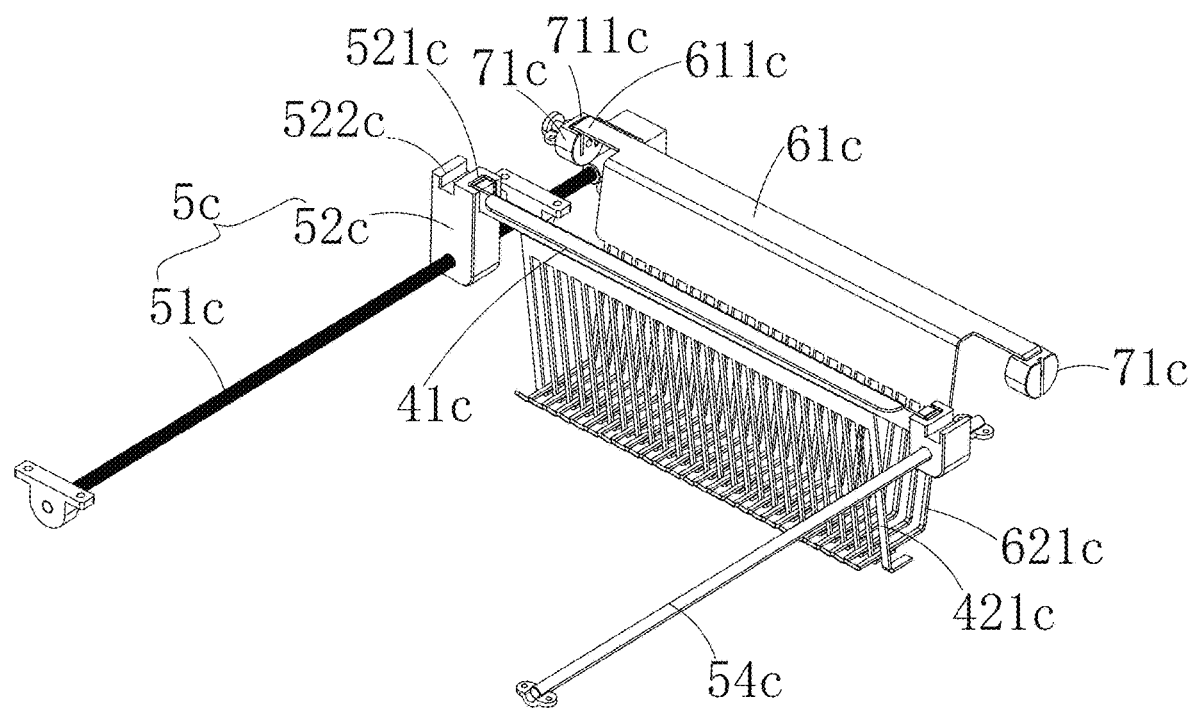
FIG. 41 is a structural schematic view II of the first litter clearing member, the second litter clearing member, the first drive member, and the second drive member, according to an embodiment of the present disclosure, where first clearing member and second clearing member are staggered with each other.

As shown in FIG. 40, the plurality of first clearing member 421c include a horizontally pushing portion 4211c and a hook portion 4212c. The horizontally-pushing portion 4211c is connected to the first connection portion 41c. The horizontally-pushing portion 4211c extends downwardly to be connected to the hook portion 4212c. An angle is formed between the hook portion 4212c and the horizontally-pushing portion 4211c, and the hook portion 4212c extends transversely towards the second end 202c. Each of the horizontally-pushing portion 4211c and the hook portion 4212c is rod-shaped. The horizontally-pushing portion 4211c and the hook portion 4212c are integrally configured as a one-piece structure where the horizontally-pushing portion 4211c and the hook portion 4212c are bent with respect to each other. The horizontally-pushing portion 4211c is configured to push the feces blocks and to filter the cat litter. The hook portion 4212c is configured to prevent the feces blocks from detaching from the horizontally-pushing portion 4211c from an underneath of the horizontally-pushing portion 4211c As shown in FIG. 40, each of the plurality of second clearing member 621c includes a guiding portion 6211c, a bearing portion 6212c, and a blocking portion 6213c. The guiding portion 6211c is connected to the second connection portion 61c. When the second litter clearing member 6c is in the first state, the guiding portion 6211c extends downwardly and is connected to the bearing portion 6212c. An angle is formed between the bearing portion 6212c and the guiding portion 6211c. The bearing portion 6212c extends laterally towards the first end 201c and is connected to the blocking portion 6213c. An angle is formed between the blocking portion 6213c and the bearing portion 6212c, and the blocking portion 6213c extends upwardly. Specifically, the angle between the guiding portion 6211c and the bearing portion 6212c is an obtuse angle, and the angle between the blocking portion 6213c and the bearing portion 6212c is an obtuse angle. The guiding portion 6211c, the bearing portion 6212c, and the blocking portion 6213c are all rod-shaped and are integrally formed as a one-piece structure where the guiding portion 6211c, the bearing portion 6212c, and the blocking portion 6213c are bent to each other. For example, one iron rod is pressed to be bent forming the guiding portion 6211c, the bearing portion 6212c, and the blocking portion 6213c. The bearing portion 6212c and the blocking portion 6213c are configured to hook and catch the feces blocks, preventing the feces blocks from falling back into the litter cavity 20c during the second clearing member 621c rotating. When the second litter clearing member 6c is in the second state, the guiding portion 6211c is configured to guide the falling direction of the feces blocks.

Figure 42:
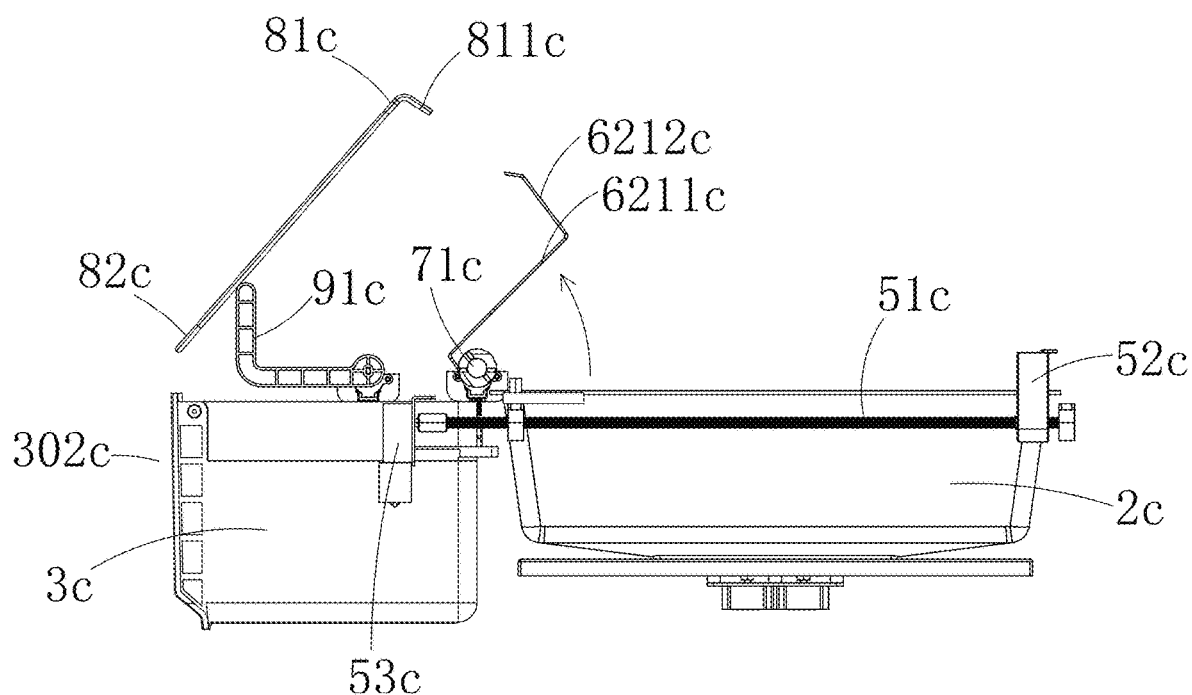
FIG. 42 is a structural schematic view of the second litter clearing member being in a second state according to an embodiment of the present disclosure.
Figure 44:
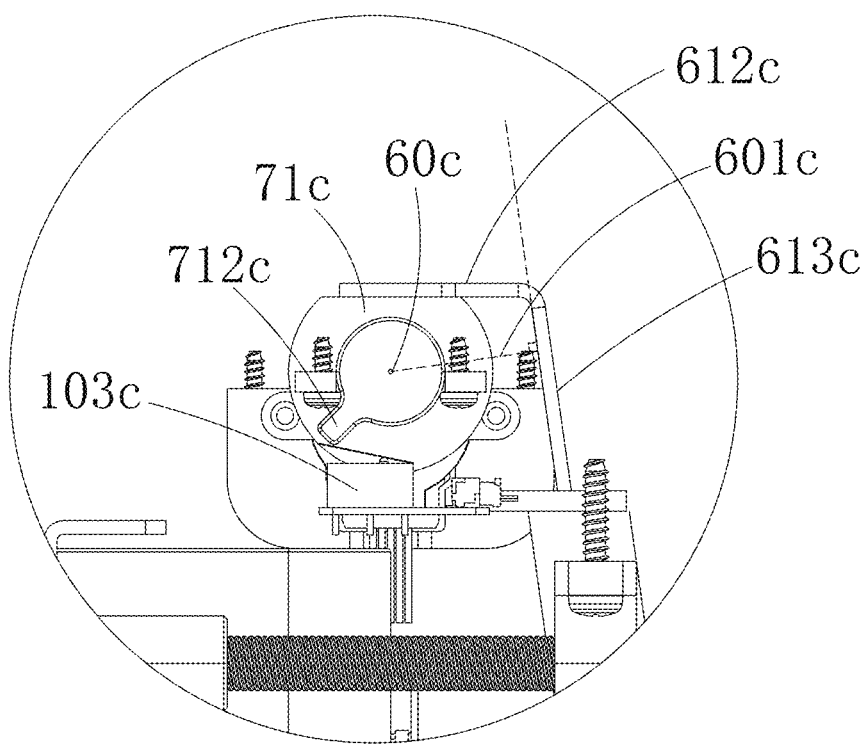
FIG. 44. is an enlarged view of a portion A shown in FIG. 43, where a touch protrusion and a third in-position switch are shown.

As shown in FIG. 44, the second connection portion 61c is a bent plate, having an offset portion 612c and a litter blocking portion 613c. The offset portion 612c is connected to the second drive mechanism 7c. The litter blocking portion 613c is plate-shaped and is extending parallel to a rotation center 60c of the second litter clearing member 6c. The litter blocking portion 613c is connected to the offset portion 612c. Due to arranging the offset portion 612c, the litter blocking portion 613c is disposed away from the rotation center of the second litter clearing member 6c, and the second clearing member 621c are extended and disposed on a side of the litter blocking portion 613c away from the offset portion 612c. In addition, the litter blocking portion 613c extends and crosses at least a perpendicular line 601c from the rotation center 60c of the second litter clearing member 6c to the litter blocking portion 613c itself. The offset portion 612c may also be plate-shaped. Therefore, an angle is formed between the offset portion 612c and the litter blocking portion 613c and is in a range of 50 degrees to 80 degrees. When the second litter clearing member 6c is in the first state, the offset portion 612c is arranged horizontally, and the litter blocking portion 613c extends downwardly. Therefore, when the second litter clearing member 6c is in the second state, as shown in FIG. 42, the feces blocks are prevented from remaining in a rotation gap between the offset portion 612c and the litter storage member 1c when the feces blocks are sliding down along the guiding portion 6211c towards the opening.

A structure of the first drive mechanism 5c is shown in FIG. 40. In the present embodiment, the first drive mechanism 5c includes a drive rod 51c, a pushing block 52c, and a first drive member 53c. The drive rod 51c is arranged along a length direction of the litter storage member 2c and disposed at a side of the litter storage member 2c. The first connection portion 41c is mounted to the pushing block 52c. The first drive member 53c is configured to drive the pushing block 52c to translate along the drive rod 51c. Specifically, the drive rod 51c is arranged with threads, the drive rod 51c extends through the pushing block 52c and is threadedly connected to the pushing block 52c. The first drive member 53c is a motor, and the first drive member 53c is configured to drive the drive rod 51c to rotate around an axis of the drive rod 51c itself. In this way, the pushing block 52c is driven to translate along the drive rod 51c. In order to ensure that the pushing block 52c moves along only a straight line, a guiding structure, such as a guide rail, a guide groove, or the like, may further be arranged to cooperate with the pushing block 52c.

Further, in order to make the first litter clearing member 4c to be subjected to a more balanced force, in the present embodiment, one pushing block 52c is arranged each of two sides of the first litter clearing member 4c. The first drive mechanism 5c further includes a guiding rod 54c, the guiding rod 54c is extending in parallel with the drive rod 51c. The guiding rod 54c and the drive rod 51c are respectively disposed at the two opposite sides of the litter storage member 2c. The drive rod 51c and the guiding rod 54c extend through the two pushing blocks 52c. The first connection portion 41c is mounted on both of the two pushing blocks 52c. For a connection structure between the first connection portion 41c and the pushing blocks 52c, in the present embodiment, a downwardly-extending first embedding groove 521c is defined in the pushing block 52c. A side end 411c of the first connection portion 41c is embedded, from a top to a bottom, in the first embedding groove 521c in an interference fit manner. In order to improve stability of connection between the first connection portion 41c and the pushing blocks 52c, the side end 411c of the first connection portion 41c may be configured as "U"-shaped, and a shape of the first embedding groove 521c may be determined accordingly.

In the present embodiment, the second drive mechanism 7c includes a rotation member 71c and a second drive member 72c. The rotation member 71c is rotatably disposed at a side of the litter storage member 2c. The second connection portion 61c is connected to the rotation member 71c. The second drive member 72c is also a motor. The rotation member 71c is directly connected to an output shaft of the second drive member 72c. The second drive member 72c is configured to drive the rotation member 71c to rotate to drive the second litter clearing member 6c to enter the first state or the second state. When the second litter clearing member 6c is in the first state, the plurality of second clearing member 621c extend into the litter cavity 20c.

When the second litter clearing member 6c is in the second state, the plurality of second clearing member 621c are located above the opening 301c and are inclined towards the opening 301c.

As shown in FIG. 40, a second embedding groove 711c that is extending vertically towards a rotation axis of the rotation member 71c is defined in the rotation member 71c. A side end 611c of the second connection portion 61c is embedded, from the top to the bottom, in the second embedding groove 711c in an interference fit manner. A rotation center of the rotation member 71c is the rotation center 60c of the second litter clearing member 6c.

Further, the cat litter clearing device further includes a lid 8c and a third drive mechanism 9c. The lid 8c is rotatably arranged above the feces-litter storage member 3c and close the opening 301c. The third drive mechanism 9c is configured to drive the lid 8c to move away from the second end 202c to open the opening 301c. The lid 8c is configured to support a cat, preventing the cat from falling into the feces-litter cavity 30c. In addition, the lid 8c is hollowed. When the cat stands on the lid 8c, the cat litter stuck on feet of the cat may fall into the feces-litter storage member 3c. In addition, the feces-litter storage member 3c further defines a funnel-shaped structure 31c, and a funnel wall is inclined towards the opening 301c for concentrating the feces blocks into the opening 301c. A litter bag and a litter bag sealing device may be arranged at the opening 301c. In this way, the feces blocks may be concentrated into the litter bag, and the litter bag may be sealed by the litter bag sealing device.

Further, the lid 8c is rotatably arranged on a side 302c of the feces-litter storage member 3c away from the second end 202c. The third drive mechanism 9c includes a top member 91c and a third drive member 92c. The top member 91c is rotatably arranged at a side of the feces-litter storage member 3c. The third drive member is a motor. The top member 91c is directly connected to an output shaft of the third drive member 92c. The third drive member 92c is drivably connected to the top member 91c to drive the top member 91c to rotate to lift up the lid 8c, such that the opening 301c is exposed.

Further, as shown in FIG. 42, the lid 8c includes a front end 81c and a rear end 82c. The rear end 82c is rotatably arranged on a side 302c of the feces-litter storage member 3c away from the second end 202c. The front end 81c is swingable around the rear end 82c. The front end 81c is arranged with a baffle plate 811c. When the lid 8c closes the opening 301c, the baffle plate 811c extends into the litter cavity 20c. The baffle plate 811c is substantially configured to shield the second connection portion 61c, preventing the second connection portion 61c from being exposed in the first state. In this way, a gap is prevented, and an aesthetic appearance is provided.

Figure 43:
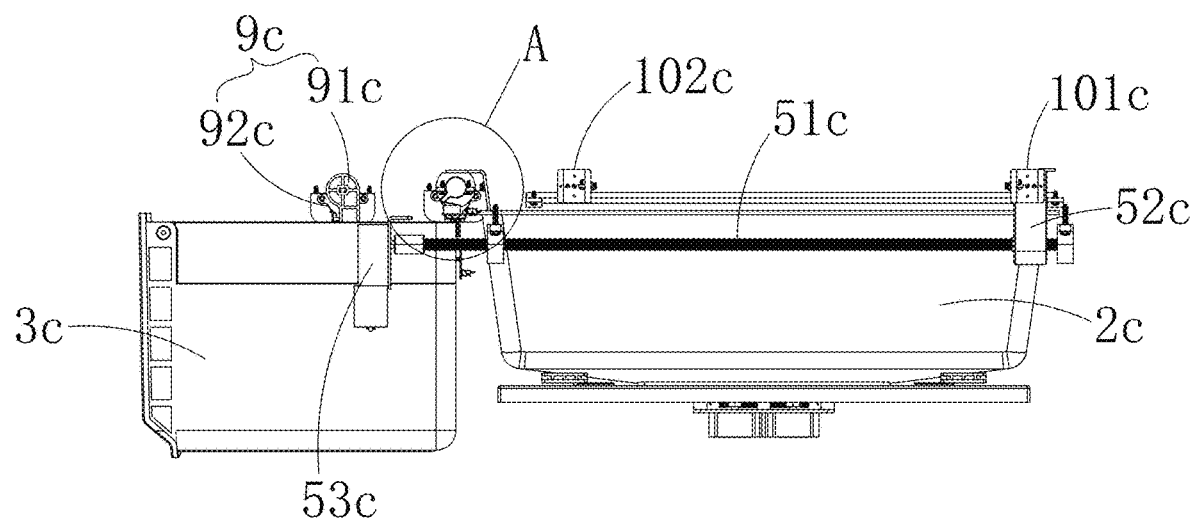
FIG. 43 is a structural schematic view I of a portion of the cat litter box according to an embodiment of the present disclosure, where a first in-position switch and a second in-position switch are shown.
Figure 45:
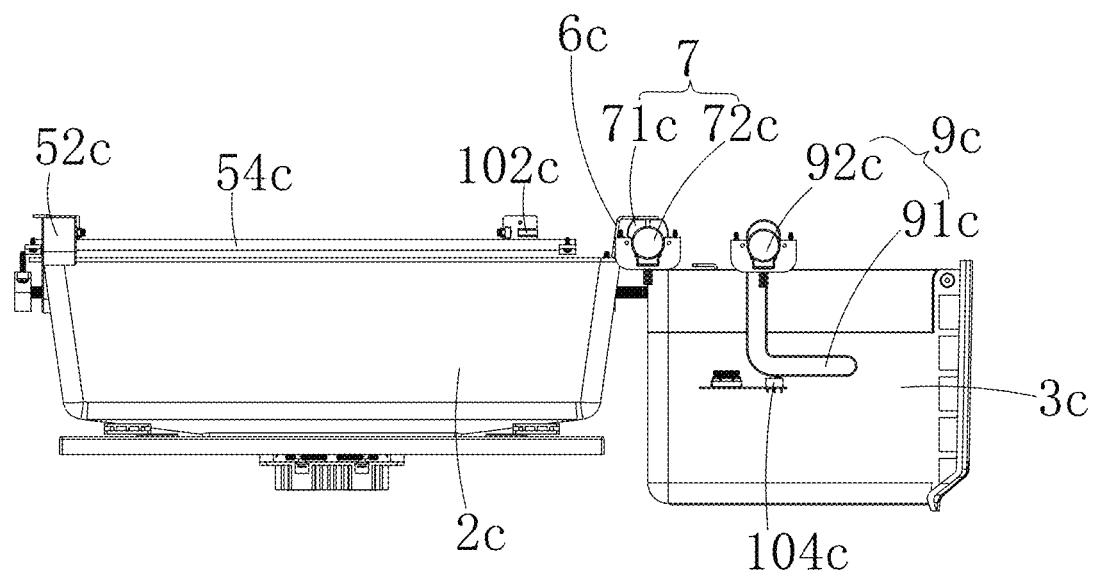
FIG. 45 is a structural schematic view II of a portion of the cat litter box according to an embodiment of the present disclosure, where a fourth in-position switch is shown.

Further, as shown in FIGS. 43-45, the cat litter clearing device at least further includes a first in-position switch 101c, a second in-position switch 102c, a third in-position switch 103c, and a fourth in-position switch 104c. The first in-position switch 101c is disposed at a location corresponding to the first end 201c, and the second in-position switch 102c is disposed at a location corresponding to the second end 202c. The first in-position switch 101c and the second in-position switches 102c operate with the first litter clearing member 4c to limit a position at which the first litter clearing member 4c can move to reach. That is, when the first litter clearing member 4c triggers the first in-position switch 101c or the second in-position switch 102c, the first litter clearing member 4c stops a current movement, and a next process is entered. The third in-position switch 103c is located below the rotation member 71c. A protruding touch tab 712c is arranged on the rotation member 71c. As the rotation member 71c rotates, the touch tab 712c may trigger the third in-position switch 103c. An operating principle of the third in-position switch 103c is the same as that of the first in-position switch 101c. The third in-position switch 103c is configured to limit a rotation angle of the rotation member 71c. For example, when the second clearing member 621c are rotated to be higher than the opening 301c and to have an angle of 45° with respect to the horizontal plane 103c, the third in-position switch 103c is triggered. The fourth in-position switch 104c is disposed below the top member 91c. The top member 91c may be rotated to trigger the fourth in-position switch 104c, and the fourth in-position switch 104c is configured to limit a rotation angle of the top member 91c.

In the present embodiment, when the cat litter clearing device is activated, firstly, the third drive member may drive the top member 91c to rotate to push the lid 8c to be opened; and subsequently, the first litter clearing member 4c moves from the first end 201c to the second end 202c to push and concentrate the feces blocks to the second end 202c. After the first litter clearing member 4c triggers the second in-position switch 102c, the first litter clearing member 4c moves reversely to the first end 201c. After the second in-position switch 102c is triggered, the second litter clearing member 6c starts to rotate after a specified delay time, rotation of the second litter clearing member 6c stops when the third in-position switch 103c is triggered, and the second litter clearing member 6c is in the second state. The second clearing member 621c reach a specified inclination angle, and the feces blocks fall into the litter cavity 30c. Furthermore, the first litter clearing member 4c returns to the first end 201c and triggers the first in-position switch 101c, the first litter clearing member 4c stops moving, and the rotation member 71c starts to reset, and the second litter clearing member 6c is driven to be reset to the first state. At the same time, the top member 91c starts to rotate to be reset, and when the fourth in-position switch 104c is triggered, the lid 8c closes the opening 301c again.

Figure 36:
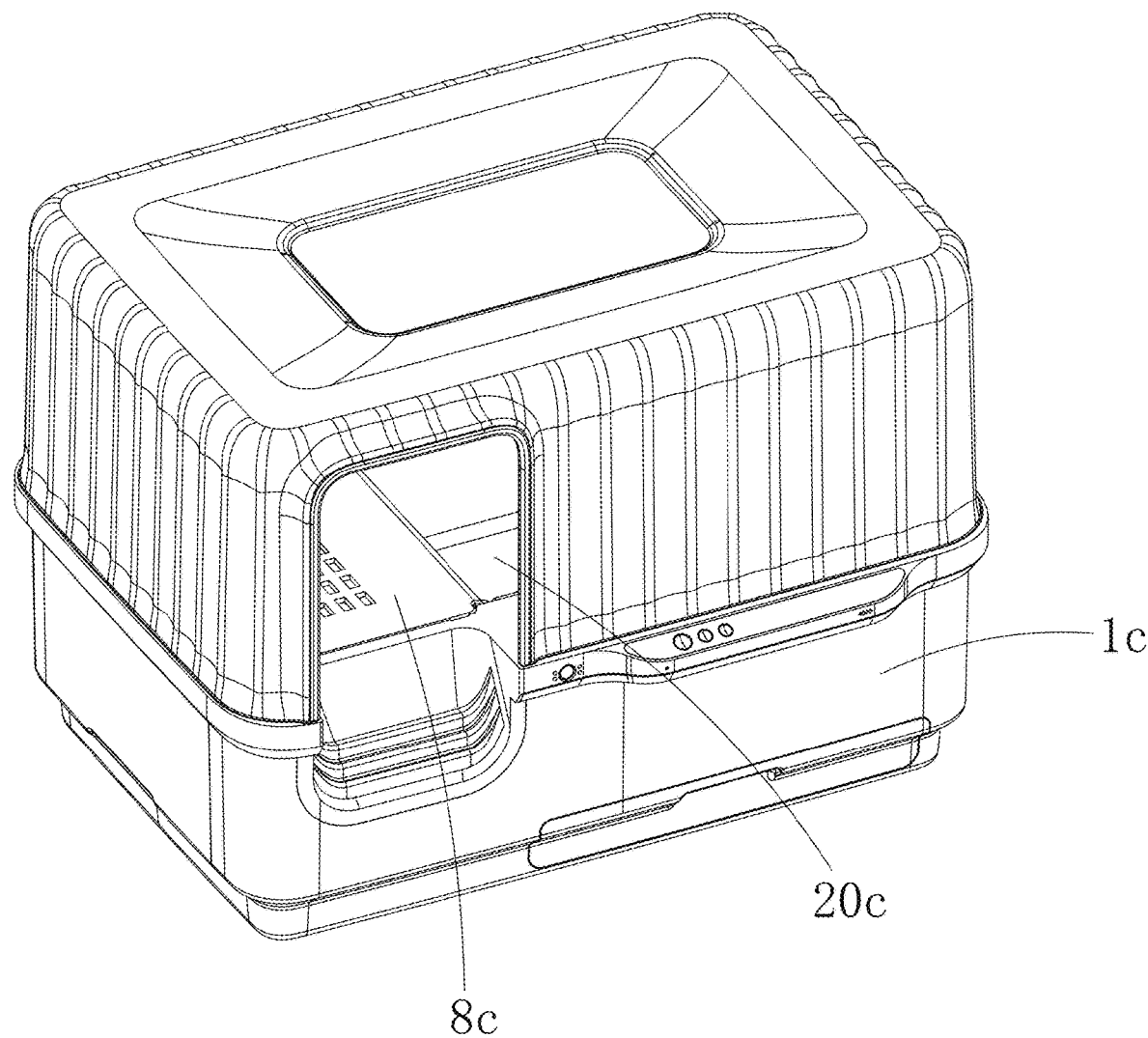
FIG. 36 is a structural schematic view of the cat litter box according to an embodiment of the present disclosure.
Figure 37:
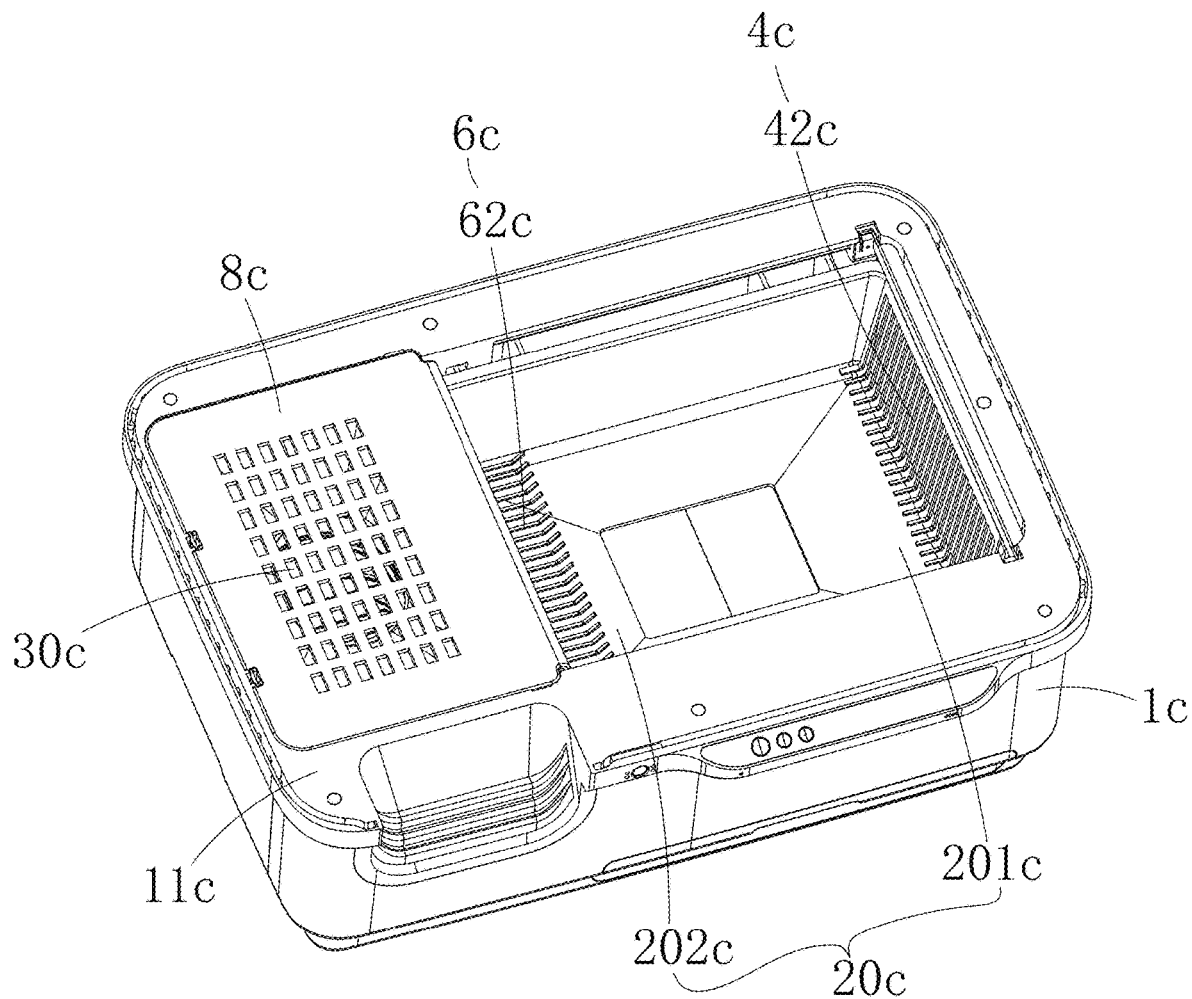
FIG. 37 is a structural schematic view of the cat litter box according to another embodiment of the present disclosure.
Figure 38:
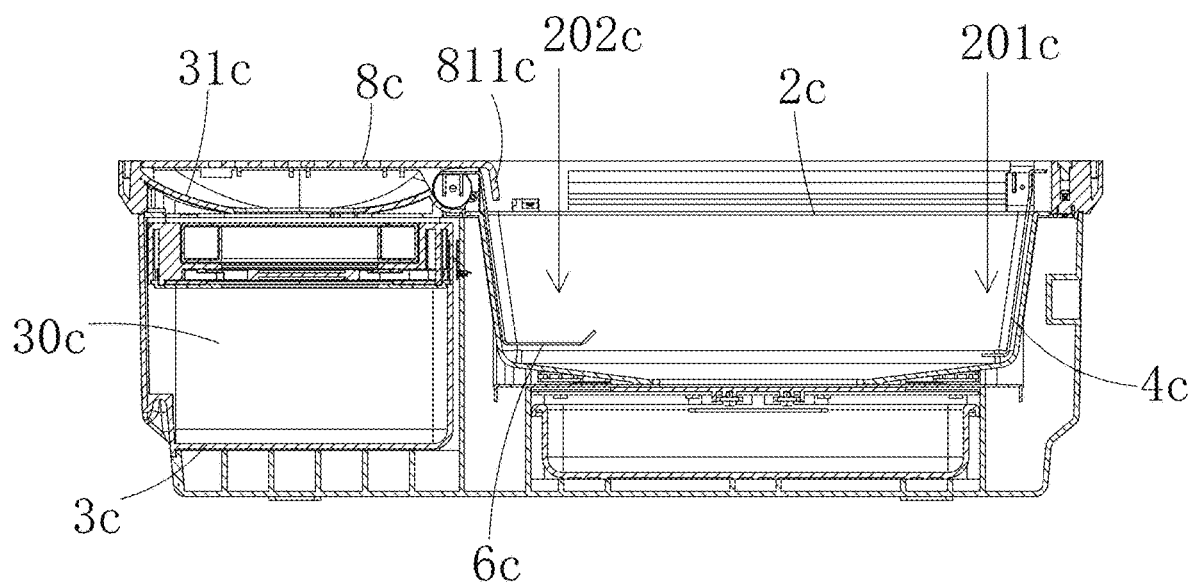
FIG. 38 is a vertical cross-sectional view of the cat litter box according to an embodiment of the present disclosure, where a first litter clearing member is located at a first end and a second litter clearing member is located at a second end.
Figure 39:
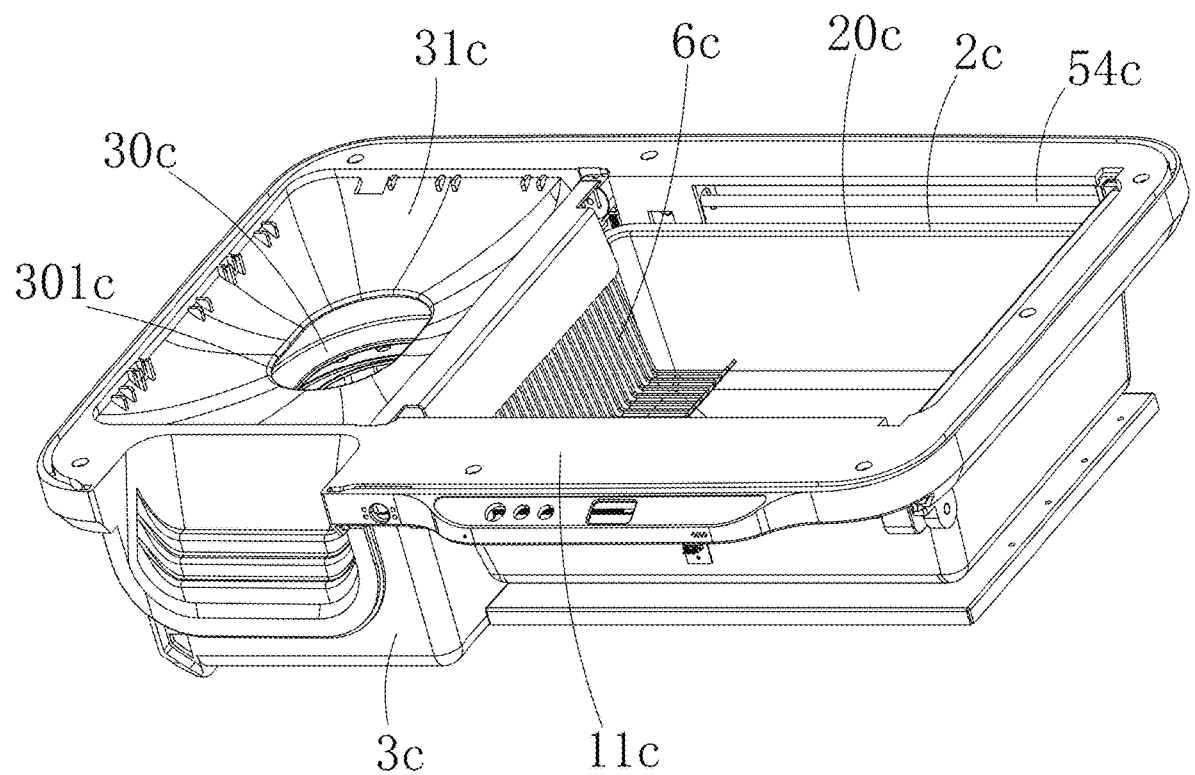
FIG. 39 is a structural schematic view of the cat litter box according to still another embodiment of the present disclosure.
Figure 46:
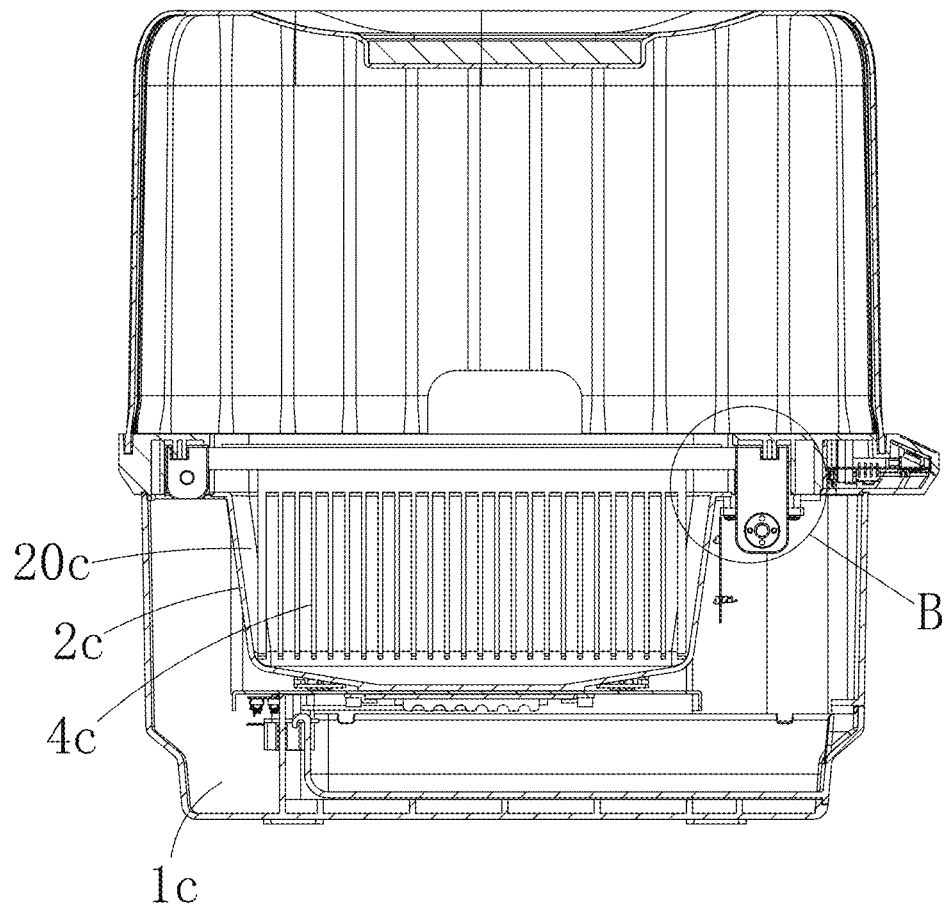
FIG. 46 is a vertical cross-sectional view of the cat litter box according to an embodiment of the present disclosure, where a litter storage member and a first drive mechanism are shown.
Figure 47:
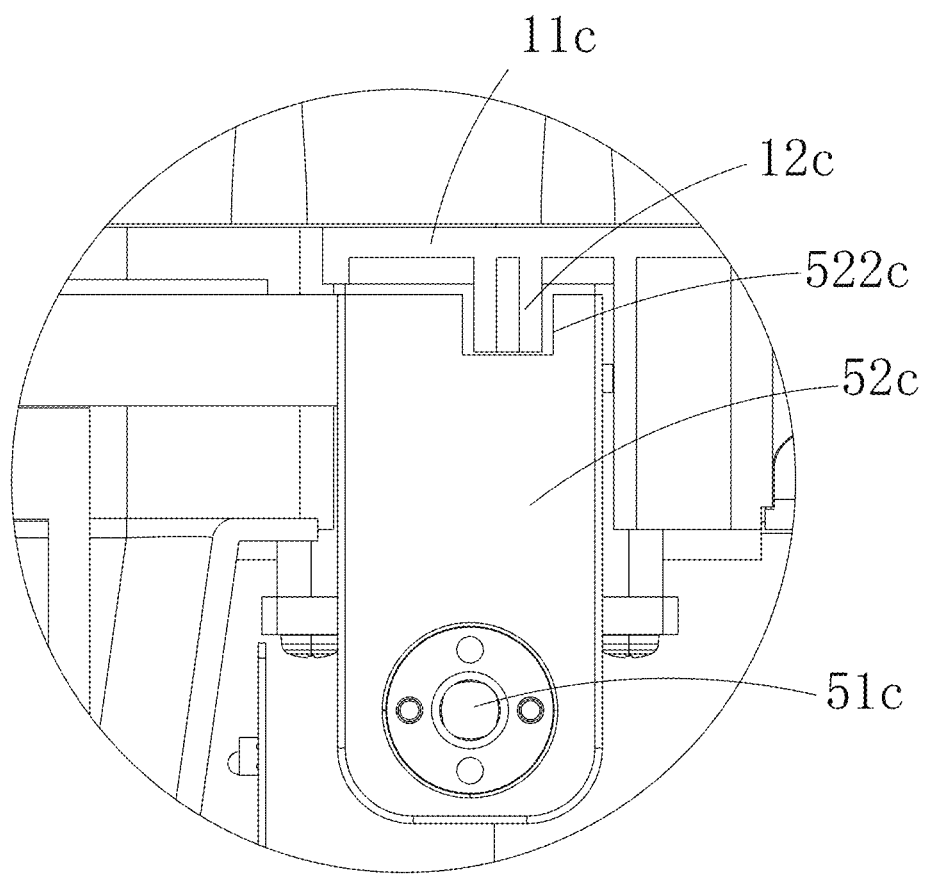
FIG. 47 is an enlarged view of a portion B shown in FIG. 46.

In addition, the above-mentioned components, such as the litter storage member 2c, the feces-litter storage member 3c, the first litter clearing member 4c, the first drive mechanism 5c, the second litter clearing member 6c, and the second drive mechanism 7c, may be integrally arranged in one housing 1c for use. As shown in FIGS. 36-37 and 46, in an embodiment, the cat litter clearing device further includes the housing 1c, and the litter storage member 2c, the feces-litter storage member 3c, the first litter clearing member 4c, the first drive mechanism 5c, the second litter clearing member 6c, and the second drive mechanism 7c are all arranged inside the housing 1c. The above-mentioned connection frame 11c is a part of the housing 1c. That is, the drive rod 51c is rotatably mounted in the housing 1c, the guide rod 54c is fixedly mounted in the housing 1c, and the first drive member 53c, the second drive member 72c and the third drive member 92c are all fixedly mounted in the housing 1c. In addition, the pushing block 52c may define a guiding groove 522c, and a guiding protrusion 12 connected to the guiding groove 522c may be arranged inside the connection frame 11c. Mating between the guiding protrusion 12 and the guiding groove 522c serves as the above-mentioned guiding structure for ensuring that the pushing block 52c moves along only the straight line in the housing 1c.

In other embodiments, the cat litter clearing device may include the housing 1c, the first litter clearing member 4c, the first drive mechanism 5c, the second litter clearing member 6c, and the second drive mechanism 7c. Specifically, the housing 1c defines the litter cavity 20c and the feces-litter cavity 30c, the litter cavity 20c has a first end 201c and a second end 202c, the feces-litter cavity 30c is located near the second end 202c. The opening 301c is defined in the top of the feces-litter cavity 30c. The first litter clearing member 4c includes the first connection portion 41c and the first litter clearing portion 42c arranged on the first connection portion 41c. The first litter clearing portion 42c extends into the litter cavity 20c. The first drive mechanism 5c is drivably connected to the first connection portion 41c to drive the first litter clearing portion 42c to translate from the first end 201c to the second end 202c; or to drive the first litter clearing portion 42c to translate from the second end 202c to the first end 201c. The second litter clearing member 6c includes the second connection portion 61c and the second litter clearing portion 62c arranged on the second connection portion 61c. The second connection portion 61c is rotatably arranged. The second drive mechanism 7c is drivably connected to the second connection portion 61c to drive the second litter clearing portion 62c to rotate around the first connection portion 41c. The second litter clearing member 6c has the first state in which the second litter clearing portion 62c is enabled to extend into the litter cavity 20c and has the second state in which the second litter clearing portion 62c is rotated to be above the opening 301c and inclined towards the opening 301c.

In summary, in the present disclosure, by arranging the litter bag sealing device, cat litter blocks carrying feces can be sealed in the litter bag in time to prevent odor from spreading. By arranging the cat litter dropping device, when the cat litter needs to be replaced, the cat litter can be directly collected in the litter cavity of the box body without disassembling the entire cat litter box. By arranging the automatic litter supplying device, new cat litter may be supplied into the litter cavity of the box body in time. By arranging the cat litter clearing device, cat litter blocks carrying the feces in the litter cavity can be transferred to the feces-litter cavity.

Obviously, the above description provides only some of, not all of, the embodiments of the present disclosure. The accompanying drawings provide preferred embodiments of the present disclosure but do not limit the scope of the present disclosure. The present disclosure may be achieved in various forms. Conversely, these embodiments are provided for the purpose of providing a more thorough and comprehensive understanding of the present disclosure. Although the present disclosure has been described in detail with reference to the foregoing embodiments, any ordinary skilled person in the art may modify the technical solutions in the foregoing specific embodiments or may make equivalent substitutions for some technical features therein. Any equivalent structure made based on the specification and the accompanying drawings of the present disclosure, applied directly or indirectly in other related technical fields, shall all be equivalently within the scope of the present disclosure.

What is claimed is:
1. A litter bag sealing device, comprising:
a device body, configured to mount a litter bag;
a rotation ring, rotatably mounted on the device body, wherein rotation ring defines a dropping opening configured to allow the litter bag to pass through;
at least two rotation sheets, rotatably connected to the device body and slidably connected to the rotation ring;

a drive mechanism, driveably connected to the rotation ring to drive the rotation ring to rotate;

a sealing mechanism, mounted on at least one of the at least two rotation sheets and configured to heat a portion of the litter bag;

wherein the rotation ring is configured to: rotate to drive the at least two rotation sheets to move towards a center of the dropping opening and clamp the litter bag; or to drive the at least two rotation sheets to move away from each other to open the dropping opening.

2. The litter bag sealing device according to claim 1, wherein each of the at least two rotation sheets includes a rotation end and an operating end; the rotation end is rotatably mounted on the device body, the operating end is slidably mounted on the rotation ring;

the rotation ring is configured to: rotate to drive the operating end of each of the at least two rotation sheets to move towards the center of the dropping opening and to clamp the litter bag; or rotate to drive the operating end of each of the at least two rotation sheets to move away from the center of the dropping opening to open the dropping opening.

3. The litter bag sealing device according to claim 2, wherein the litter bag sealing device further comprises at least two slide shafts, the number of the at least two slide shafts is equal to the number of the at least two rotation sheets; each of the at least two slide shafts is mounted on a respective one of the at least two rotation sheets or mounted on the rotation ring; each of the at least two slide shafts is configured to enable the respective one of the at least two rotation sheets to be slidably connected to the rotation ring, and each of the at least two slide shafts is offset from a rotation axis of the rotation end of the respective one of the at least two rotation sheets.

4. The litter bag sealing device according to claim 3, wherein the rotation ring defines at least two slide holes, each of the at least two slide holes extends towards the dropping opening, each of the at least two slide shafts is mounted on the respective one of the at least two rotation sheets and extends vertically; each of the at least two slide shafts is inserted into and slidable along a respective one of the at least two slide holes.

5. The litter bag sealing device according to claim 4, wherein the device body defines a mounting cavity, the rotation ring is mounted in the mounting cavity, the at least two rotation sheets are disposed above the rotation ring, the rotation end extends upwardly and is inserted into the device body for rotation, and the at least two slide shafts extend downwardly to be inserted into the at least two slide holes.

6. The litter bag sealing device according to claim 1, wherein the drive mechanism comprises a motor and a drive gear, the motor is fixedly mounted on the device body; the drive gear is mounted on an output shaft of the motor; follower teeth are arranged on a circumferential side of the rotation ring, and the follower teeth are meshed with the drive gear.

7. The litter bag sealing device according to claim 2, wherein the number of the at least two rotation sheets is an even number, the at least two rotation sheets form at least one sealing gate;

each of the at least one sealing gate is formed by two rotation sheets of the the at least two rotation sheets, and the two rotation sheets of the sealing gate are centro-symmetrically distributed around the rotation ring;

when the number of the at least one sealing gate is more than one, the more than one sealing gates are staggered to each other and laminated along a vertical direction.

8. The litter bag sealing device according to claim 7, wherein each of the at least one sealing gate has two operating ends and two rotation ends; the two operating ends are bent towards the center of the dropping opening, each of the two operating ends comprises a connection section, an abutting section and a guiding section that are connected to each other in sequence; the connection section is connected to a respective one of the two rotation ends; the abutting section of one of the two operating ends abuts against the abutting section of the other one of the two operating ends;

when the abutting section of one of the two operating ends abuts against the abutting section of the other one of the two operating ends, the guiding section of one of the two operating ends is staggered with and laminated on the connection section of the other one of the two operating ends.

9. The litter bag sealing device according to claim 7, wherein the sealing mechanism is mounted on the at least one sealing gate, the sealing mechanism comprises a heating member and an abutting member; the heating member is mounted on the operating end of one of the two rotation sheets, and the abutting member is mounted on the operating end of the other one of the two rotation sheets; the heating member and the abutting member are configured to abut against each other to cooperatively clamp the litter bag.

10. The litter bag sealing device according to claim 9, wherein the heating member comprises a fixing strip and a heating wire wound around the fixing strip, the fixing strip is embedded in the operating end of one of the two rotation sheets, the abutting member is embedded in the operating end of the other one of the two rotation sheets; the heating wire abuts against the abutting member.

11. The litter bag sealing device according to claim 10, wherein the heating member further comprises a first heat-insulating layer wrapping the fixing strip and the heating wire; the heating wire is exposed from a side of the first heat-insulating layer facing towards the other one of the two rotation sheets;

the abutting member comprises a soft base layer and a second heat-insulating layer wrapping the soft base layer; the heating wire abuts against the second heat-insulating layer.

12. The litter bag sealing device according to claim 1, wherein the device body defines a litter channel allowing the litter bag to pass through; the litter bag is capable of being laid in the litter channel; the device body comprises a top shell and a base plate; the top shell and the base plate cooperatively define a mounting cavity; the litter channel extends through the top shell and the base plate.

13. The litter bag sealing device according to claim 12, wherein a downwardly-extending mounting protrusion is arranged on the top shell and inside the mounting cavity; the litter channel extends through the mounting protrusion; a plurality of limiting protrusions are arranged at an outer edge of the mounting protrusion; the plurality of limiting protrusions abut against the base plate; the rotation ring is disposed between the mounting protrusion and the base plate, the dropping opening and the litter channel are at least partially overlapping with each other; the plurality of limiting protrusions surround and abut against the rotation ring.

14. The litter bag sealing device according to claim 13, wherein the device body further comprises an annular receiving member; the receiving member is detachably mounted on the top shell; the litter channel extends through the receiving member; a receiving space is defined in the receiving member; an opening of the receiving space is located at a side of the receiving space facing towards the litter channel; the litter bag is folded and received in the receiving space, passes through the opening, and covers the litter channel.

15. A cat litter box, comprising:
   a box body, configured to provide a space for a cat to excrete feces;
   the litter bag sealing device according to claim 1, arranged inside the box body; and
   an automatic litter supplying device, storing cat litter and communicated with the box body and configured to supply the cat litter to an interior of the box body.

16. The cat litter box according to claim 15, wherein the box body comprises:
   a litter storage portion, arranged with a litter clearing assembly, wherein the litter storage portion is configured to store cat litter for the cat to excrete feces;
   a feces-litter storage portion, disposed at a side of the litter storage portion and defining a feces-litter cavity, wherein the litter clearing assembly is configured to transfer any litter that carries the feces into the feces-litter cavity;
   wherein the litter bag sealing device is arranged inside the litter storage portion or in the feces-litter storage portion.

17. The cat litter box according to claim 16, wherein the litter storage portion comprises:
   a body portion;
   an upper box body, mounted on the body portion, wherein a litter dropping opening is defined in a bottom of the upper box body;
   a lower box body, located below the upper box body and slidably mounted on the body portion;
   a litter dropping mechanism, mounted on the bottom of the upper box body and configured to open or close the litter dropping opening;
   wherein the lower box body has a first state in which the lower box body is disposed directly below the upper box body; and has a second state in which the lower box body is slidably detached from the body portion; and
   in the first state, the litter dropping opening directly faces the lower box body.

18. The cat litter box according to claim 17, wherein the litter dropping mechanism comprises:
   a swing rod, rotatably mounted to the bottom of the upper box body;
   a blocking plate, slidably mounted to the bottom of the upper box body and connected to the swing rod, wherein the blocking plate is configured to to open or close the litter dropping opening; and
   a drive member, driveably connected to the swing rod to drive the swing rod to swing to drive the blocking plate to slide.

19. The cat litter box according to claim 16, wherein the litter storage portion defines a litter cavity for storing the cat litter; the automatic litter supplying device is disposed at a side of the litter storage portion away from the feces-litter storage portion, the automatic litter supplying device comprises:
   a device housing, defining a storage cavity for storing the cat litter; wherein a side of the device housing near the litter storage portion defines a discharging opening that communicates a lowest point of the storage cavity with the litter cavity; and
   a gate, mounted on the device housing and configured to open or close the discharging opening.

20. The cat litter box according to claim 16, wherein the litter storage portion defines a litter cavity therein; the litter clearing assembly is arranged in the litter cavity, the litter clearing assembly comprises:
   a first litter clearing member, comprising a plurality of first clearing teeth that are spaced apart from each other;
   a first drive mechanism, driveably connected to the first litter cleaning member and configured to drive the first litter clearing member to move;
   a second litter clearing member, comprising a plurality of second clearing teeth that are spaced apart from each other;
   a second drive mechanism, driveably connected to the second litter clearing member and configured to drive the second litter clearing member to rotate from a first state to a second state or from the second state to the first state;
   wherein when the second litter clearing member is in the first state, the first drive mechanism drives the first litter clearing member to move towards or away from the second litter clearing member.

* * * * *